(12) United States Patent
Kawashima et al.

(10) Patent No.: US 11,361,726 B2
(45) Date of Patent: Jun. 14, 2022

(54) DISPLAY DEVICE AND OPERATING METHOD THEREOF

(71) Applicant: Semiconductor Energy Laboratory Co., Ltd., Kanagawa-ken (JP)

(72) Inventors: Susumu Kawashima, Kanagawa (JP); Kouhei Toyotaka, Kanagawa (JP); Kei Takahashi, Kanagawa (JP)

(73) Assignee: Semiconductor Energy Laboratory Co., Ltd.

( * ) Notice: Subject to any disclaimer, the term of this patent is extended or adjusted under 35 U.S.C. 154(b) by 0 days.

(21) Appl. No.: 17/177,445

(22) Filed: Feb. 17, 2021

(65) Prior Publication Data

US 2021/0193071 A1    Jun. 24, 2021

Related U.S. Application Data

(63) Continuation of application No. 15/819,347, filed on Nov. 21, 2017, now Pat. No. 11,062,667.

(30) Foreign Application Priority Data

Nov. 25, 2016    (JP) .............................. JP2016-229326

(51) Int. Cl.
*G09G 3/36* (2006.01)
*G06F 3/041* (2006.01)
(Continued)

(52) U.S. Cl.
CPC ......... *G09G 3/3677* (2013.01); *G06F 3/0418* (2013.01); *G06F 3/0443* (2019.05);
(Continued)

(58) Field of Classification Search
CPC ......... G09G 3/3677; G09G 2310/0286; G09G 2310/08; G09G 2320/103; G06F 3/0443;
(Continued)

(56) References Cited

U.S. PATENT DOCUMENTS

| 5,107,354 | A | 4/1992 | Yamazaki et al. |
| 5,514,880 | A | 5/1996 | Nishimura et al. |

(Continued)

FOREIGN PATENT DOCUMENTS

| CN | 103077689 A | 5/2013 |
| CN | 104103321 A | 10/2014 |

(Continued)

OTHER PUBLICATIONS

Chinese Office Action (Application No. 201711097254.X) dated Feb. 8, 2021.

(Continued)

*Primary Examiner* — Kent W Chang
*Assistant Examiner* — Sujit Shah
(74) *Attorney, Agent, or Firm* — Husch Blackwell LLP

(57) ABSTRACT

A display device that achieves both high-accuracy sensing by a touch sensor unit and smooth input using the touch sensor unit is provided. The display device includes a display unit and the touch sensor unit. The touch sensor unit performs touch sensing operation at a different timing from display image rewriting by the display unit, whereby the high-accuracy sensing can be achieved. The display unit has a function of rewriting a display image only in a region that needs to be rewritten. In the case where the entire display region is not necessarily rewritten, the time for the sensing operation by the touch sensor unit can be lengthened, whereby the smooth input can be achieved.

18 Claims, 38 Drawing Sheets

(51) Int. Cl.
*G06F 3/044* (2006.01)
*G02F 1/1333* (2006.01)
*G02F 1/1368* (2006.01)

(52) U.S. Cl.
CPC ........ *G02F 1/1368* (2013.01); *G02F 1/13338* (2013.01); *G06F 3/044* (2013.01); *G09G 2310/0286* (2013.01); *G09G 2310/08* (2013.01); *G09G 2320/103* (2013.01)

(58) Field of Classification Search
CPC .... G06F 3/0418; G06F 3/044; G02F 1/13338; G02F 1/1368
See application file for complete search history.

(56) References Cited

U.S. PATENT DOCUMENTS

| | | |
|---|---|---|
| 5,712,652 A | 1/1998 | Sato et al. |
| 5,731,856 A | 3/1998 | Kim et al. |
| 5,744,864 A | 4/1998 | Cillessen et al. |
| 5,844,535 A | 12/1998 | Itoh et al. |
| 6,031,514 A | 2/2000 | Hashimoto et al. |
| 6,169,532 B1 | 1/2001 | Sumi et al. |
| 6,278,428 B1 | 8/2001 | Smith et al. |
| 6,294,274 B1 | 9/2001 | Kawazoe et al. |
| 6,452,579 B1 | 9/2002 | Itoh et al. |
| 6,563,174 B2 | 5/2003 | Kawasaki et al. |
| 6,683,591 B2 | 1/2004 | Hashimoto et al. |
| 6,727,522 B1 | 4/2004 | Kawasaki et al. |
| 6,795,066 B2 | 9/2004 | Tanaka et al. |
| 6,958,744 B2 | 10/2005 | Nakamura |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,126,595 B2 | 10/2006 | Yanagi et al. |
| 7,211,825 B2 | 5/2007 | Shih et al. |
| 7,282,782 B2 | 10/2007 | Hoffman et al. |
| 7,286,108 B2 | 10/2007 | Tsuda et al. |
| 7,297,977 B2 | 11/2007 | Hoffman et al. |
| 7,321,353 B2 | 1/2008 | Tsuda et al. |
| 7,323,356 B2 | 1/2008 | Hosono et al. |
| 7,365,725 B2 | 4/2008 | Nakayoshi et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,538,753 B2 | 5/2009 | Tanada |
| 7,674,650 B2 | 3/2010 | Akimoto et al. |
| 7,791,072 B2 | 9/2010 | Kumomi et al. |
| 7,791,074 B2 | 9/2010 | Iwasaki |
| 7,807,515 B2 | 10/2010 | Kato et al. |
| 7,852,305 B2 | 12/2010 | Tsai |
| 7,935,582 B2 | 5/2011 | Iwasaki |
| 7,956,361 B2 | 6/2011 | Iwasaki |
| 7,998,372 B2 | 8/2011 | Yano et al. |
| 8,154,024 B2 | 4/2012 | Iwasaki |
| 8,531,618 B2 | 9/2013 | Koyama et al. |
| 8,654,848 B2 | 2/2014 | Tian et al. |
| 8,828,844 B2 | 9/2014 | Ohnuma et al. |
| 8,854,286 B2 | 10/2014 | Yamazaki et al. |
| 8,879,635 B2 | 11/2014 | Raveendran et al. |
| 8,879,856 B2 | 11/2014 | Raveendran et al. |
| 8,879,857 B2 | 11/2014 | Raveendran et al. |
| 8,890,781 B2 | 11/2014 | Yamazaki et al. |
| 8,948,260 B2 | 2/2015 | Tian et al. |
| 9,007,336 B2 | 4/2015 | Shepelev et al. |
| 9,041,453 B2 | 5/2015 | Miyake et al. |
| 9,041,685 B2 | 5/2015 | Lillie et al. |
| 9,071,822 B2 | 6/2015 | Raveendran et al. |
| 9,088,776 B2 | 7/2015 | Raveendran et al. |
| 9,113,147 B2 | 8/2015 | Raveendran et al. |
| 9,131,164 B2 | 9/2015 | Tian et al. |
| 9,165,502 B2 | 10/2015 | Yamazaki et al. |
| 9,197,912 B2 | 11/2015 | Raveendran et al. |
| 9,324,301 B2 | 4/2016 | Shepelev et al. |
| 9,325,311 B1 | 4/2016 | Konoshita et al. |
| 9,330,632 B2 | 5/2016 | Shepelev et al. |
| 9,368,082 B2 | 6/2016 | Yamazaki et al. |
| 9,478,187 B2 | 10/2016 | Miyake et al. |
| 9,495,922 B2 | 11/2016 | Hirabayashi et al. |
| 9,576,557 B2 | 2/2017 | Lillie et al. |
| 9,576,558 B2 | 2/2017 | Shepelev et al. |
| 9,619,087 B2 | 4/2017 | Koga et al. |
| 9,685,135 B2 | 6/2017 | Hirabayashi et al. |
| 9,870,756 B2 | 1/2018 | Chen et al. |
| 9,934,748 B2 | 4/2018 | Hirabayashi et al. |
| 9,978,329 B2 | 5/2018 | Miyake et al. |
| 10,043,492 B2 | 8/2018 | Woo et al. |
| 10,606,384 B2 | 3/2020 | Koga et al. |
| 2001/0046027 A1 | 11/2001 | Tai et al. |
| 2002/0056838 A1 | 5/2002 | Ogawa |
| 2002/0084444 A1 | 7/2002 | Darius et al. |
| 2002/0132454 A1 | 9/2002 | Ohtsu et al. |
| 2002/0140685 A1 | 10/2002 | Yamamoto et al. |
| 2002/0190940 A1 | 12/2002 | Itoh et al. |
| 2003/0189401 A1 | 10/2003 | Kido et al. |
| 2003/0218222 A1 | 11/2003 | Wager, III et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2005/0219224 A1 | 10/2005 | Liebenow |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0197092 A1 | 9/2006 | Hoffman et al. |
| 2006/0228974 A1 | 10/2006 | Thelss et al. |
| 2006/0231882 A1 | 10/2006 | Kim et al. |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0075935 A1 | 4/2007 | Mesmer et al. |
| 2007/0090365 A1 | 4/2007 | Hayashi et al. |
| 2007/0152217 A1 | 7/2007 | Lai et al. |
| 2007/0171280 A1 | 7/2007 | Tian et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0206117 A1 | 9/2007 | Tian et al. |
| 2007/0222737 A1 | 9/2007 | Kimura |
| 2007/0252928 A1 | 11/2007 | Ito et al. |
| 2007/0272922 A1 | 11/2007 | Kim et al. |
| 2007/0287296 A1 | 12/2007 | Chang |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0050595 A1 | 2/2008 | Nakagawara et al. |
| 2008/0055218 A1 | 3/2008 | Tsuda et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0170029 A1* | 7/2008 | Kim .................. G09G 3/3266 345/100 |

(56) References Cited

U.S. PATENT DOCUMENTS

| | | |
|---|---|---|
| 2008/0182358 A1 | 7/2008 | Cowdery-Corvan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0284970 A1 | 11/2008 | Ishitani |
| 2008/0296568 A1 | 12/2008 | Ryu et al. |
| 2009/0006915 A1 | 1/2009 | Gomez et al. |
| 2009/0068773 A1 | 3/2009 | Lai et al. |
| 2009/0114910 A1 | 5/2009 | Chang |
| 2009/0117707 A1 | 5/2009 | Shimomura et al. |
| 2009/0152506 A1 | 6/2009 | Umeda et al. |
| 2009/0261325 A1 | 10/2009 | Kawamura et al. |
| 2009/0278122 A1 | 11/2009 | Hosono et al. |
| 2009/0280600 A1 | 11/2009 | Hosono et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2010/0110623 A1 | 5/2010 | Koyama et al. |
| 2010/0194450 A1 | 8/2010 | Shimizu et al. |
| 2010/0295042 A1 | 11/2010 | Yano et al. |
| 2011/0018857 A1 | 1/2011 | Lai et al. |
| 2011/0090183 A1 | 4/2011 | Yamazaki et al. |
| 2011/0090204 A1 | 4/2011 | Yamazaki et al. |
| 2011/0090207 A1 | 4/2011 | Yamazaki et al. |
| 2012/0133659 A1 | 5/2012 | Masnikosa et al. |
| 2013/0057511 A1 | 3/2013 | Shepelev et al. |
| 2013/0241814 A1 | 9/2013 | Hirabayashi et al. |
| 2013/0249779 A1 | 9/2013 | Harada et al. |
| 2013/0314361 A1 | 11/2013 | Saitoh et al. |
| 2014/0267156 A1 | 9/2014 | Koga et al. |
| 2014/0300399 A1* | 10/2014 | Miyake ............... G09G 3/3696 327/296 |
| 2015/0348487 A1 | 12/2015 | Zheng et al. |
| 2016/0049208 A1 | 2/2016 | Zheng et al. |
| 2016/0189683 A1* | 6/2016 | Chen ...................... G09G 5/18 345/99 |
| 2016/0259455 A1* | 9/2016 | Li ....................... G06F 3/04164 |
| 2016/0300546 A1* | 10/2016 | Zheng ................. G09G 3/2096 |
| 2016/0329033 A1 | 11/2016 | Woo et al. |
| 2016/0365042 A1 | 12/2016 | Zheng et al. |
| 2017/0115779 A1 | 4/2017 | Shepelev et al. |
| 2017/0186365 A1 | 6/2017 | Yoneda |
| 2017/0270882 A1 | 9/2017 | Mori et al. |

FOREIGN PATENT DOCUMENTS

| | | |
|---|---|---|
| CN | 105989812 A | 10/2016 |
| CN | 106128357 A | 11/2016 |
| JP | 2002-140052 A | 5/2002 |
| JP | 2002-207462 A | 7/2002 |
| JP | 2003-108095 A | 4/2003 |
| JP | 2004-205725 A | 7/2004 |
| JP | 2008-158439 A | 7/2008 |
| JP | 2011-141522 A | 7/2011 |
| JP | 2011-141524 A | 7/2011 |
| JP | 2013-168083 A | 8/2013 |
| JP | 2013-190719 A | 9/2013 |
| JP | 2013-195861 A | 9/2013 |
| JP | 2013-546025 | 12/2013 |
| JP | 2014-182203 A | 9/2014 |
| KR | 2004-0099649 A | 12/2004 |
| KR | 2016-0046965 A | 5/2016 |
| TW | 200839707 | 10/2008 |
| WO | WO 2008/088532 A2 | 7/2008 |
| WO | WO 2012/071647 A1 | 6/2012 |

OTHER PUBLICATIONS

Nomura, K. et al., "Room-Temperature Fabrication of Transparent Flexible Thin-Film Transistors Using Amorphous Oxide Semiconductors," Nature, Nov. 25, 2004, vol. 432, pp. 488-492.

Nomura, K. et al., "Thin-Film Transistor Fabricated in Single-Crystalline Transparent Oxide Semiconductor," Science, May 23, 2003, vol. 300, No. 5623, pp. 1269-1272.

* cited by examiner

FIG. 22A
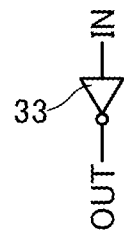
FIG. 22C
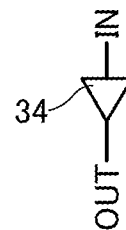
FIG. 22B
FIG. 22D
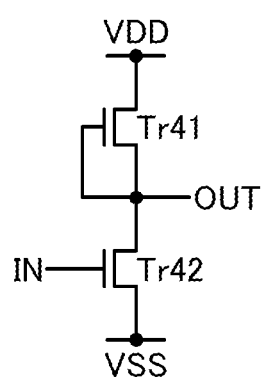
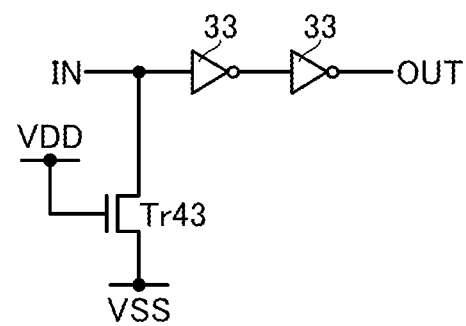
FIG. 22E
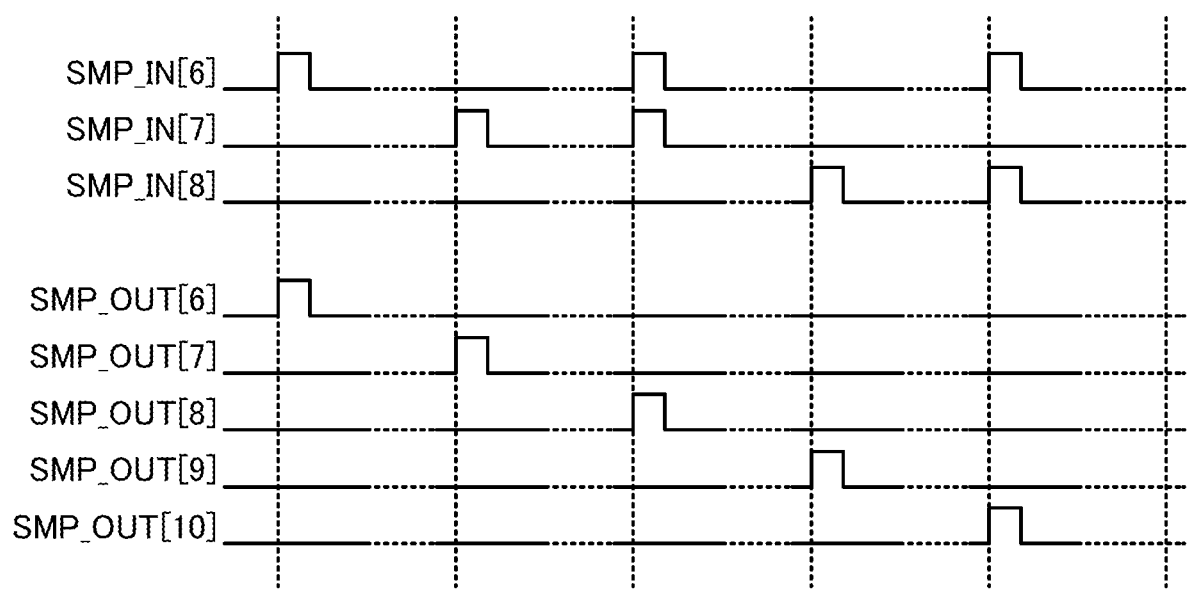

100A

100B

FIG. 33A1
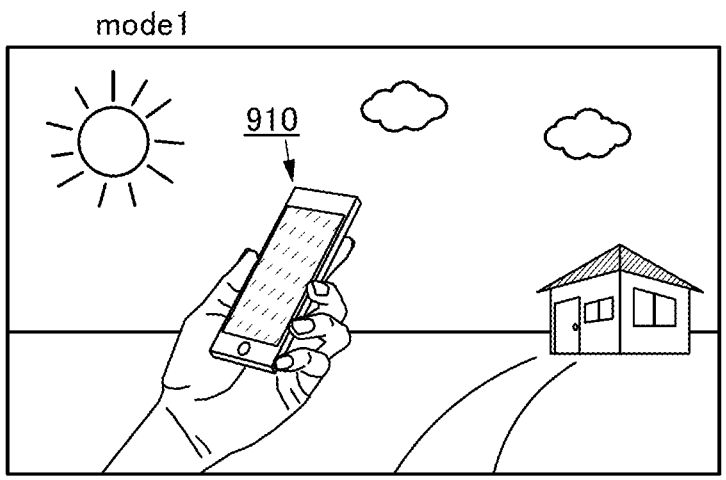
FIG. 33A2
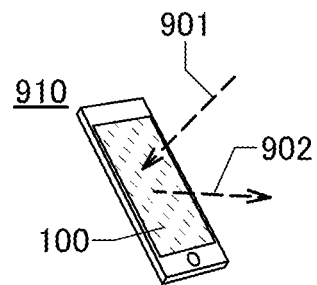
FIG. 33B1
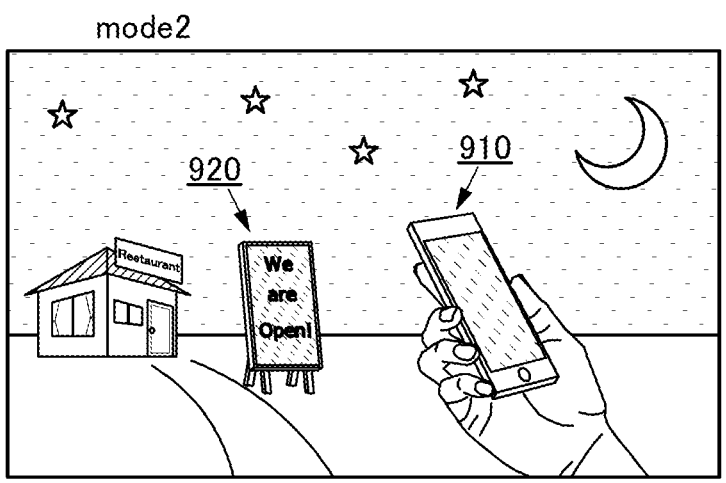
FIG. 33B2
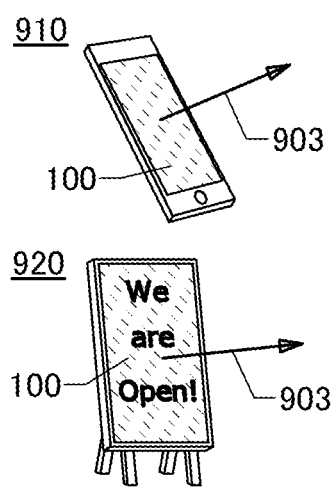
FIG. 33C1
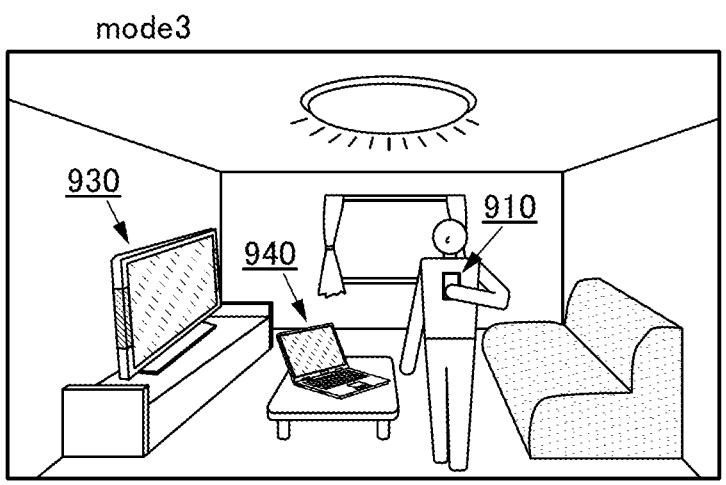
FIG. 33C2
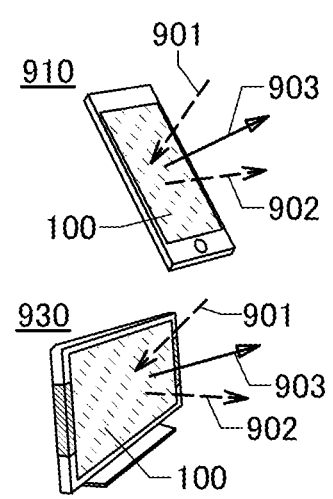

3200a

3200a

3200a

3200b

3200b

3200b

DISPLAY DEVICE AND OPERATING METHOD THEREOF

This application is a continuation of copending U.S. application Ser. No. 15/819,347, filed on Nov. 21, 2017 which is incorporated herein by reference.

BACKGROUND OF THE INVENTION

1. Field of the Invention

One embodiment of the present invention relates to a display device and a method for operating the display device. Furthermore, one embodiment of the present invention relates to a semiconductor device.

Note that one embodiment of the present invention is not limited to the above technical field. The technical field of the invention disclosed in this specification and the like relates to an object, a method, or a manufacturing method. Furthermore, one embodiment of the present invention relates to a process, a machine, manufacture, or a composition of matter.

Specifically, examples of the technical field of one embodiment of the present invention disclosed in this specification and the like include a display device, a semiconductor device, an electronic device, a method for driving any of them, and a method for manufacturing any of them. In this specification and the like, a semiconductor device generally means a device that can function by utilizing semiconductor characteristics. For example, an integrated circuit, a chip including an integrated circuit, an electronic component including a packaged chip, and an electronic device including an integrated circuit are examples of a semiconductor device.

2. Description of the Related Art

A display device in which a display unit and a touch sensor unit are combined is used. A sensing region of the touch sensor unit overlaps with a display region of the display unit, so that the display device displays an image on the display region and can obtain information of the position in the display region indicated by a user. The user performs input with a finger, a stylus, or the like.

A transistor including an oxide semiconductor can be used for a pixel of the display unit. A transistor including an oxide semiconductor exhibits an extremely low off-state current; hence, the frequency of refresh operations in displaying a still image with the display unit can be reduced. In this specification and the like, the technique for reducing the frequency of refresh operations is referred to as idling stop or IDS driving (Patent Document 1 and Patent Document 2). The IDS driving can reduce power consumption of the display unit.

PATENT DOCUMENT

[Patent Document 1] Japanese Published Patent Application No. 2011-141522
[Patent Document 2] Japanese Published Patent Application No. 2011-141524

SUMMARY OF THE INVENTION

Although the frequency of display image rewriting by the display unit is generally about 60 times per second (in other words, the frame frequency is 60 Hz), sensing operation by the touch sensor unit needs to be performed 80 times or more per second, preferably 100 times or more per second because smooth input such as handwriting input is required for the touch sensor unit.

In the case where the touch sensor unit performs sensing operation at the time when the display unit rewrites a display image, the sensing accuracy of the touch sensor unit deteriorates by the influence of noise. An object of one embodiment of the present invention is to provide a display device that achieves both high sensing accuracy of the touch sensor unit and smooth input using the touch sensor unit.

An object of one embodiment of the present invention is to provide a novel display device. Another object of one embodiment of the present invention is to provide a novel driving method that achieves both high sensing accuracy of the touch sensor unit and smooth input using the touch sensor unit. Another object of one embodiment of the present invention is to provide an electronic device including the novel display device.

Note that one embodiment of the present invention does not necessarily achieve all the objects listed above and only needs to achieve at least one of the objects. The description of the above objects does not preclude the existence of other objects. Other objects will be apparent from and can be derived from the description of the specification, the drawings, the claims, and the like.

One embodiment of the present invention is a display device including a pixel array and a gate driver. The gate driver has a function of separately driving first to N-th pixel groups (N is an integer greater than or equal to 2) in the pixel array. The gate driver includes first to N-th shift registers. The K-th shift register (K is an integer greater than or equal to 1 and less than or equal to N) generates a signal for driving the K-th pixel group. First to M-th clocks (M is an integer greater than or equal to 1) and first to L-th signals (L is an integer greater than or equal to 1) are input to the gate driver. The gate driver supplies a clock and a start pulse to each of the first to N-th shift registers with the use of the first to M-th clocks and the first to L-th signals. L is less than or equal to N/M+1.

One embodiment of the present invention is the display device according to the above embodiment further including a touch sensor unit. The touch sensor unit senses a touch during a period in which the first to N-th shift registers are stopped.

One embodiment of the present invention is the display device according to the above embodiment further including an application processor. The application processor has a function of supplying the first to M-th clocks and the first to L-th signals to the gate driver. The application processor determines whether a displayed image is changed or not in each of the first to N-th pixel groups. The application processor has a function of rewriting a displayed image in a pixel group having the change with the use of the first to M-th clocks and the first to L-th signals, and has a function of not rewriting a displayed image in a pixel group not having the change.

In the above embodiment, the pixel array includes a transistor including a metal oxide in its channel formation region.

In the above embodiment, the gate driver includes a transistor including a metal oxide in its channel formation region.

One embodiment of the present invention can provide a novel display device. Another embodiment of the present invention can provide a display device that achieves both high sensing accuracy of a touch sensor unit and smooth input using the touch sensor unit. Another embodiment of the present invention can provide a display device that achieves both high sensing accuracy of a touch sensor unit and smooth input using the touch sensor unit with a small number of signals. Another embodiment of the present invention can provide a display device with low power consumption.

Another embodiment of the present invention can provide a novel driving method that achieves both high sensing accuracy of a touch sensor unit and smooth input using the touch sensor unit. Another embodiment of the present invention can provide an electronic device including the novel display device.

Note that the effects of one embodiment of the present invention are not limited to the effects listed above. The effects listed above do not preclude the existence of other effects. The other effects are the ones that are not described above and will be described below. The other effects will be apparent from and can be derived from the description of the specification, the drawings, and the like by those skilled in the art. One embodiment of the present invention has at least one of the effects listed above and the other effects. Accordingly, one embodiment of the present invention does not have the effects listed above in some cases.

BRIEF DESCRIPTION OF THE DRAWINGS

In the accompanying drawings:

FIGS. 22A and 22B are circuit diagrams illustrating a configuration example of an inverter, FIGS. 22C and 22D are circuit diagrams illustrating a configuration example of a driver, and FIG. 22E is a timing chart for a decoder;

FIGS. 33A1, 33A2, 33B1, 33B2, 33C1, and 33C2 illustrate usage examples of electronic devices in various display modes;

DETAILED DESCRIPTION OF THE INVENTION

Figure 1:
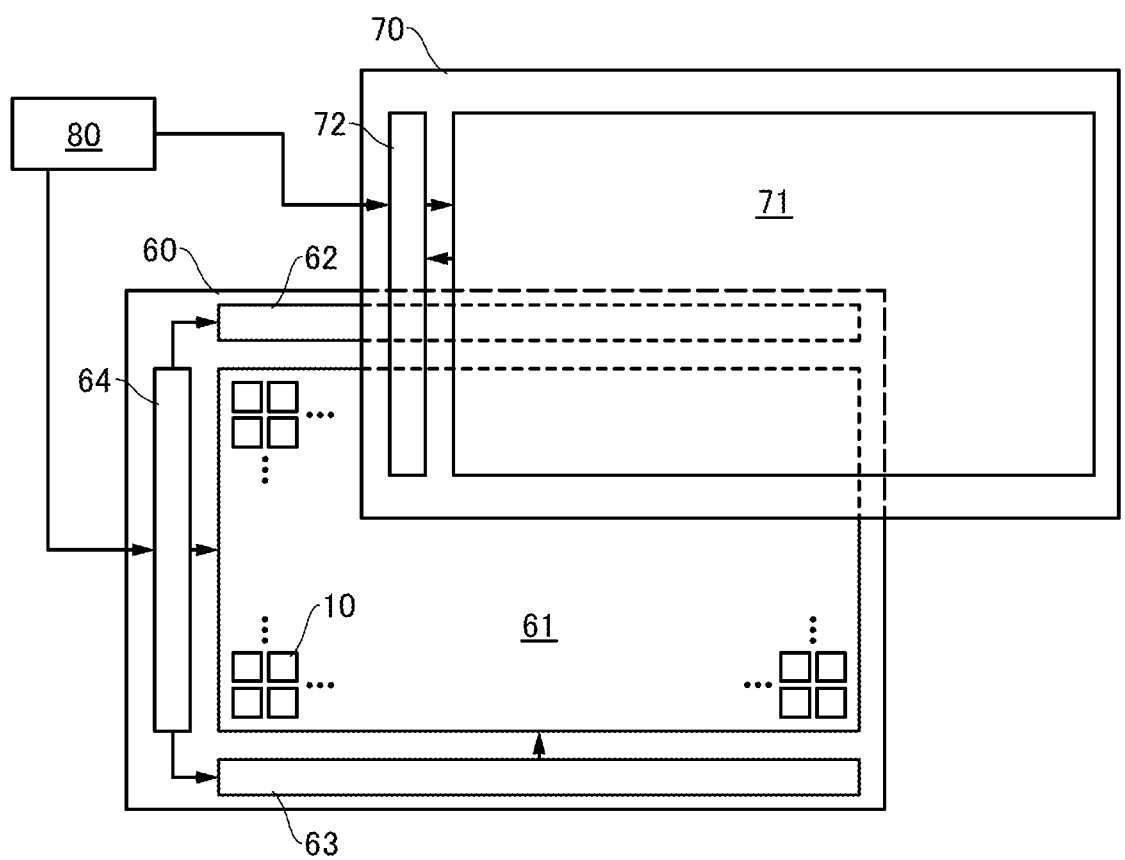
FIG. 1 is a block diagram illustrating a structure example of a display device.

Hereinafter, embodiments will be described with reference to drawings. However, the embodiments can be implemented with various modes. It will be readily appreciated by those skilled in the art that modes and details can be changed in various ways without departing from the spirit and scope of the present invention. Thus, the present invention should not be interpreted as being limited to the following description of the embodiments. Any of the embodiments described below can be combined as appropriate.

A display device described in an embodiment includes a display unit, a touch sensor unit, and the like. Therefore, the display device is also referred to as a semiconductor device, an electronic device, or the like in some cases.

In the drawings and the like, the size, the layer thickness, the region, or the like is sometimes exaggerated for clarity, and thus is not limited to the illustrated scale. Note that drawings are schematic views of ideal examples, and the embodiments of the present invention are not limited to the shape, the value, or the like illustrated in the drawings.

In the drawings and the like, the same elements, elements having similar functions, elements formed of the same material, elements formed at the same time, and the like are sometimes denoted by the same reference numerals, and the description thereof is not repeated in some cases.

In this specification and the like, the terms "film" and "layer" can be interchanged with each other. For example, the term "conductive layer" can be changed into the term "conductive film" in some cases. Also, the term "insulating film" can be changed into the term "insulating layer" in some cases.

In this specification and the like, the terms for describing arrangement such as "over" and "under" do not necessarily mean "directly over" and "directly under", respectively, in the description of a physical relationship between components. For example, the expression "a gate electrode over a gate insulating layer" can mean the case where there is an additional component between the gate insulating layer and the gate electrode.

In this specification and the like, the term "parallel" indicates that the angle formed between two straight lines is greater than or equal to −10° and less than or equal to 10°, and accordingly also includes the case where the angle is greater than or equal to −5° and less than or equal to 5°. The term "perpendicular" indicates that the angle formed between two straight lines is greater than or equal to 80° and less than or equal to 100°, and accordingly also includes the case where the angle is greater than or equal to 85° and less than or equal to 95°.

In this specification and the like, ordinal numbers such as "first", "second", and "third" are used in order to avoid confusion among components, and the terms do not limit the components numerically.

In this specification and the like, the term "electrically connected" includes the case where components are connected through an object having any electric function. There is no particular limitation on the "object having any electric function" as long as electric signals can be transmitted and received between components that are connected through the object. Examples of the "object having any electric function" are a switching element such as a transistor, a resistor, an inductor, a capacitor, and elements with a variety of functions as well as an electrode and a wiring.

In this specification and the like, the term "voltage" often refers to a difference between a given potential and a reference potential (e.g., a ground potential). Accordingly, voltage, potential, and potential difference can also be referred to as potential, voltage, and voltage difference, respectively.

In this specification and the like, a transistor is an element having at least three terminals: a gate, a drain, and a source. The transistor has a channel region between a drain (a drain terminal, a drain region, or a drain electrode) and a source (a source terminal, a source region, or a source electrode), and current can flow between the source and the drain through the channel region. Note that in this specification and the like, a channel region refers to a region through which current mainly flows.

Furthermore, functions of a source and a drain might be switched when a transistor of opposite polarity is employed or a direction of current flow is changed in circuit operation, for example. Therefore, the terms "source" and "drain" can be switched in this specification and the like.

Unless otherwise specified, off-state current in this specification and the like refers to drain current of a transistor in an off state (also referred to as a non-conducting state and a cutoff state). Unless otherwise specified, the off state of an n-channel transistor means that a gate voltage with respect to a source voltage ($V_{gs}$) is lower than the threshold voltage ($V_{th}$), and the off state of a p-channel transistor means that $V_{gs}$ is higher than $V_{th}$. That is, the off-state current of an n-channel transistor sometimes refers to a drain current that flows when the gate voltage $V_{gs}$ with respect to the source voltage is lower than the threshold voltage $V_{th}$.

In the above description of off-state current, a drain may be replaced with a source. That is, the off-state current sometimes refers to current that flows through a source of a transistor in the off state.

In this specification and the like, the term "leakage current" sometimes expresses the same meaning as "off-state current". In this specification and the like, the off-state current sometimes refers to a current that flows between a source and a drain when a transistor is in the off state.

In this specification and the like, a metal oxide means an oxide of metal in a broad sense. Metal oxides are classified into an oxide insulator, an oxide conductor (including a transparent oxide conductor), an oxide semiconductor (also simply referred to as OS), and the like. For example, a metal oxide used in an active layer of a transistor is called an oxide semiconductor in some cases. That is, a metal oxide that has at least one of an amplifying function, a rectifying function, and a switching function can be called a metal oxide semiconductor, or OS for short. An OS transistor or an OS FET refers to a transistor including a metal oxide or an oxide semiconductor.

Embodiment 1

In this embodiment, a display device including a display unit and a touch sensor unit is described. In particular, a gate driver included in the display unit and a relationship between display image rewriting by the display unit and sensing operation (touch sensing) by the touch sensor unit are described.

«Display Device»

FIG. 1 is a block diagram illustrating a structure example of a display device. A display device 100 includes a display unit 60, a touch sensor unit 70, and an application processor 80.

<Display Unit>

The display unit 60 includes a pixel array 61, a gate driver 62, a gate driver 63, and a source driver IC 64.

The pixel array 61 includes a plurality of pixels 10. Each of the pixels 10 is an active element driven by a transistor. The pixel array 61 has a function of forming a display region of the display unit 60 and displaying an image. A more specific structure example of the pixel array 61 is described in Embodiment 4.

The gate driver 62 and the gate driver 63 (hereinafter, referred to as gate drivers 62 and 63) have a function of driving a gate line for selecting the pixel 10. Either the gate driver 62 or the gate driver 63 is not necessarily provided. Although FIG. 1 illustrates an example in which the gate drivers 62 and 63 are provided together with the pixel array 61 over the same substrate, the gate drivers 62 and 63 can be dedicated ICs.

The source driver IC 64 has a function of driving a source line supplying a data signal to the pixel 10. Although the source driver IC 64 is mounted by a chip on glass (COG) method here, there is no particular limitation on the mounting method, and a chip on flexible (COF) method, a tape automated bonding (TAB) method, or the like may be employed. The same applies to a method for mounting the IC on the touch sensor unit 70 described later.

A transistor used for the pixel 10 is an OS transistor, which has a lower off-state current than a Si transistor.

The OS transistor preferably includes a metal oxide in a channel formation region. The metal oxide used for the OS transistor preferably contains at least one of indium (In) and zinc (Zn).

Typical examples of such oxide include In-M-Zn oxide, In-M oxide, Zn-M oxide, and In—Zn oxide (the element M is aluminum (Al), gallium (Ga), yttrium (Y), tin (Sn), boron (B), silicon (Si), titanium (Ti), iron (Fe), nickel (Ni), germanium (Ge), zirconium (Zr), molybdenum (Mo), lanthanum (La), cerium (Ce), neodymium (Nd), vanadium (V), beryllium (Be), hafnium (Hf), tantalum (Ta), or tungsten (W), for example).

The off-state current per channel width of 1 μm of an OS transistor can be low and approximately from 1 yA/μm (y: yocto, $10^{-24}$) to 1 zA/μm (z: zepto, $10^{-21}$).

A cloud-aligned composite oxide semiconductor (CAC-OS) is preferably used for an OS transistor. Note that the details of the CAC-OS will be described in Embodiment 6.

The transistor used for the pixel 10 is not necessarily an OS transistor as long as its off-state current is low. For example, a transistor including a wide-bandgap semiconductor may be used. In some cases, the wide-bandgap semiconductor refers to a semiconductor with a bandgap of 2.2 eV or greater. Examples of the wide-bandgap semiconductor include silicon carbide, gallium nitride, and diamond.

By using the transistor having a low off-state current for the pixel 10, the gate drivers 62 and 63 and the source driver IC 64 can be temporarily stopped (the temporary stop is referred to as idling stop or IDS driving, as described above) in the case where display image rewriting by the display unit 60 is not necessary, that is, a still image is displayed.

<Touch Sensor Unit>

The touch sensor unit 70 illustrated in FIG. 1 includes a sensor array 71 and a touch sensor IC 72.

The sensor array 71 forms a region where the touch sensor unit 70 can sense a touch and a user of the display device 100 performs input on this region with a finger, a stylus, or the like. The sensor array 71 is provided in a region overlapping with the pixel array 61. The display device 100 displays an image on the display region of the display unit 60 and can obtain information of the position in the display region indicated by the user.

Figure 2:
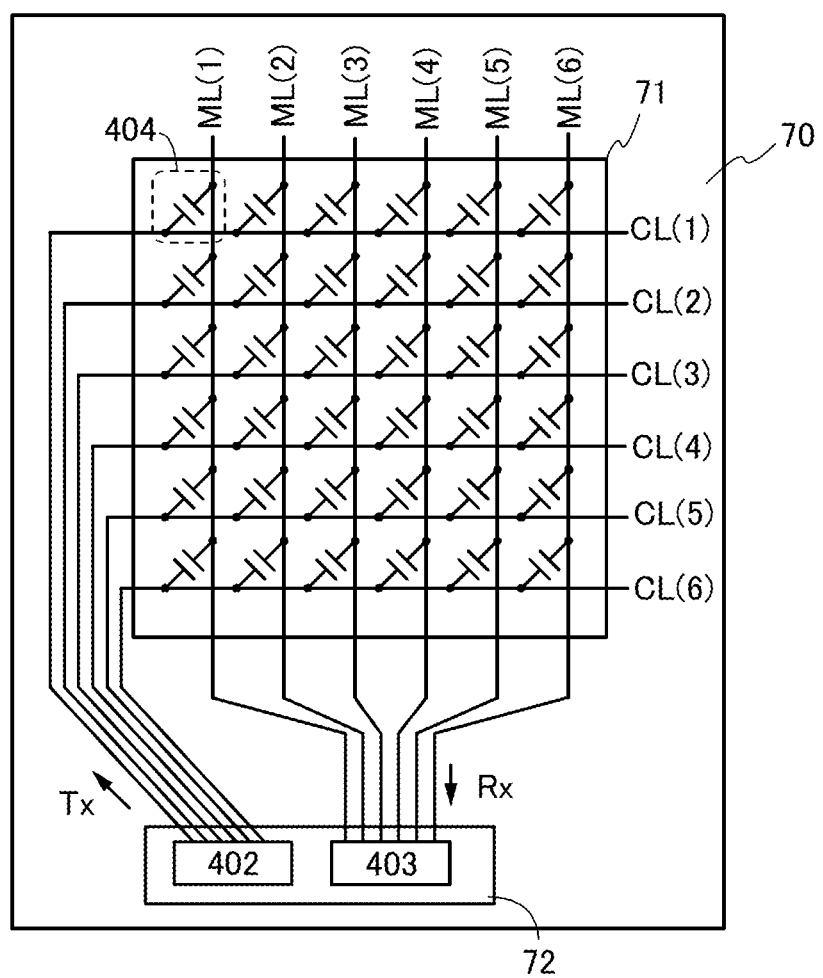
FIG. 2 is a block diagram illustrating a structure example of a touch sensor unit.

FIG. 2 is a block diagram illustrating a structure example of the touch sensor unit 70. Here, an example in which the touch sensor unit 70 is a projected capacitive (mutual capacitive) touch sensor unit is illustrated.

The sensor array 71 includes wirings CL, wirings ML, and a plurality of capacitors 404. The capacitors 404 are formed by the wirings CL and ML overlapping with each other or the wirings CL and ML provided close to each other.

In FIG. 2, as an example, six wirings CL(1) to CL(6) represent the wirings CL, and six wirings ML(1) to ML(6) represent the wirings ML; however, the number of wirings is not limited thereto. The wirings CL are each supplied with a pulse voltage and the wirings ML each sense changes in current.

When proximity or contact of an object (e.g., a finger or a stylus) to the sensor array 71 is sensed, the capacitance value of the capacitor 404 is changed and the touch sensor unit 70 senses a touch.

The sensor array 71 is electrically connected to the touch sensor IC 72 through the wirings CL and ML. The touch sensor IC 72 includes a driver circuit 402 and a sensing circuit 403.

The driver circuit 402 is electrically connected to the sensor array 71 through the wiring CL. The driver circuit 402 has a function of outputting a signal Tx. As the driver circuit 402, a shift register circuit and a buffer circuit can be used in combination, for example.

The sensing circuit 403 is electrically connected to the sensor array 71 through the wiring ML. The sensing circuit 403 senses a touch on the touch sensor unit 70 by sensing a signal Rx. The sensing circuit 403 can include an amplifier circuit and an analog-digital converter (ADC), for example. The sensing circuit 403 has a function of converting an analog signal output from the sensor array 71 into a digital signal and outputting the digital signal to the application processor 80.

Note that a more specific structure example of the touch sensor unit 70 is described in Embodiment 2.

<Application Processor>

The application processor 80 is electrically connected to the source driver IC 64 and the touch sensor IC 72.

The application processor 80 has a function of supplying image data to be displayed on the display unit 60 to the source driver IC 64. The application processor 80 has a function of calculating a change between image data displayed on the display unit 60 at present and image data displayed next.

The application processor 80 has a function of giving an instruction on the time at which the display unit 60 rewrites a display image and the time at which the touch sensor unit 70 performs sensing operation. The data of the time at which the display unit 60 rewrites a display image is transmitted from the application processor 80 to the source driver IC 64, and the source driver IC 64 has a function of controlling operation of the gate drivers 62 and 63. The data of the time at which the touch sensor unit 70 performs sensing operation is transmitted from the application processor 80 to the touch sensor IC 72.

In the block diagram illustrated in FIG. 1, signals for driving the gate drivers 62 and 63 are not necessarily supplied through the source driver IC 64. A block diagram in that case is illustrated in FIG. 3.

Figure 3:
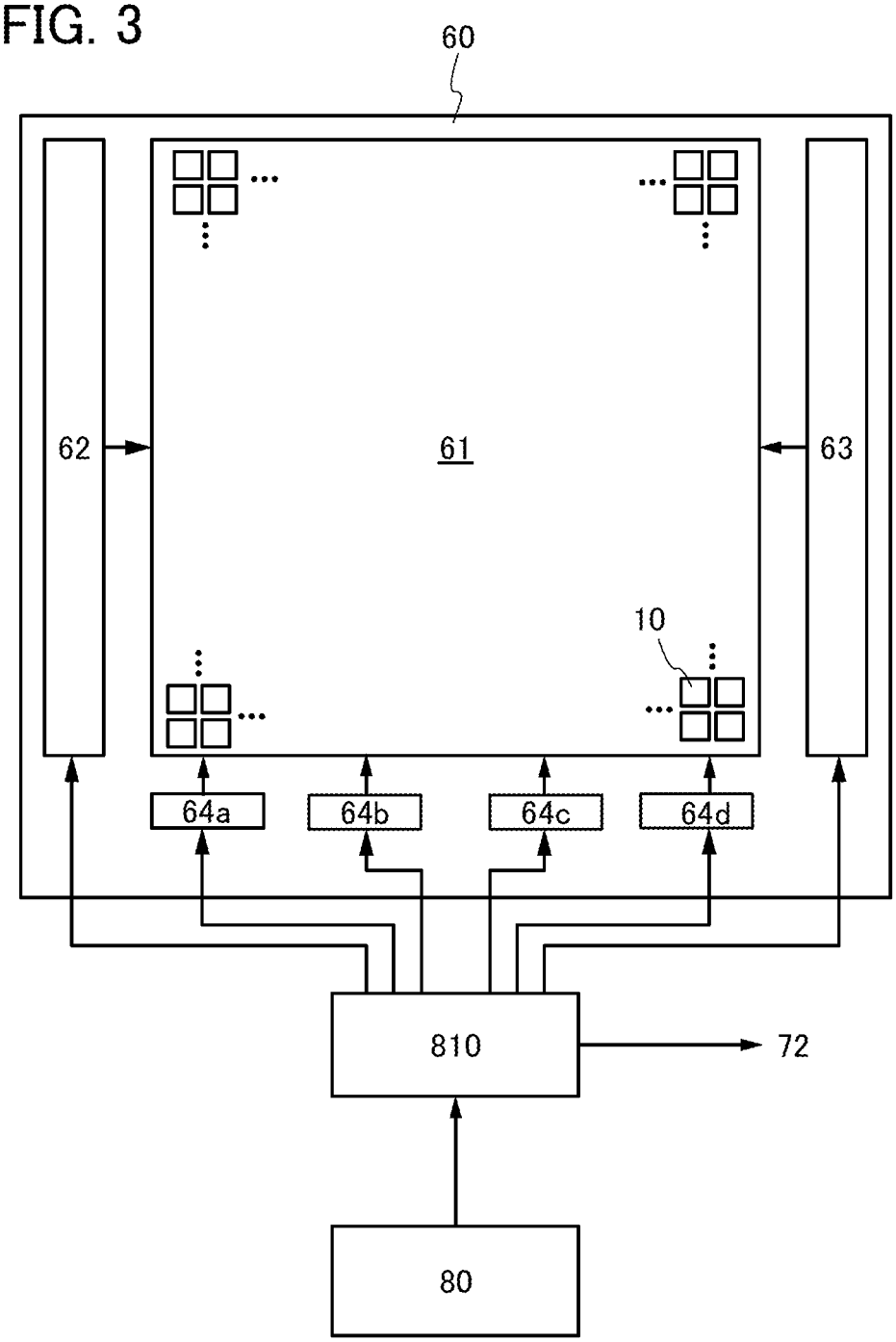
FIG. 3 is a block diagram illustrating a structure example of a display device.

In FIG. 3, the application processor 80 supplies signals to source driver ICs 64*a* to 64*d* and the gate drivers 62 and 63 through a timing controller 810. The timing controller 810 may be included in the application processor 80.

The structure illustrated in FIG. 3 includes a plurality of source driver ICs. The number of source driver ICs may be set according to the number of pixels of the pixel array 61.

In the structure illustrated in FIG. 3, the number of pixels of the pixel array 61 is preferably larger, for example, 4K (3840×2160) or 8K (7680×4320). A plurality of source driver ICs are provided and a circuit provided outside the source driver ICs has a function of controlling a gate driver, so that the number of terminals of the source driver ICs can be reduced. In the case where the number of the terminals of the source driver ICs is large, a large amount of force is applied to the source driver ICs when the source driver ICs are crimped to a substrate, which leads to damage to the source driver ICs. Accordingly, the structure illustrated in FIG. 3 can prevent the source driver ICs from being damaged.

<Pixel Array>

Figure 4:
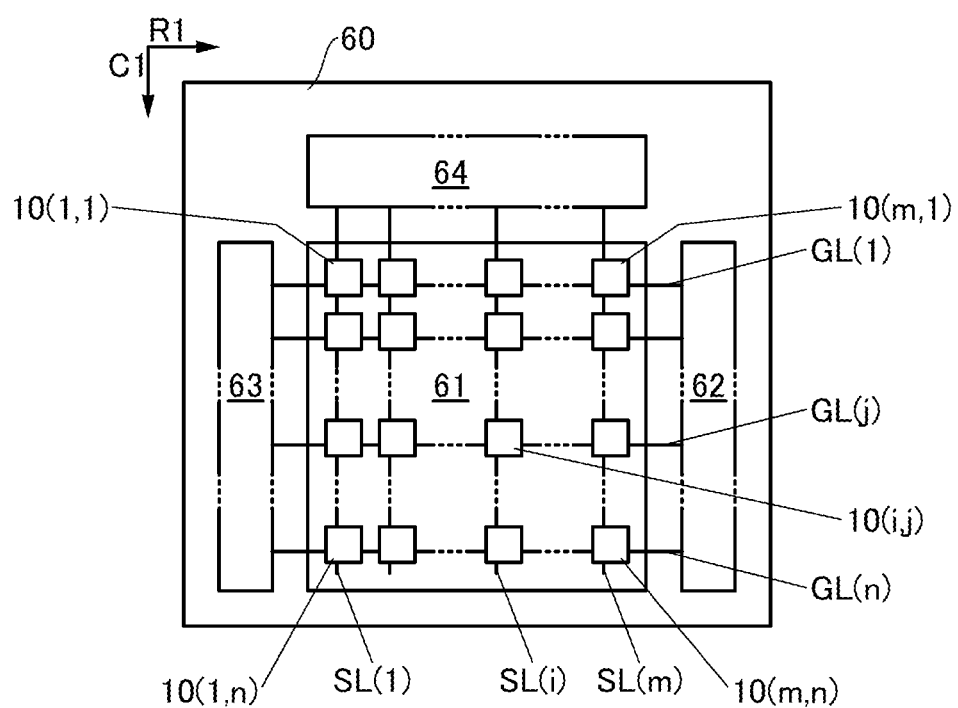
FIG. 4 is a block diagram illustrating a structure example of a display unit.

FIG. 4 is a block diagram illustrating a structure example of the display unit 60.

The pixel array 61 includes pixels 10(1,1) to 10(*m*,*n*), source lines SL(1) to SL(m), and gate lines GL(1) to GL(n). Note that m and n are each an integer greater than or equal to 1, i is an integer greater than or equal to 1 and less than or equal to m, and j is an integer greater than or equal to 1 and less than or equal to n. In FIG. 4, a constant potential line and the like for forming a power source line or a capacitor are omitted.

The gate drivers 62 and 63 are electrically connected to the pixel array 61 through the gate lines GL(1) to GL(n) and the source driver IC 64 is electrically connected to the pixel array 61 through the source lines SL(1) to SL(m).

A group of pixels 10(1,1) to 10(i,n) arranged in the direction indicated by an arrow C1 are electrically connected to the source line SL(i), and a group of pixels 10(1,j) to 10(m,j) arranged in the direction indicated by an arrow R1 are electrically connected to the gate line GL(j).

The gate drivers 62 and 63 drive the gate line GL(j) to select the pixels 10(1,j) to 10(m,j). The source driver IC 64 supplies image data supplied from the application processor 80 as a data signal to the pixels 10(1,j) to 10(m,j) through the source lines SL(1) to SL(m). By repeating this operation from the gate line GL(1) to the gate line GL(n), the display unit 60 can display an image on the pixel array 61.

Various display elements such as a liquid crystal, electronic paper, an organic electroluminescence (EL), and a quantum-dot light-emitting diode (QLED) can be used for the pixel 10. Alternatively, for example, a hybrid element in which a liquid crystal element that can be used as a reflective element and an organic EL element that can be used as a light-emitting element are combined can be used for the pixel 10.

Alternatively, for example, a hybrid element in which a liquid crystal element that can be used as a reflective element is combined with a transmissive liquid crystal element in which a light source (e.g., an LED) and a liquid crystal are combined can be used for the pixel 10.

<Gate Driver>

Figure 5:
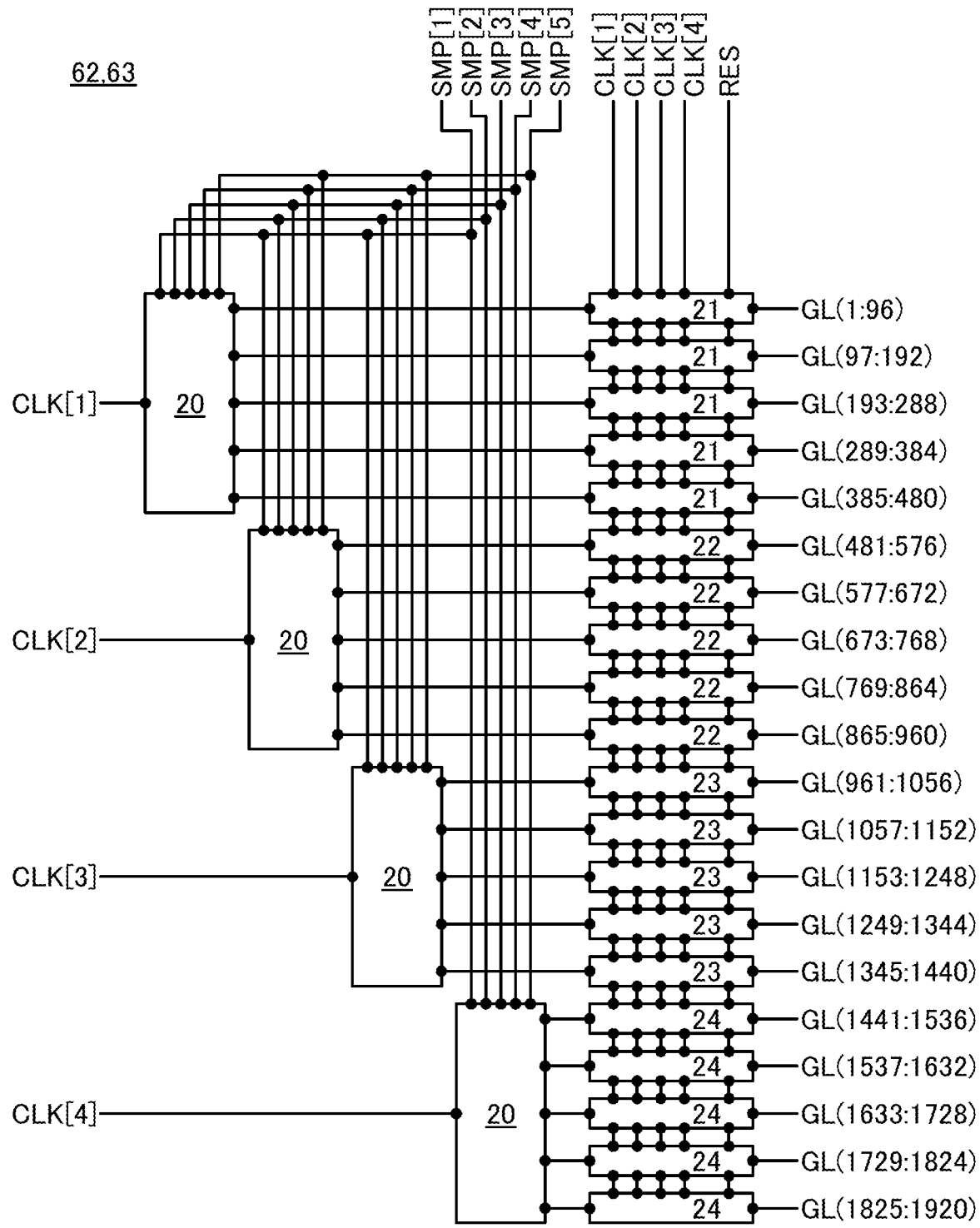
FIG. 5 is a circuit diagram illustrating a configuration example of gate drivers.

FIG. 5 is a circuit diagram illustrating a structure example of the gate driver that can be used as the gate drivers 62 and 63.

The gate drivers 62 and 63 have a function of separately driving a plurality of regions in the display region of the display unit 60. That is, the gate drivers 62 and 63 have a function of separately driving a plurality of pixel groups in the pixel array 61. The gate drivers 62 and 63 include first to N-th shift registers. The K-th shift register (K is an integer greater than or equal to 1 and less than or equal to N) generates a signal for driving the K-th pixel group. First to M-th clock signals (M is an integer greater than or equal to 1) and first to L-th sampling signals (L is an integer greater than or equal to 1) are input to the gate drivers 62 and 63. The gate drivers supply a clock signal and a start pulse to each of the first to N-th shift registers with the use of the first to M-th clock signals and the first to L-th sampling signals.

The number L of sampling signals input to the gate drivers is less than or equal to N/M+1. Note that when the number N of shift registers is divisible by the number M of clock signals, the number L of sampling signals input to the gate drivers is N/M Here, the case where the number N of shift registers is indivisible by the number M of clock signals is assumed; therefore, the number L of sampling signals input to the gate drivers is less than or equal to N/M+1. As a result, the number of signals supplied to the gate drivers can be reduced, leading to a reduction in noise due to the supply of the signals. In addition, the sizes of the source driver IC 64 and the application processor 80 that control the operation of the gate drivers 62 and 63 can be reduced, leading to a reduction in costs of the display device 100.

In this embodiment, an example in which in FIG. 4, n is set to 1920, m is set to 1080, and 20 regions into which the pixel array 61 is divided in the direction indicated by the arrow C1 are separately driven is described for easy understanding. There are 20 uniform regions each including 96×1080 pixels 10.

The gate drivers 62 and 63 in FIG. 5 each include four demultiplexers 20 and shift registers 21 to 24. Note that the number of each of the shift registers 21 to 24 is five. Clock signals CLK[1] to CLK[4], a reset signal RES, and sampling signals SMP[1] to SMP[5] are input from the outside. The gate drivers 62 and 63 are electrically connected to the above-described gate lines GL(1) to GL(1920).

The shift registers 21 to 24 are each electrically connected to 96 gate lines GL to drive the gate lines GL. Note that "GL(1:96)" in FIG. 5 means the gate lines GL(1) to GL(96).

The clock signals CLK[1] to CLK[4], the reset signal RES, and start pulses are input to the shift registers 21 to 24. Note that the demultiplexers 20 generate the start pulses. Since the gate drivers 62 and 63 include 20 shift registers 21 to 24, the demultiplexers 20 generate 20 start pulses in total.

The sampling signals SMP[1] to SMP[5] and any of the clock signals CLK[1] to CLK[4] are input to each of the demultiplexers 20. The demultiplexers 20 output the start pulses to the shift registers 21 to 24. The demultiplexers 20 generate 20 start pulses in total; however, with the use of the clock signals CLK[1] to CLK[4] also input to the shift registers 21 to 24, the number of signals required for the gate drivers 62 and 63 can be reduced.

That is, the demultiplexers 20 generate 20 start pulses with the use of the four clock signals CLK[1] to CLK[4] and the five sampling signals SMP[1] to SMP[5]. Note that in this embodiment, the case where the number of regions (20) is divisible by the number of clock signals CLK (4) is described. When the number of regions is indivisible by the number of clock signals, for example, the sampling signal SMP is additionally needed in some cases.

Figure 6A:
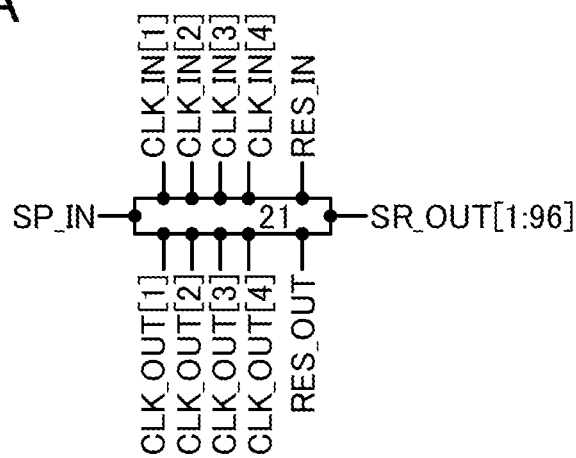
FIGS. 6A and 6B are circuit diagrams illustrating a configuration example of a shift register.
Figure 6B:
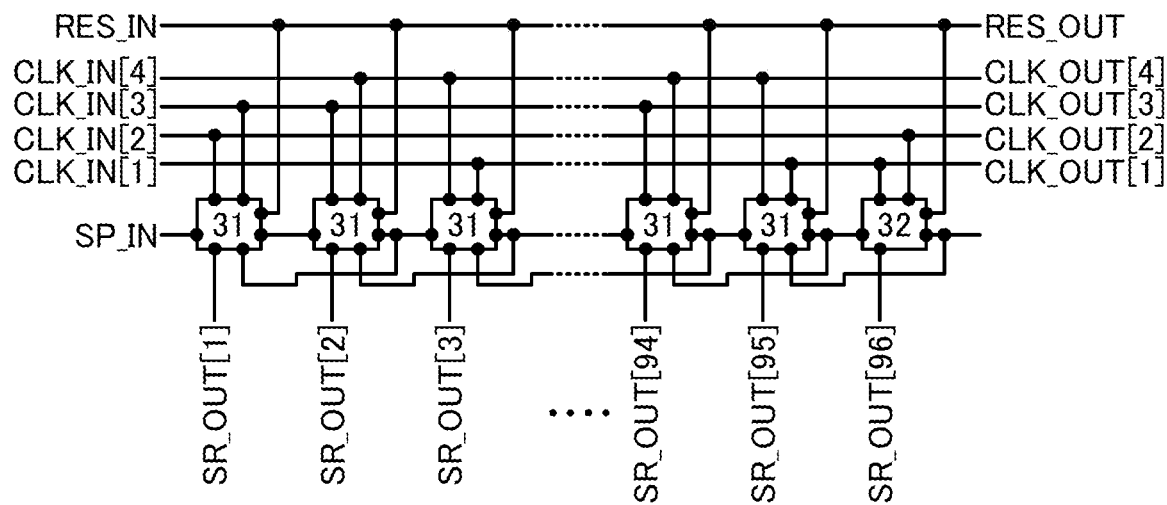
Figure 7A:
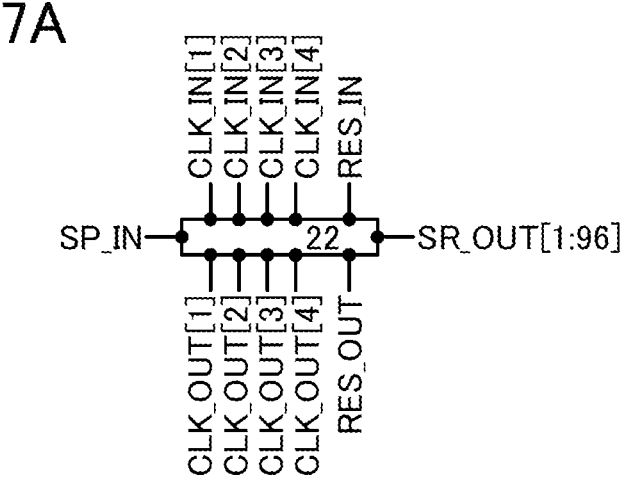
FIGS. 7A and 7B are circuit diagrams illustrating a configuration example of a shift register.
Figure 7B:
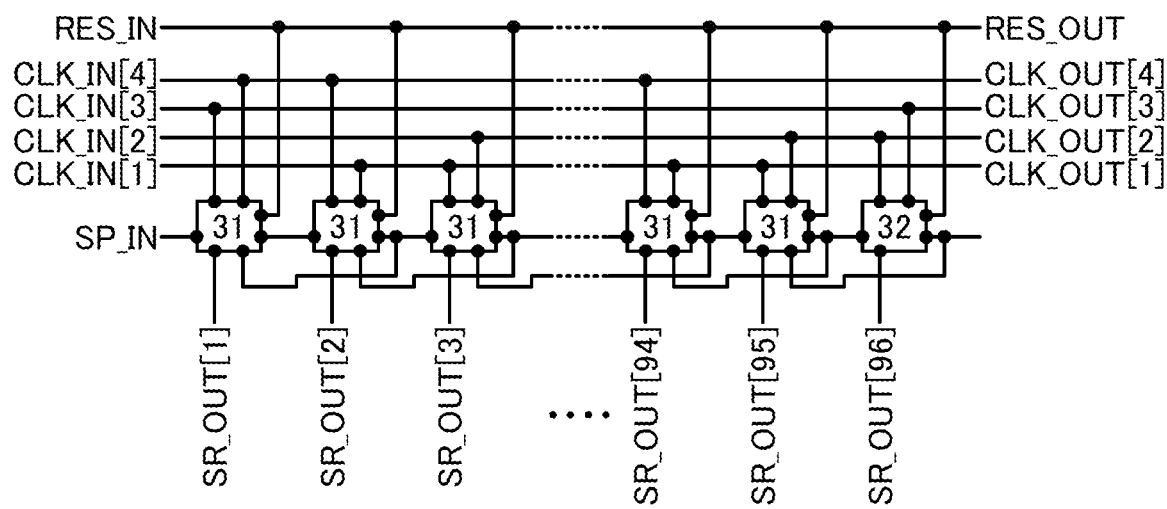
Figure 8A:
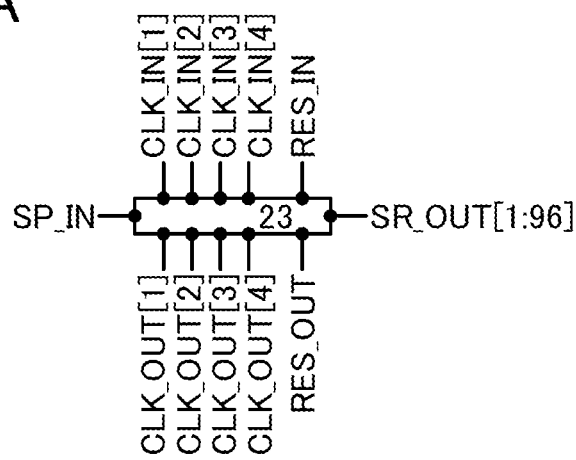
FIGS. 8A and 8B are circuit diagrams illustrating a configuration example of a shift register.
Figure 8B:
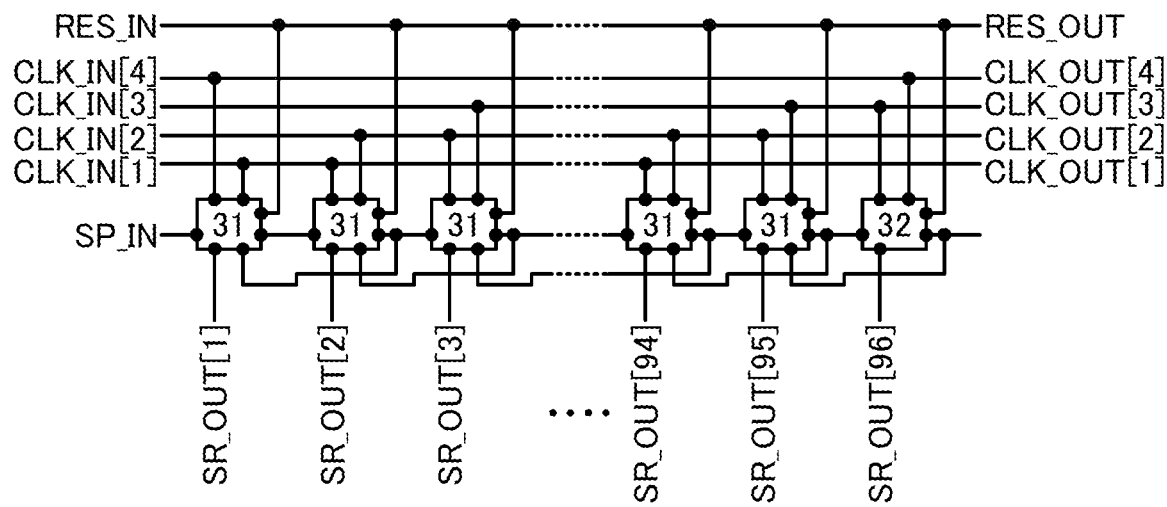
Figure 9A:
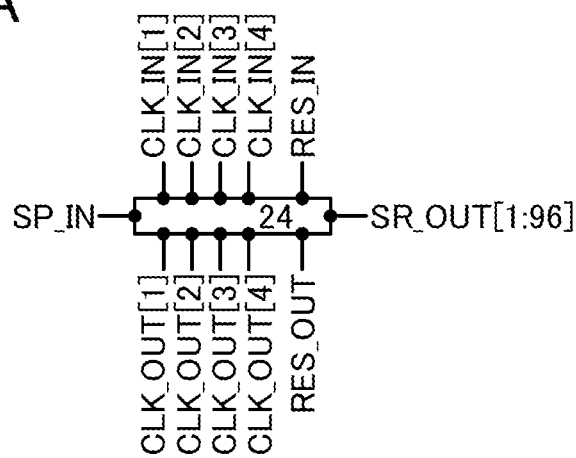
FIGS. 9A and 9B are circuit diagrams illustrating a configuration example of a shift register.
Figure 9B:
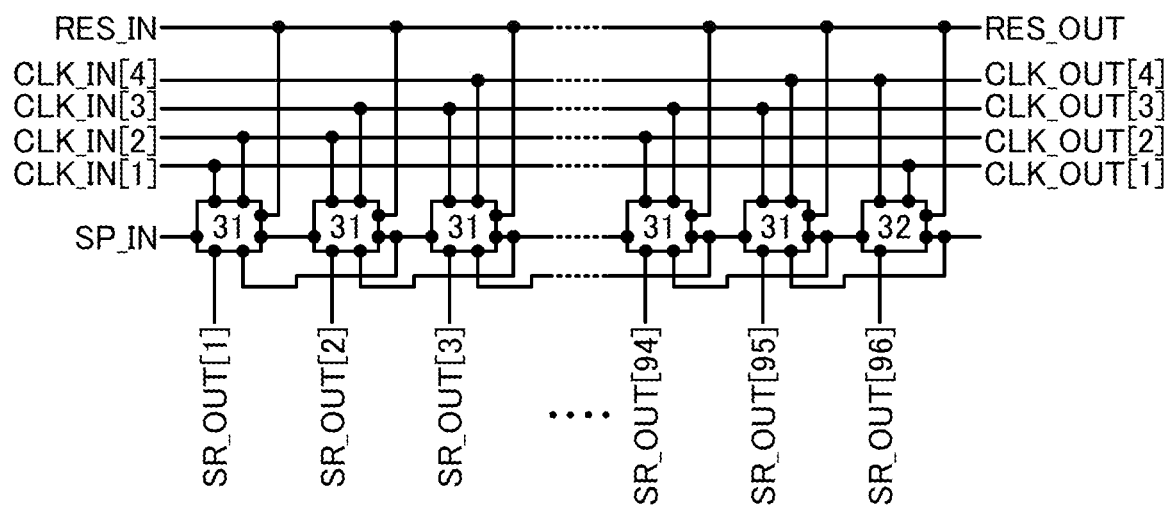

FIGS. 6A and 6B, FIGS. 7A and 7B, FIGS. 8A and 8B, and FIGS. 9A and 9B are each a circuit diagram illustrating a configuration example of the shift register. FIGS. 6A and 6B illustrate a configuration example of the shift register 21. FIGS. 7A and 7B illustrate a configuration example of the shift register 22. FIGS. 8A and 8B illustrate a configuration example of the shift register 23. FIGS. 9A and 9B illustrate a configuration example of the shift register 24.

FIG. 6A shows a symbol of the shift register 21 and illustrates input and output of the shift register 21. The shift register 21 includes input terminals CLK_IN[1] to CLK_IN[4], RES_IN, and SP_IN and output terminals CLK_OUT[1] to CLK_OUT[4], RES_OUT, and SR_OUT[1:96]. The start pulse is input to the input terminal SP_IN, and signals are output from the output terminals SR_OUT[1:96] to 96 gate lines GL.

FIG. 6B is a circuit diagram corresponding to the symbol of the shift register 21. The shift register 21 includes 95 registers 31 and a register 32. The 95 registers 31 and the register 32 are each electrically connected to the input terminal RES_IN and two of the input terminals CLK_IN[1] to CLK_IN[4], and the signals are input to the registers. The 95 registers 31 and the register 32 are electrically connected to the respective output terminals SR_OUT[1] to SR_OUT[96], and output the signals. The register 31 that outputs the signal to the output terminal SR_OUT[1] is electrically connected to the input terminal SP_IN.

FIGS. 7A and 7B, FIGS. 8A and 8B, and FIGS. 9A and 9B illustrate configuration examples of the shift registers 22 to 24. Note that the shift registers 22 to 24 are different from the shift register 21 in FIGS. 6A and 6B in electrical connections of the registers 31 and 32 to two of the input terminals CLK_IN[1] to CLK_IN[4]. The connections of the registers 31 and 32 to the input terminals CLK_IN[1] to CLK_IN[4] vary among the shift registers 21 to 24, whereby the shift registers 21 to 24 can deal with different start pulses. Such a configuration is described later with reference to timing charts in FIG. 13, FIG. 14, FIG. 15, and FIG. 16. The description of the shift register 21 is referred to for the shift registers 22 to 24.

Figure 10A:
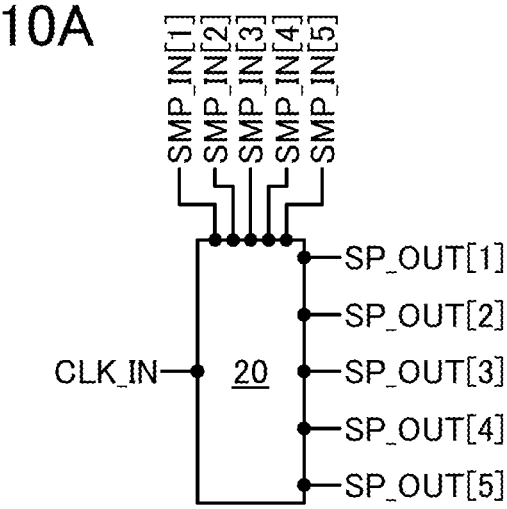
FIGS. 10A and 10B are circuit diagrams illustrating a configuration example of a demultiplexer.
Figure 10B:
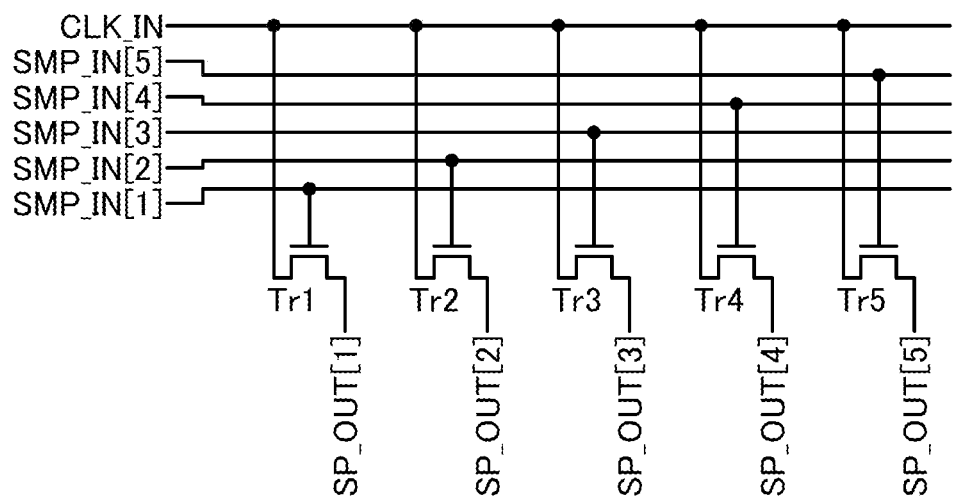

FIGS. 10A and 10B are circuit diagrams illustrating a configuration example of the demultiplexer.

FIG. 10A shows a symbol of the demultiplexer 20 and illustrates input and output of the demultiplexer 20. The demultiplexer 20 includes input terminals SMP_IN[1] to SMP_IN[5] and CLK_IN and output terminals SP_OUT[1] to SP_OUT[5]. One of the clock signals CLK[1] to CLK[4] is input to the input terminal CLK_IN, and the start pulses are output from the output terminals SP_OUT[1] to SP_OUT[5]. The sampling signals SMP[1] to SMP[5] are input to the input terminals SMP_IN[1] to SMP_IN[5].

FIG. 10B is a circuit diagram corresponding to the symbol of the demultiplexer 20. The demultiplexer 20 includes transistors Tr1 to Tr5. The input terminal CLK_IN is electrically connected to one of the output terminals SP_OUT[1] to SP_OUT[5] through a corresponding one of the transistors Tr1 to Tr5 in response to the signals input to the input terminals SMP_IN[1] to SMP_IN[5].

Figure 11A:
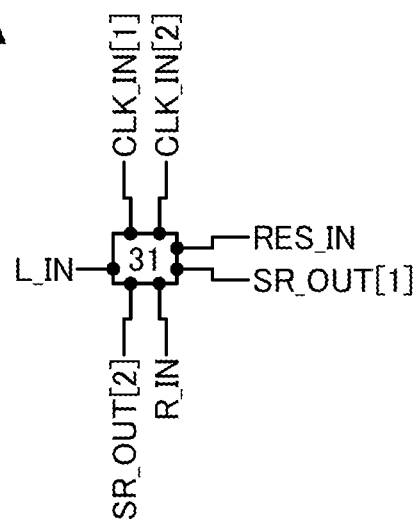
FIGS. 11A and 11B are circuit diagrams illustrating a configuration example of a register.
Figure 11B:
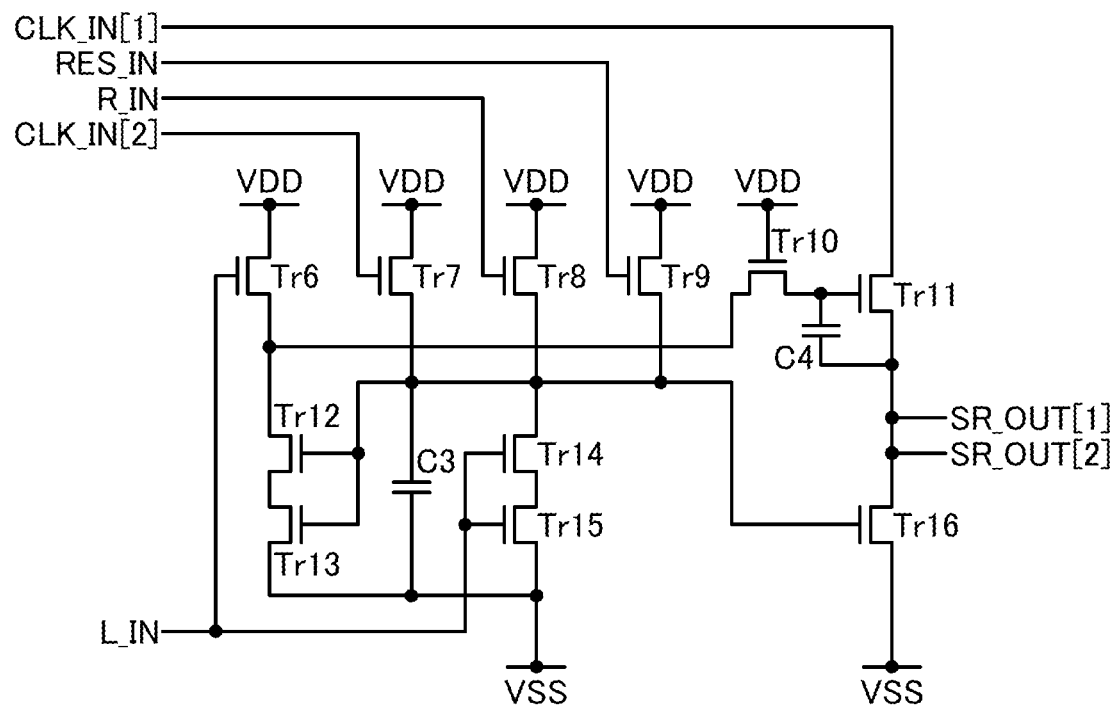
Figure 12A:
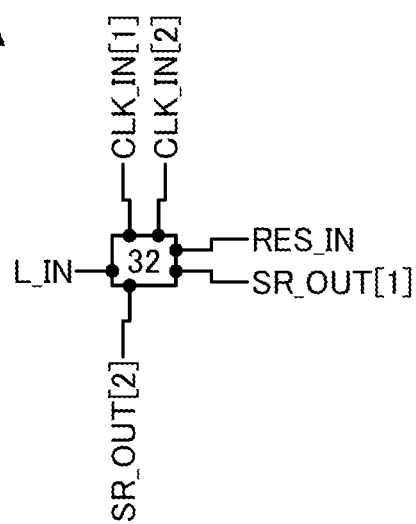
FIGS. 12A and 12B are circuit diagrams illustrating a configuration example of a register.
Figure 12B:
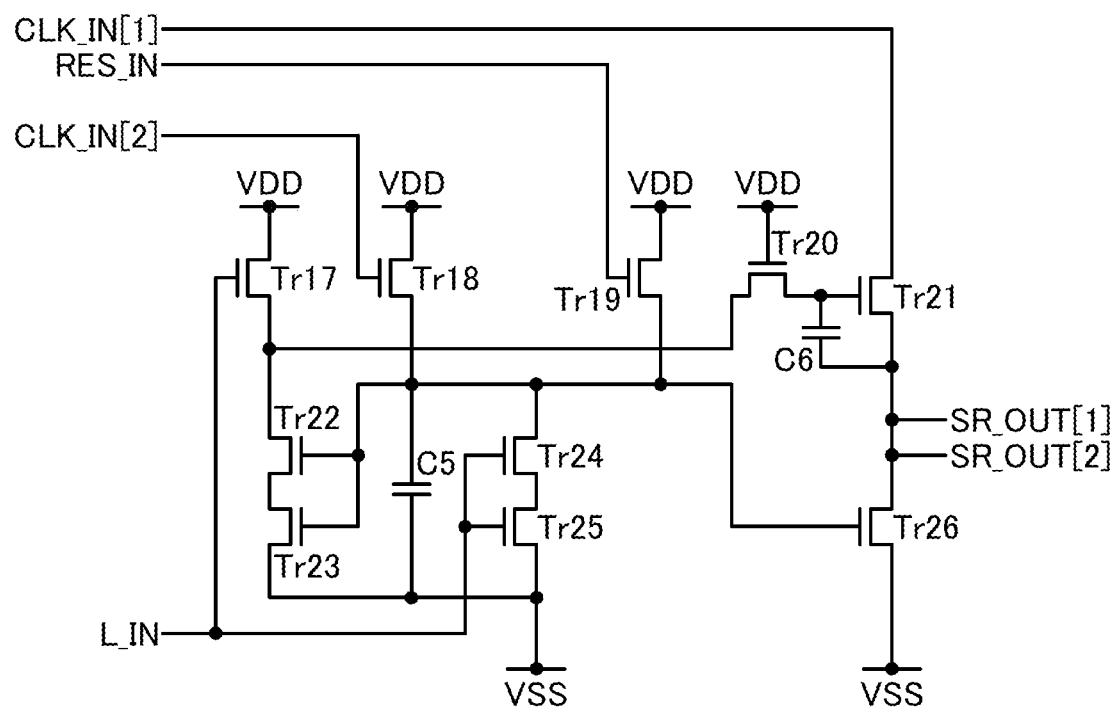

FIGS. 11A and 11B and FIGS. 12A and 12B are circuit diagrams illustrating configuration examples of the registers. FIGS. 11A and 11B illustrate a configuration example of the register 31, and FIGS. 12A and 12B illustrate a configuration example of the register 32.

FIG. 11A shows a symbol of the register 31 and illustrates input and output of the register 31. The register 31 includes the input terminals CLK_IN[1], CLK_IN[2], and RES_IN, input terminals L_IN and R_IN, and the output terminals SR_OUT[1] and SR_OUT[2]. The output of the register in the previous stage or the start pulse is input to the input terminal L_IN, and the output of the register in the next stage is input to the input terminal R_IN (see FIGS. 6A and 6B, FIGS. 7A and 7B, FIGS. 8A and 8B, and FIGS. 9A and 9B).

FIG. 11B is a circuit diagram corresponding to the symbol of the register 31. The register 31 includes transistors Tr6 to Tr16 and capacitors C3 and C4. Note that VDD is a high-potential power source and VSS is a low-potential power source.

FIGS. 12A and 12B illustrate the configuration example of the register 32, which is similar to the register 31 except that the input terminal R_IN and a transistor corresponding to the transistor Tr8 in the register 31 are not included. Thus, the description of the register 31 is referred to for the register 32. Note that the register 32 includes transistors Tr17 to Tr26 and capacitors C5 and C6.

The transistors Tr1 to Tr26 are preferably OS transistors. Although the transistors Tr1 to Tr26 in FIGS. 10A and 10B, FIGS. 11A and 11B, and FIGS. 12A and 12B are single-gate transistors, they may be dual-gate transistors including back gates. When the transistors Tr1 to Tr26 are OS transistors, off-state current of the transistors is reduced; thus, the current consumption of the gate driver can be reduced.

<Timing Chart>

FIG. 13, FIG. 14, FIG. 15, and FIG. 16 are timing charts showing the relationship between the gate lines GL(1) to GL(1920) and the clock signals CLK[1] to CLK[4] and the sampling signals SMP[1] to SMP[5] input to the gate drivers 62 and 63. Note that some of the gate lines GL(1) to GL(1920) are shown in the timing charts.

A first region is a region in the pixel array 61 that includes the pixels 10 selected by the gate lines GL(1) to GL(96). Similarly, a second region includes the pixels 10 selected by the gate lines GL(97) to GL(192), and a twentieth region includes the pixels 10 selected by the gate lines GL(1825) to GL(1920). That is, when the entire display region is rewritten, all the first to twentieth regions need to be rewritten.

Figure 13:
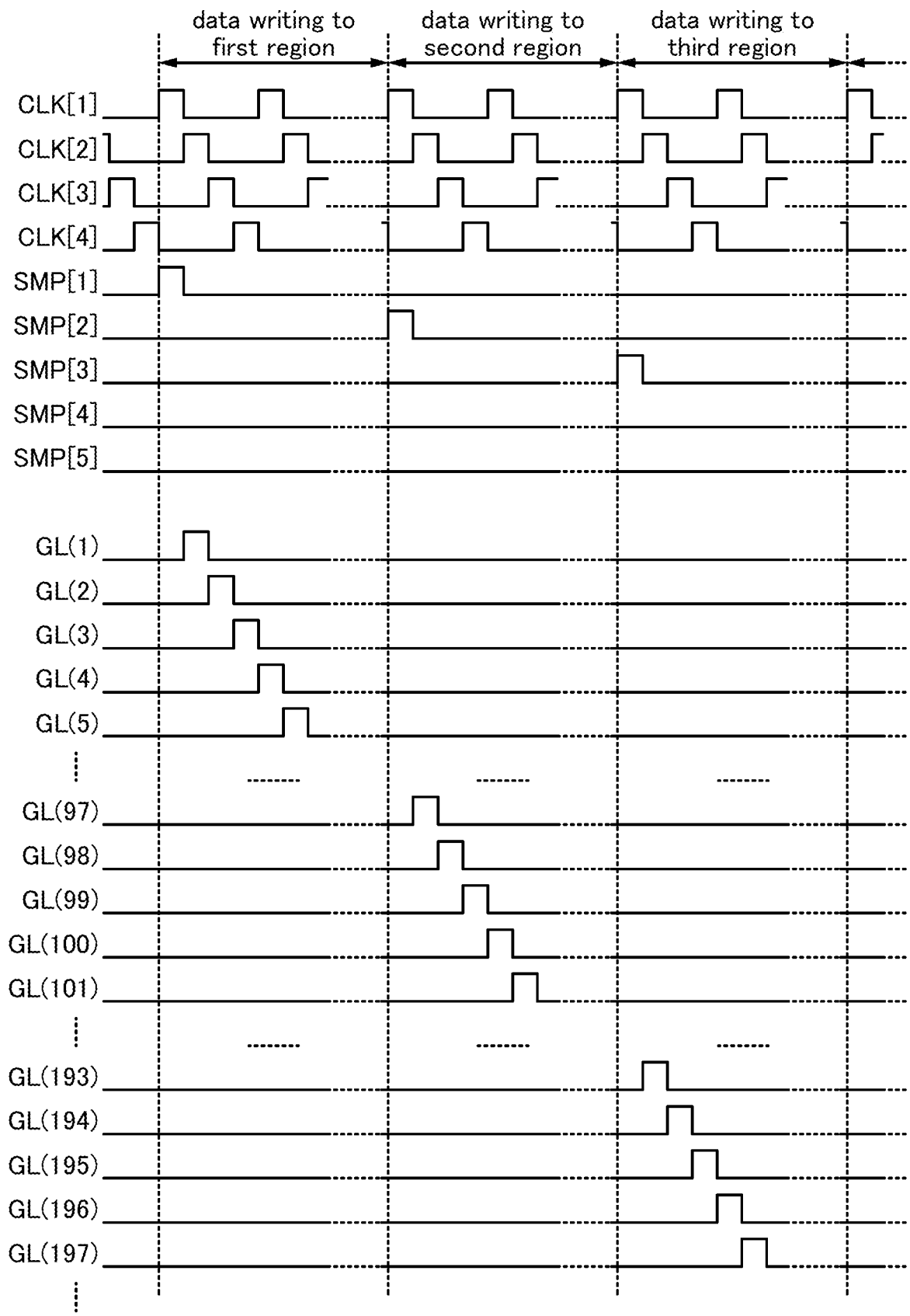
FIG. 13 is a timing chart for a gate driver.
Figure 15:
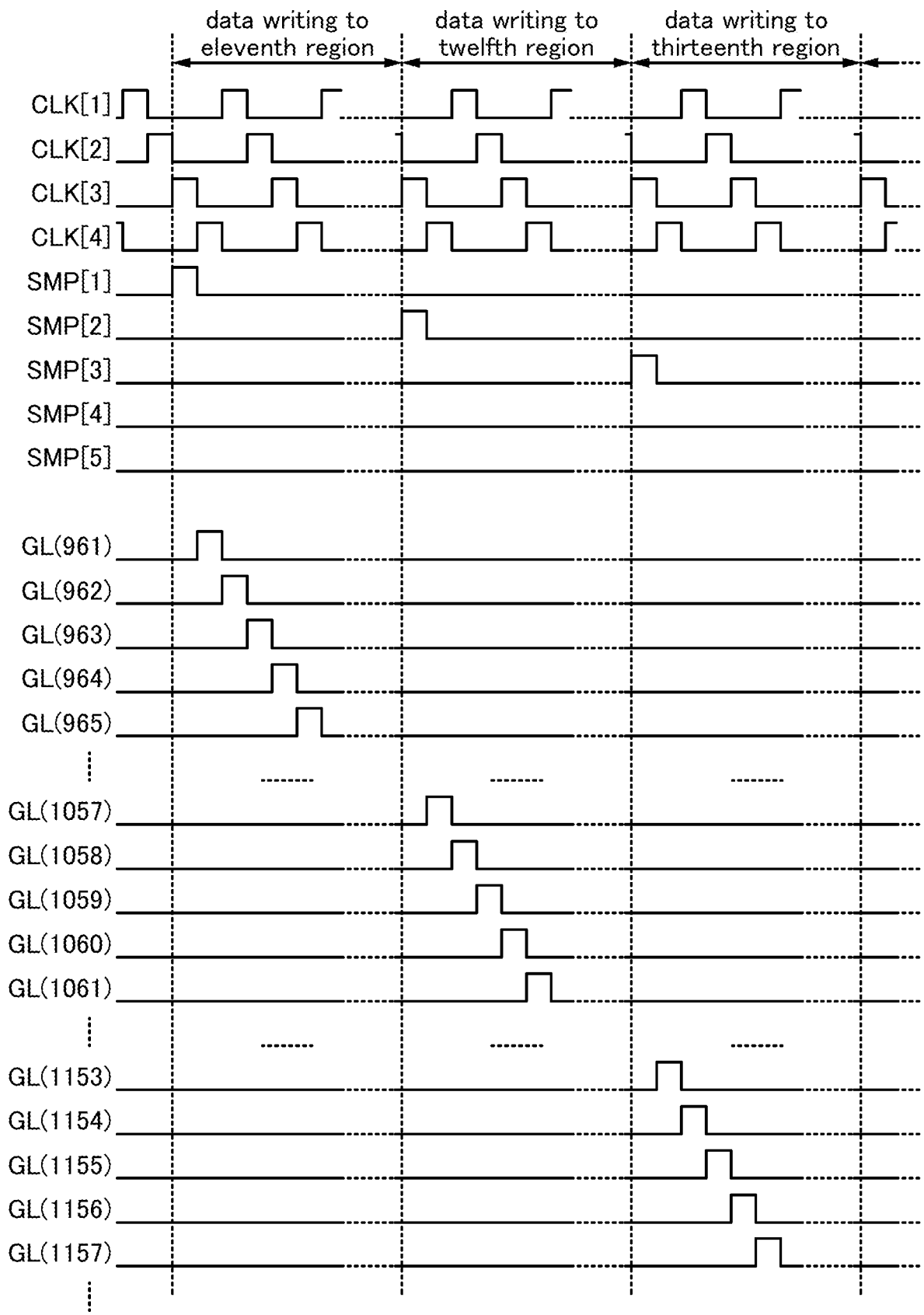
FIG. 15 is a timing chart for a gate driver.
Figure 16:
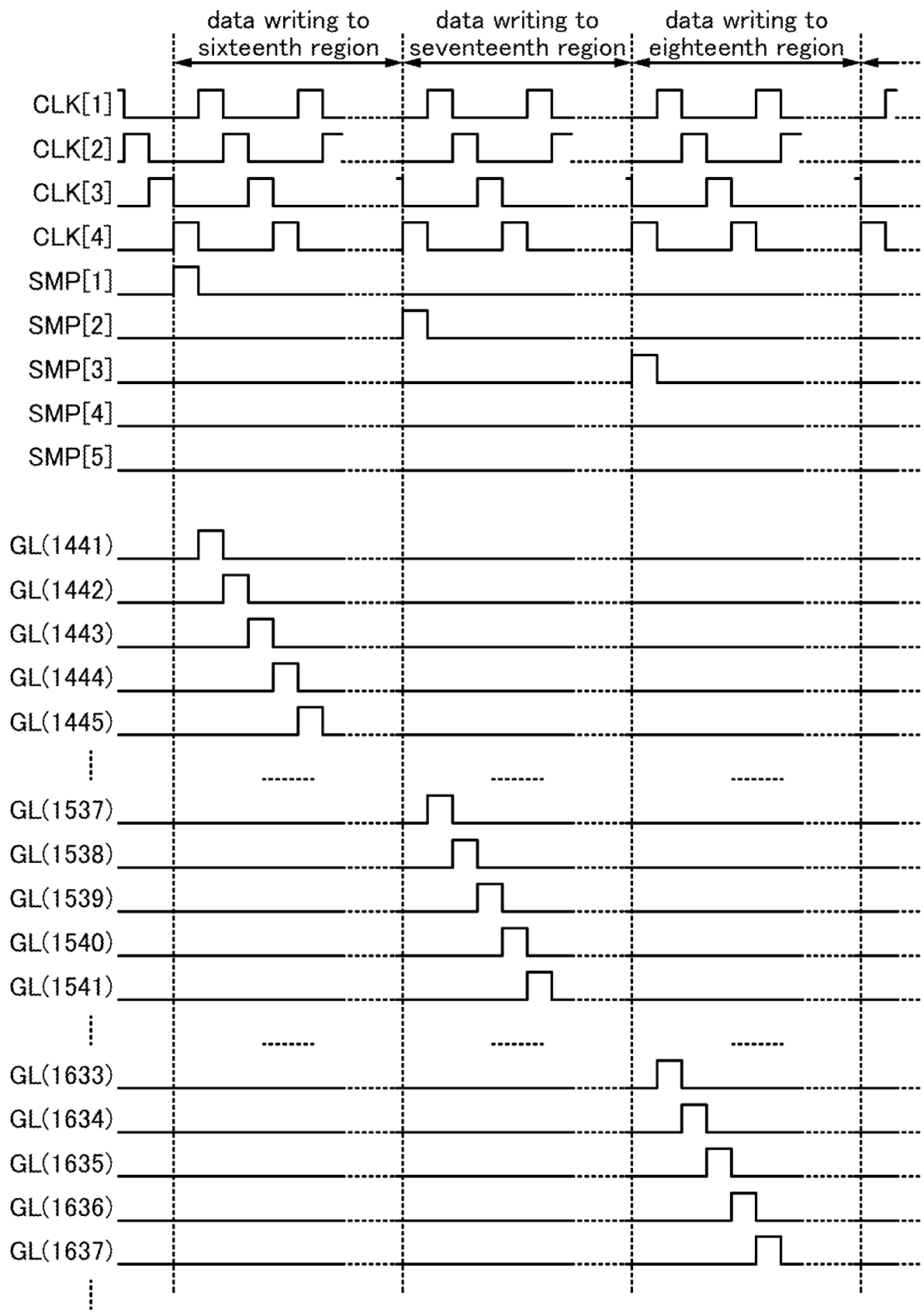
FIG. 16 is a timing chart for a gate driver.

FIG. 13 shows five gate lines GL in each of the first to third regions out of the first to fifth regions driven by the shift register 21. Similarly, FIG. 14 shows five gate lines GL in each of the sixth to eighth regions out of the sixth to tenth regions driven by the shift register 22, FIG. 15 shows five gate lines GL in each of the eleventh to thirteenth regions out of the eleventh to fifteenth regions driven by the shift register 23, and FIG. 16 shows five gate lines GL in each of the sixteenth to eighteenth regions out of the sixteenth to twentieth regions driven by the shift register 24.

In FIG. 13, the clock signals CLK[1] to CLK[4] are input so as not to be high at the same time, and the sampling signals SMP[1] to SMP[5] are sequentially input so as to be high at the same time as the clock signal CLK[1] (high states of the sampling signals SMP[4] and SMP[5] are not shown in FIG. 13). When the sampling signal SMP[1] is input so as to be high at the same time as the clock signal CLK[1], the shift register 21 that drives the first region starts to operate, so that selection is performed sequentially from the gate line GL(1). Similarly, when the sampling signal SMP[2] is input so as to be high at the same time as the clock signal CLK[1], the shift register 21 that drives the second region starts to operate, so that selection is performed sequentially from the gate line GL(97).

As described above, a region to be driven can be selected from the first to fifth regions depending on which of the sampling signals SMP[1] to SMP[5] is input so as to be high at the same time as the clock signal CLK[1].

Figure 14:
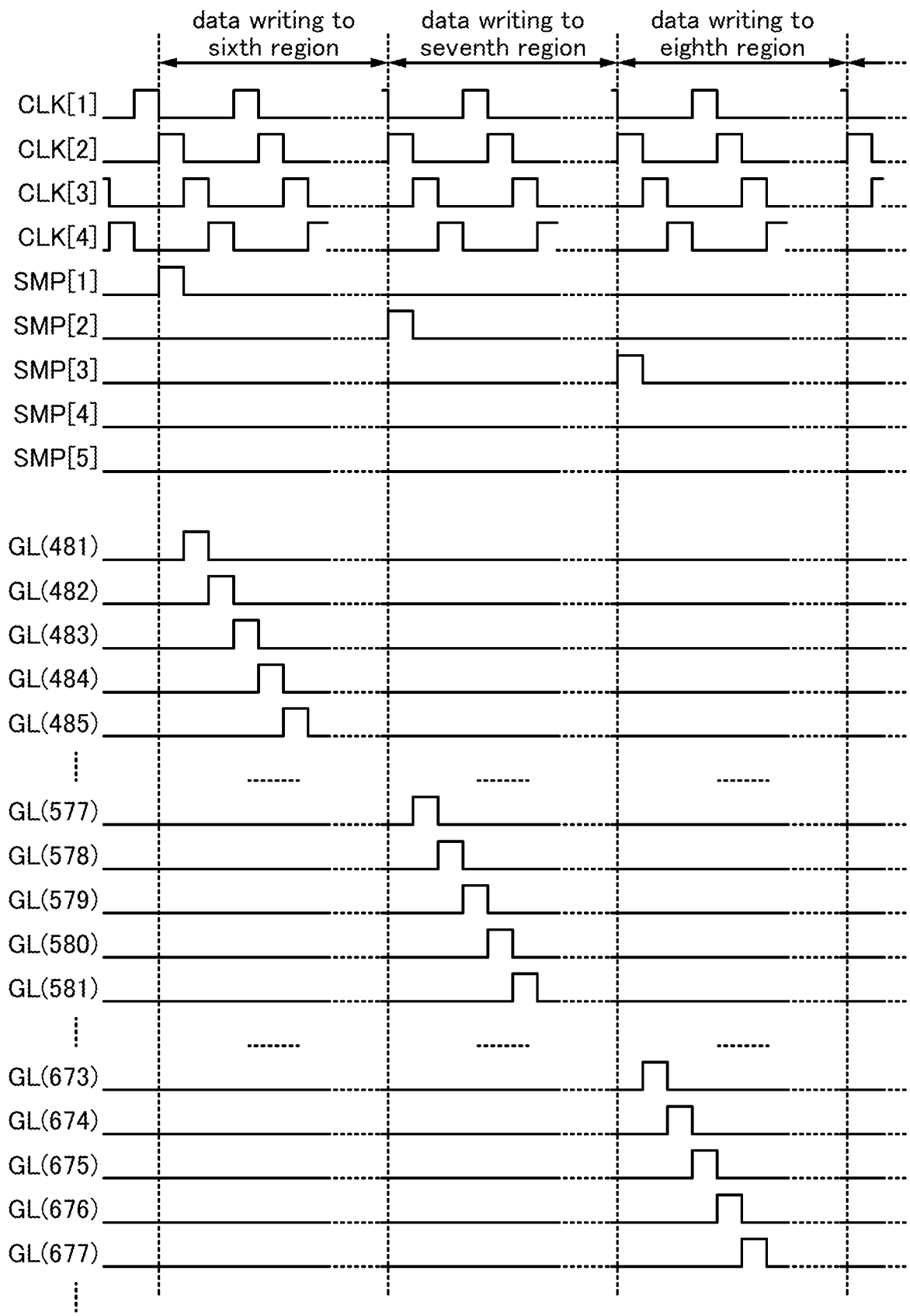
FIG. 14 is a timing chart for a gate driver.

Similarly, in FIG. 14, the clock signals CLK[1] to CLK[4] are input so as not to be high at the same time, and the sampling signals SMP[1] to SMP[5] are sequentially input so as to be high at the same time as the clock signal CLK[2] (high states of the sampling signals SMP[4] and SMP[5] are not shown in FIG. 14). When the sampling signal SMP[1] is input so as to be high at the same time as the clock signal CLK[2], the shift register 22 that drives the sixth region starts to operate, so that selection is performed sequentially from the gate line GL(481). A region to be driven can be selected from the sixth to tenth regions depending on which of the sampling signals SMP[1] to SMP[5] is input so as to be high at the same time as the clock signal CLK[2].

Similarly, in FIG. 15, a region to be driven can be selected from the eleventh to fifteenth regions depending on which of the sampling signals SMP[1] to SMP[5] is input so as to be high at the same time as the clock signal CLK[3]. In FIG. 16, a region to be driven can be selected from the sixteenth to twentieth regions depending on which of the sampling signals SMP[1] to SMP[5] is input so as to be high at the same time as the clock signal CLK[4].

In this manner, a region to be driven can be selected from the first to twentieth regions by the combination of the clock signals CLK[1] to CLK[4] and the sampling signals SMP[1] to SMP[5].

«IDS Driving»

Figure 17A:
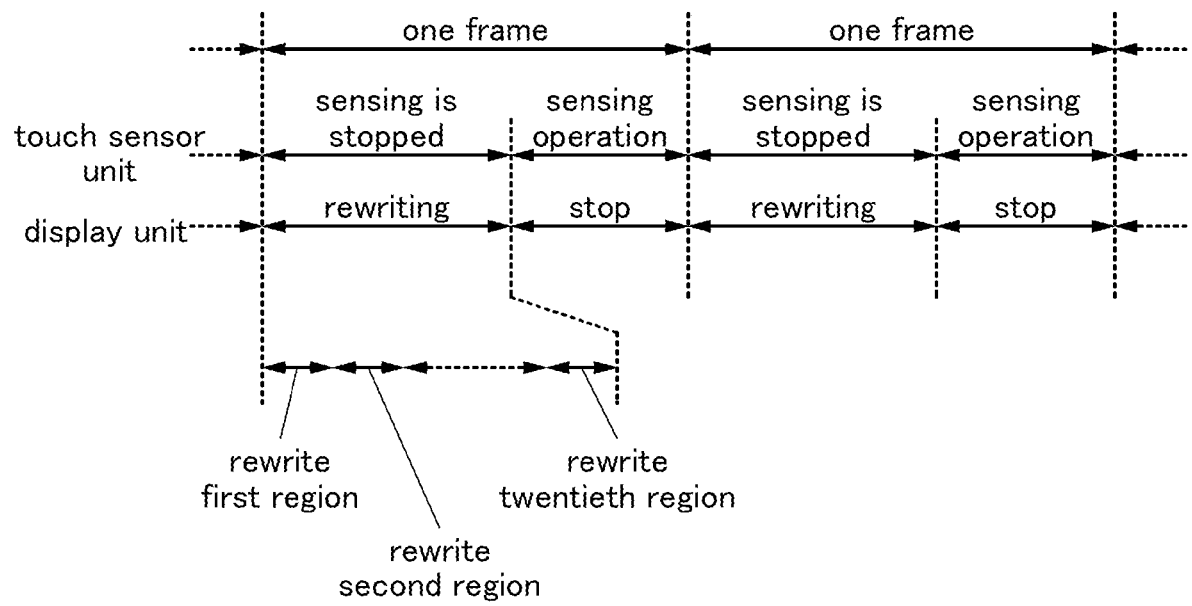
FIGS. 17A to 17C each show an operational relationship between a display unit and a touch sensor unit.
Figure 17B:
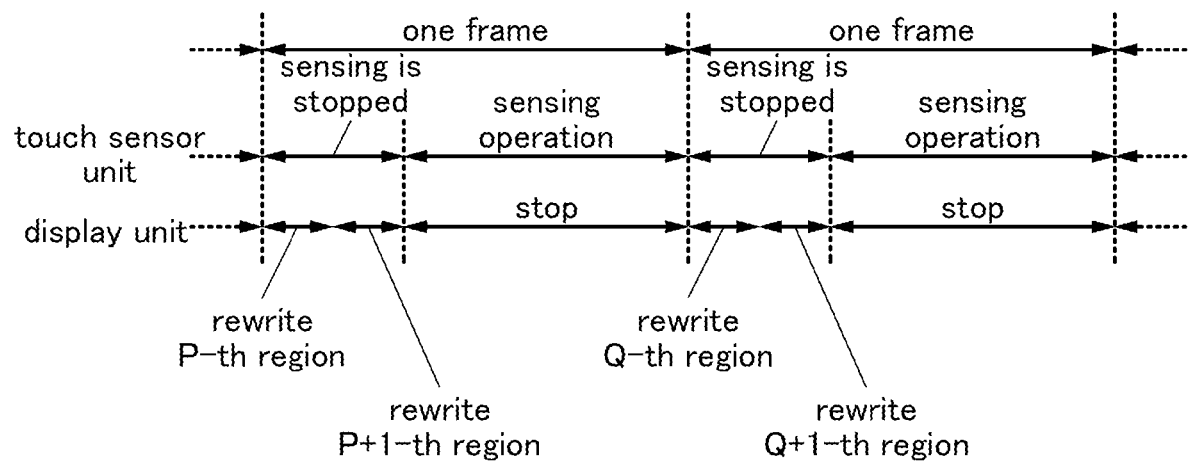
Figure 17C:
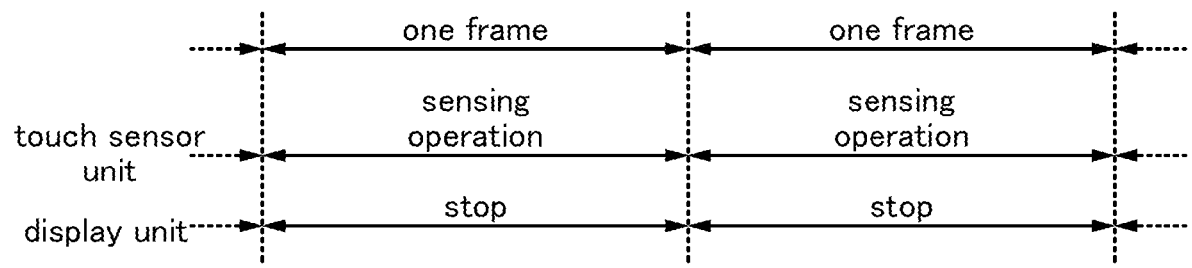

FIGS. 17A to 17C each show an operational relationship between the display unit and the touch sensor unit. A relationship between display image rewriting by the display unit 60 and touch sensing (sensing operation) by the touch sensor unit 70 is described with reference to FIGS. 17A to 17C.

Figure 18A:
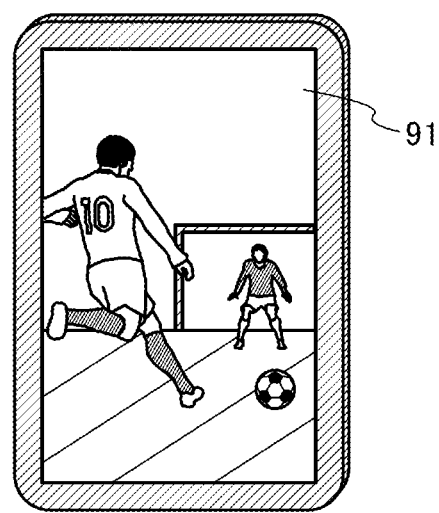
FIGS. 18A to 18C are external views each illustrating an embodiment and a usage example of a tablet information terminal.
Figure 18B:
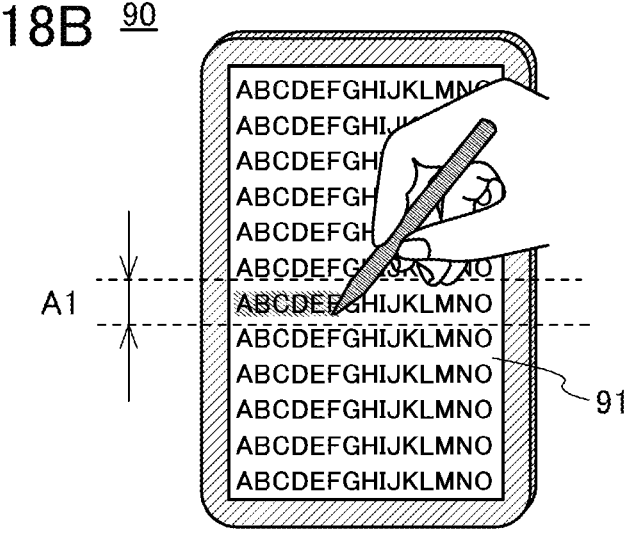
Figure 18C:
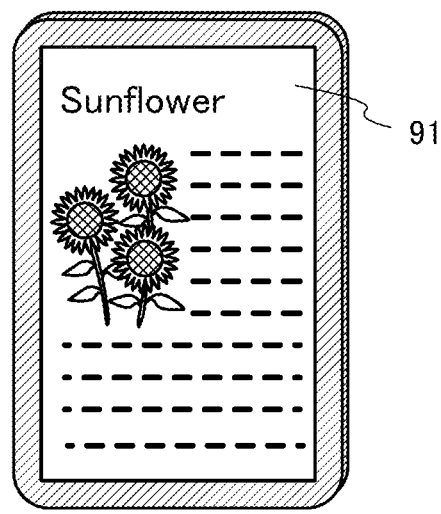

In the description of the display image rewriting by the display unit 60, the operation is divided into the following three modes: a first mode in which all the regions in the display region are rewritten (hereinafter, referred to as normal display), a second mode in which one or more of the regions in the display region are rewritten (hereinafter, referred to as partial IDS driving), and a third mode in which none of the regions in the display region are rewritten (hereinafter, referred to as IDS driving). FIGS. 18A to 18C each illustrate an example in which the display device 100 is used in a tablet information terminal 90. FIG. 18A illustrates an example of the normal display, FIG. 18B illustrates an example of the partial IDS driving, and FIG. 18C illustrates an example of the IDS driving. The tablet information terminal 90 includes a display region 91 that also serves as an input region. The display device 100 of one embodiment of the present invention is used in the display region 91.

<Normal Display>

FIG. 17A shows an example of the normal display. The normal display is performed when all the regions in the display region need to be rewritten, such as when a moving image is displayed on the entire display region. FIG. 18A illustrates an example of moving image display in which the tablet information terminal 90 displays a soccer game.

In FIG. 17A, the sensing operation by the touch sensor unit 70 is stopped during a period for display image rewriting by the display unit 60. This is because noise caused by driving of the gate lines GL(1) to GL(1920), noise caused by supply of data signals to the source lines SL(1) to SL(1080), noise caused by operation of the gate drivers 62 and 63, and the like in the period are not suitable for the sensing operation by the touch sensor unit 70.

After the completion of the display image rewriting by the display unit 60, the operation of the display unit 60 is stopped, and then the sensing operation by the touch sensor unit 70 is started. The above-described noise is not caused during a period in which the operation of the display unit 60 is stopped; thus, the touch sensor unit 70 can perform high-accuracy sensing operation. As described above, the display image rewriting by the display unit 60 and the sensing operation by the touch sensor unit 70 are collectively regarded as one frame and the one frame is repeated, so that high-accuracy sensing operation can be performed while a moving image or the like is displayed.

<Partial IDS Driving>

The partial IDS driving is performed when one or more of the regions in the display region need to be rewritten, such as when a moving image is displayed on part of the display region.

FIG. 18B illustrates an example in which the user of the tablet information terminal 90 highlights particular letters using a stylus as a marker. In this case, only a display image in a region A1 in the drawing needs to be rewritten. The gate drivers 62 and 63 drive only the gate lines GL in the region A1.

The operational relationship between the display unit and the touch sensor unit in this case is as in FIG. 17B, i.e., the display unit 60 rewrites only a region that needs to be rewritten. In FIG. 17B, a P-th region, a P+1-th region, a Q-th region, and a Q+1-th region are rewritten. Note that the value of P may be equal to that of Q. Alternatively, the values of P and Q may be different from frame to frame.

When the display unit 60 rewrites only a region that needs to be rewritten, time for touch sensing by the touch sensor unit 70 can be lengthened. Accordingly, the sensing operation can be performed a plurality of times in one frame. For example, in the case of the normal display, the sensing operation is performed once in one frame, whereas in the case of the partial IDS driving, the sensing operation can be performed twice in one frame. In this manner, the partial IDS driving enables smooth sensing operation and thus is suitable for handwriting input, for example. In addition, the number of times of the display image rewriting can be reduced, leading to a reduction in power consumption of the display unit 60.

<IDS Driving>

The IDS driving is performed when none of the regions in the display region need to be rewritten, such as when a still image is displayed on the entire display region. FIG. 18C illustrates an example of displaying an illustration of a flower and its caption (indicated by dotted lines in the drawing) as a still image. The operational relationship between the display unit and the touch sensor unit in this case is as in FIG. 17C, i.e., rewriting by the display unit 60 is stopped and thus the touch sensor unit 70 can perform the sensing operation.

In the IDS driving and the partial IDS driving, a displayed image on a region where a still image is displayed does not need to be rewritten; however, in practice, a time during which the pixel 10 including a transistor having a low off-state current can hold a charge, inversion driving occurring when a display element of the pixel 10 is a liquid crystal element, or the like should be taken into consideration.

As described above, the IDS driving enables smooth sensing operation as in the partial IDS driving. In addition, the power consumption of the display unit 60 can be reduced; thus, the IDS driving is suitable for a portable information terminal.

«Flow Chart»

Figure 19:
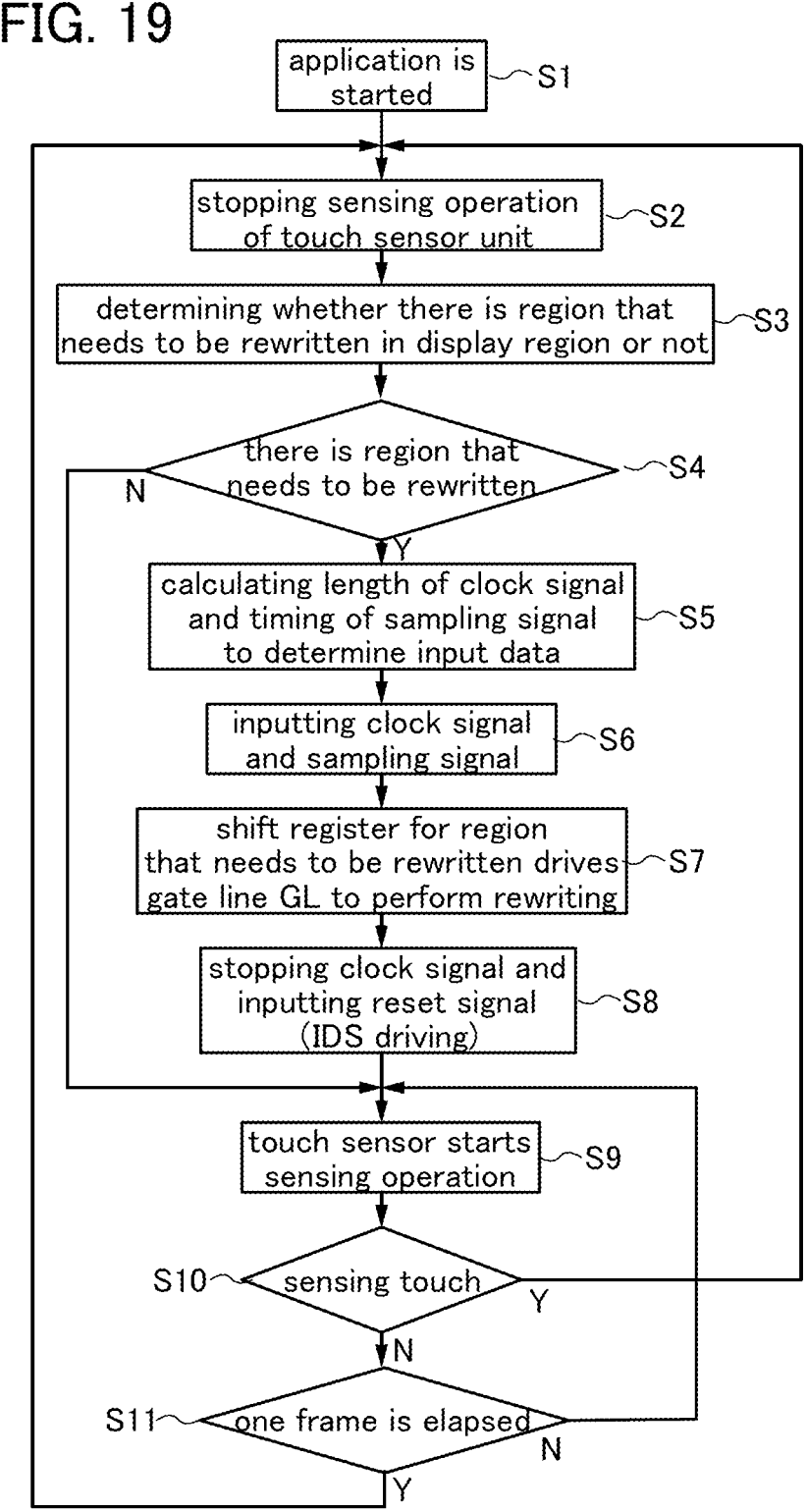
FIG. 19 is a flow chart showing an operation example of an electronic device.

Next, a state where three operation modes (normal display, partial IDS driving, and IDS driving) are switched after an electronic device including the display device 100 starts up an application is described with reference to a flow chart in FIG. 19.

When the application in the electronic device including the display device 100 is started (Step S1), the sensing operation by the touch sensor unit 70 is stopped (Step S2), and then, the application processor 80 determines whether there is a region that needs to be rewritten in the display region or not (Step S3). The determination is made by calculating a change between image data displayed on the display unit 60 at present and image data to be displayed next.

When there is a region that needs to be rewritten (Step S4), the application processor 80 calculates the length of a clock signal and the timing of a sampling signal that are needed for rewriting to determine a data signal of image data input to the display unit 60 (Step S5). Then, the clock signal and the sampling signal are input (Step S6).

In the gate drivers 62 and 63, a shift register for a region that needs to be rewritten drives the gate lines GL and the display unit 60 performs rewriting (Step S7). After the completion of rewriting, the clock signal is stopped and a reset signal is input (Step S8).

The touch sensor unit 70 performs the sensing operation (Step S9). When a touch is sensed (Step S10), the operation returns to Step S2 to stop the sensing operation and the determination whether there is a region that needs to be rewritten in the display region or not is made (Step S3). When there is no region that needs to be rewritten (Step S4), the touch sensor unit 70 resumes the sensing operation (Step S9).

When a touch is not sensed in Step S10 and one frame has not elapsed yet (Step S11), the operation returns to Step S9 to perform the sensing operation by the touch sensor unit 70.

When a touch is not sensed in Step S10 and one frame has elapsed (Step S11), the operation returns to Step S2.

As described above, high-accuracy and smooth sensing operation can be performed by changing the operation of the display unit 60 and the touch sensor unit 70 as appropriate in response to the touch sensing and the determination of whether there is a region that needs to be rewritten in the display region or not.

When a touch is sensed in Step S10 before one frame has elapsed and the display region is rewritten, the length of one frame in FIG. 17B is shorter than that of one frame in FIG. 17A. Accordingly, the display image is rewritten immediately after the touch is sensed by the touch sensor unit 70, which makes operation (display image rewriting) responsive to input (touch). Thus, the display device 100 is suitable for handwriting or the like.

«Modification Example of Gate Driver»

Figure 20:
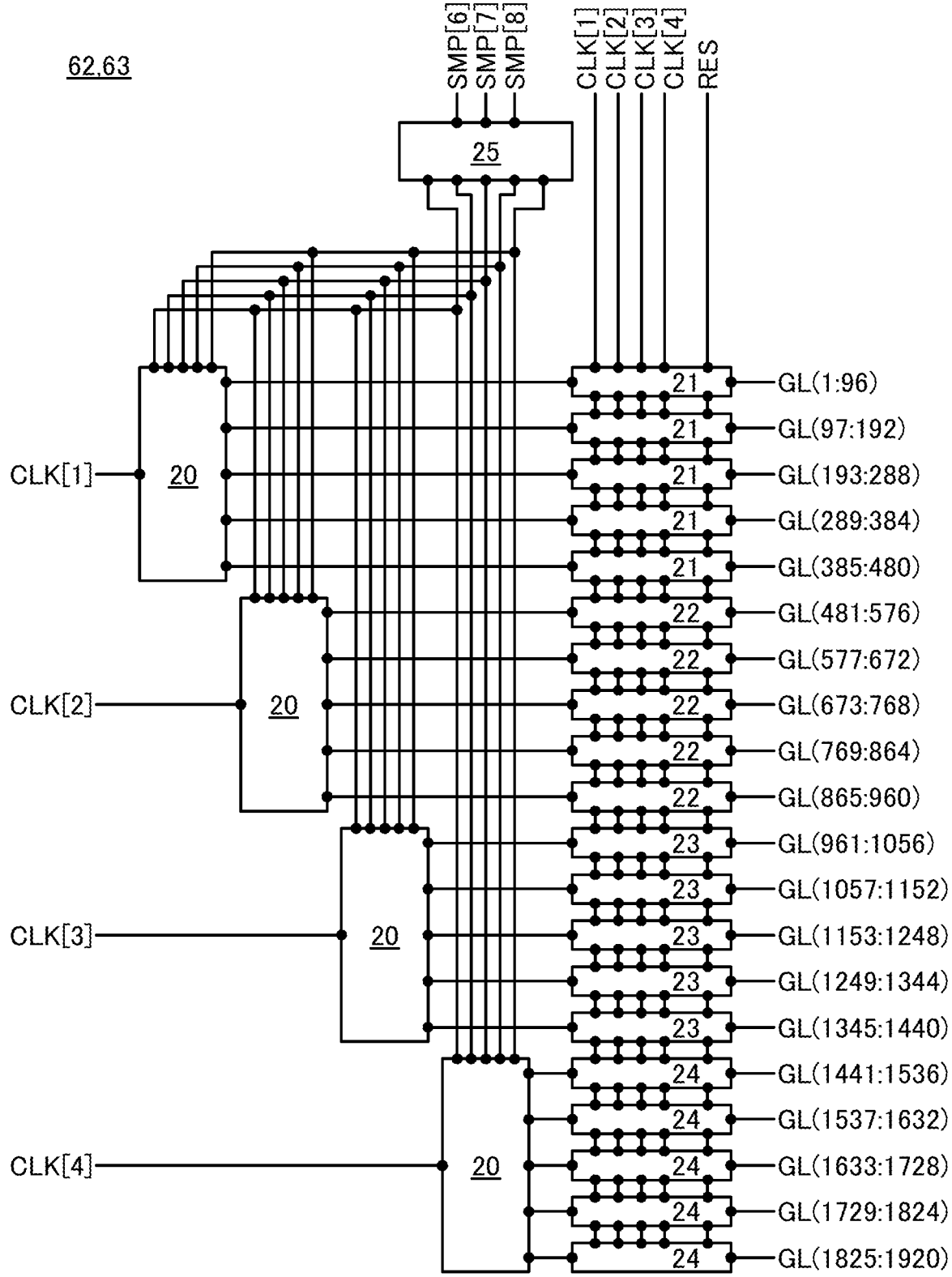
FIG. 20 is a circuit diagram illustrating a configuration example of gate drivers.

The gate drivers 62 and 63 in FIG. 5 may include a decoder 25. FIG. 20 is a circuit diagram illustrating a configuration example of the gate drivers including the decoder 25.

In FIG. 20, sampling signals SMP[6] to SMP[8] are input to the decoder 25 instead of the sampling signals SMP[1] to SMP[5] in FIG. 5. The decoder 25 can generate the sampling signals SMP[1] to SMP[5] in FIG. 5 with the use of the sampling signals SMP[6] to SMP[8]. Owing to the decoder 25, the number of input signals to the gate drivers 62 and 63 can be reduced.

Figure 21A:
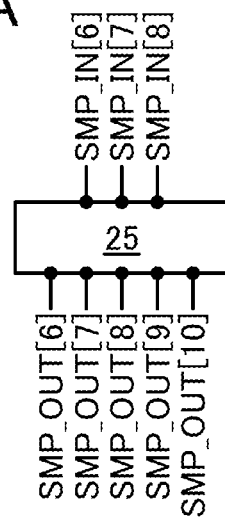
FIGS. 21A and 21B are circuit diagrams illustrating a configuration example of a decoder.
Figure 21B:
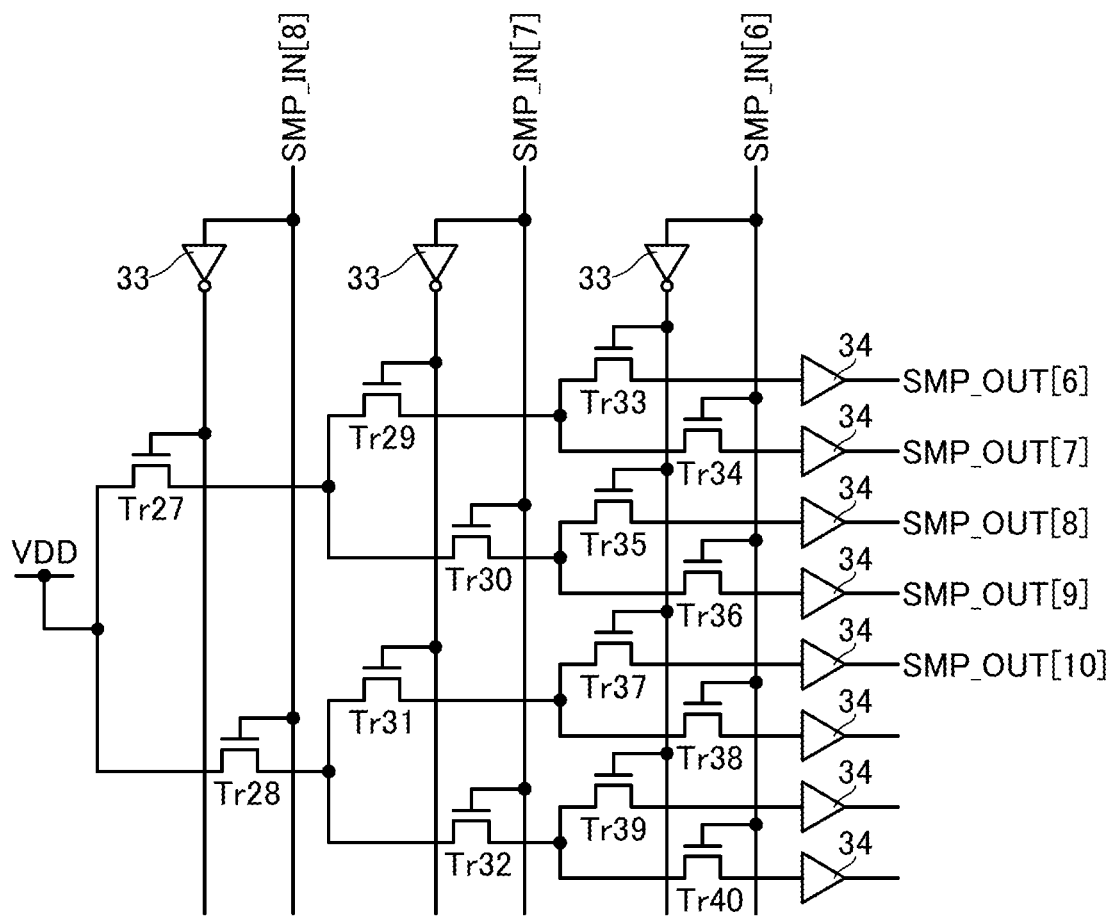

FIGS. 21A and 21B are circuit diagrams illustrating a configuration example of the decoder. FIG. 21A shows a symbol of the decoder 25 and illustrates input and output of the decoder 25. The decoder 25 includes input terminals SMP_IN[6] to SMP_IN[8] and output terminals SMP_OUT[6] to SMP_OUT[10]. In FIG. 20, the sampling signals SMP[6] to SMP[8] are input to the input terminals SMP_IN[6] to SMP_IN[8], and signals corresponding to the sampling signals SMP[1] to SMP[5] are output from the output terminals SMP_OUT[6] to SMP_OUT[10].

FIG. 21B is a circuit diagram corresponding to the symbol of the decoder 25. The decoder 25 includes transistors Tr27 to Tr40, three inverters 33, and eight drivers 34. VDD is a high-potential power source.

The three inverters 33 are electrically connected to the respective input terminals SMP_IN[6] to SMP_IN[8] and generate inverted signals. Five out of the eight drivers 34 are electrically connected to the respective output terminals SMP_OUT[6] to SMP_OUT[10] and output the signals. Note that the transistor Tr32, the transistors Tr38 to Tr40, and the drivers 34 not electrically connected to the output terminals SMP_OUT[6] to SMP_OUT[10] are not necessarily provided.

The drivers 34 are electrically connected to the output terminals SMP_OUT[6] to SMP_OUT[10] and have a function of shaping output waveforms and a function of setting the output terminals that are not electrically connected to the high-potential power source (VDD) through the transistors Tr27 to Tr40 at a potential that is the same as the low-potential power source (VSS).

FIGS. 22A and 22B are circuit diagrams illustrating a configuration example of the inverter. FIG. 22A shows a symbol of the inverter 33 and illustrates input and output of the inverter 33. The inverter 33 includes an input terminal IN and an output terminal OUT. FIG. 22B is a circuit diagram corresponding to the symbol of the inverter 33. The inverter 33 includes a transistor Tr41 and a transistor Tr42. VDD is a high-potential power source and VSS is a low-potential power source.

FIGS. 22C and 22D are circuit diagrams illustrating a configuration example of the driver. FIG. 22C shows a symbol of the driver 34 and illustrates input and output of the driver 34. The driver 34 includes an input terminal IN and an output terminal OUT. FIG. 22D is a circuit diagram corresponding to the symbol of the driver 34. The driver 34 includes a transistor Tr43 and two inverters 33. VDD is a high-potential power source and VSS is a low-potential power source.

FIG. 22E is a timing chart showing a relationship between the signals input to the input terminals SMP_IN[6] to SMP_IN[8] of the decoder 25 (i.e., the sampling signals SMP[6] to SMP[8]) and the signals output from the output terminals SMP_OUT[6] to SMP_OUT[10] of the decoder 25.

The decoder 25 can output signals similar to the sampling signals SMP[1] to SMP[5] in FIG. 13, FIG. 14, FIG. 15, and FIG. 16 on the basis of the signals input to the input terminals SMP_IN[6] to SMP_IN[8]. In this manner, the number of input signals to the gate drivers 62 and 63 can be reduced owing to the decoder 25.

Note that the transistors Tr27 to Tr43 are preferably OS transistors. Although the transistors Tr27 to Tr43 in FIG. 21B and FIGS. 22B and 22D are single-gate transistors, they may be dual-gate transistors including back gates. When the transistors Tr27 to Tr43 are OS transistors, the off-state current of the transistors can be reduced; thus, the current consumption of the gate drivers can be reduced.

Although the four clock signals CLK[1] to CLK[4] and the five sampling signals SMP[1] to SMP[5] are input to the gate drivers 62 and 63, the number of clock signals may be increased. Also in the case of increasing the number of clock signals, the clock signals are input so as not to be high at the same time. In some cases, an increase in the number of clock signals leads to a reduction in the number of sampling signals. The configuration of the gate drivers 62 and 63 is preferably determined in consideration of the number of clock signals and the number of sampling signals.

As described above, the display device 100 can perform high-accuracy sensing operation when the display image rewriting by the display unit 60 and the touch sensing operation by the touch sensor unit 70 are performed at different timings. In addition, the display unit 60 rewrites the display image only in a region that needs to be rewritten, which enables a reduction in power consumption of the display unit 60 and smooth sensing operation by the touch sensor unit 70. By using the gate drivers 62 and 63 described in this embodiment, the display unit 60 can rewrite the display image only in a region that needs to be rewritten, with a small number of signals.

This embodiment can be implemented in combination with any of the other embodiments as appropriate.

Embodiment 2

In this embodiment, a structure example of the touch sensor unit 70 mentioned in the above embodiment is described with reference to FIGS. 23A to 23C and FIGS. 24A and 24B.

A specific structure example of the touch sensor unit 70 is described with reference to FIGS. 23A to 23C and FIGS. 24A and 24B.

Figure 23A:
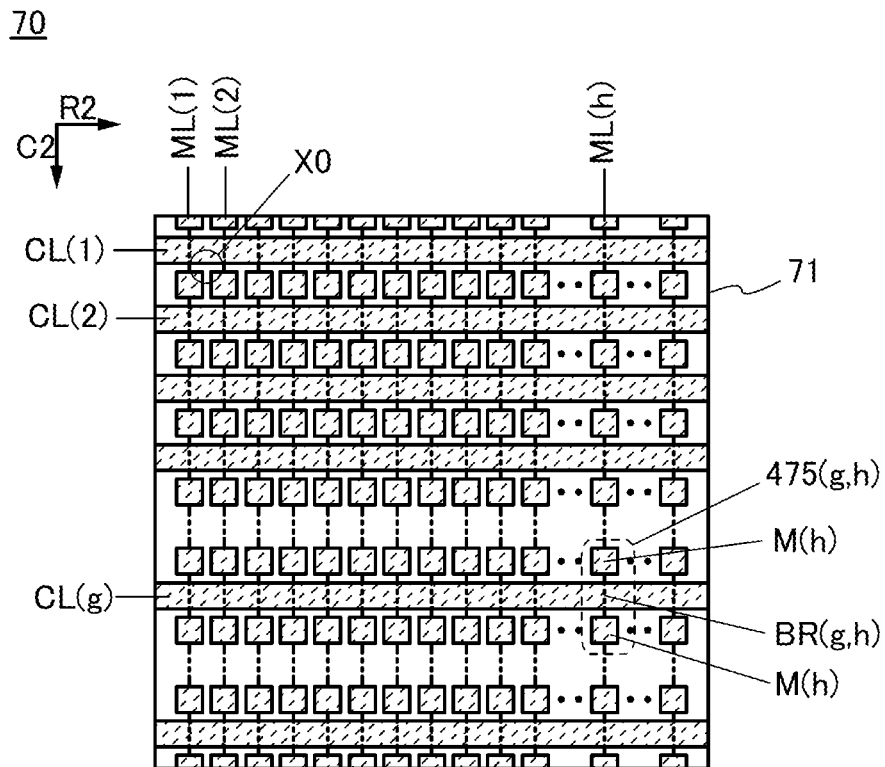
FIGS. 23A to 23C are a top view and projection views illustrating a structure example of a touch sensor unit.
Figure 23B:
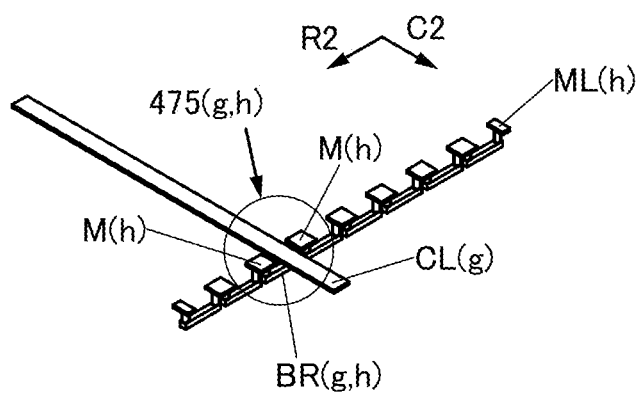
Figure 23C:
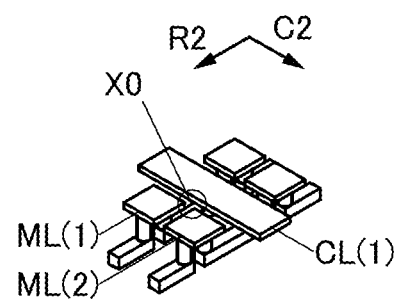

FIG. 23A is a top view of the touch sensor unit 70. FIGS. 23B and 23C are each a projection view illustrating part of FIG. 23A.

Figure 24A:
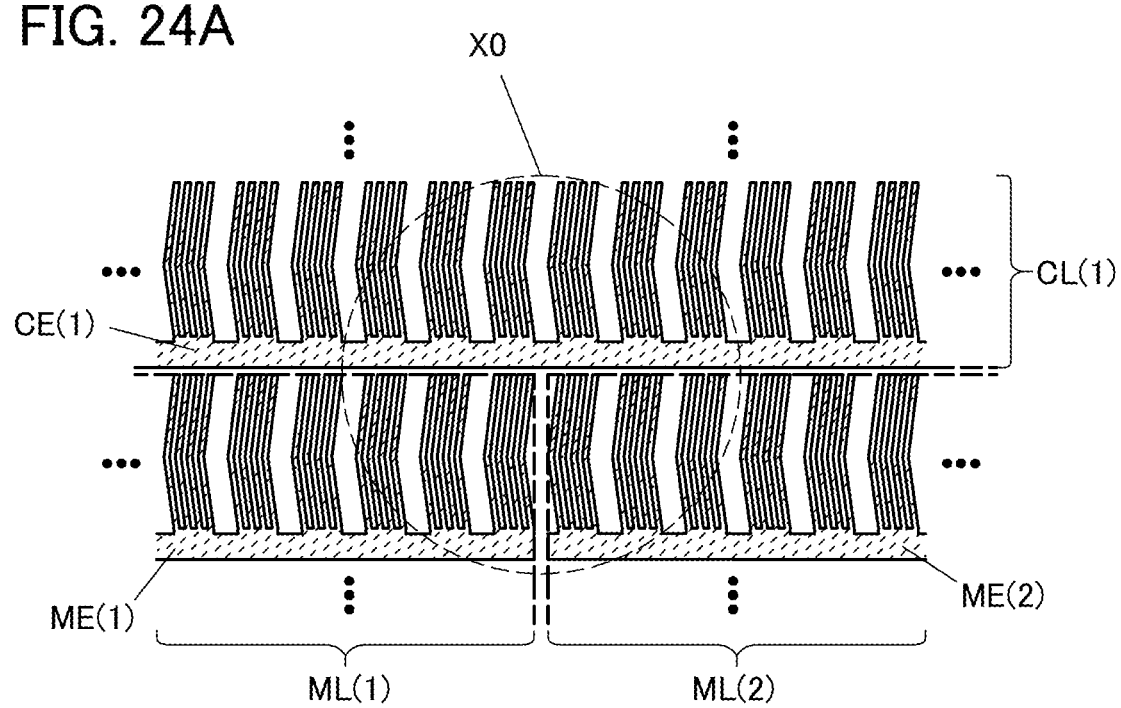
FIGS. 24A and 24B are a top view and a projection view illustrating a structure example of a touch sensor unit.
Figure 24B:
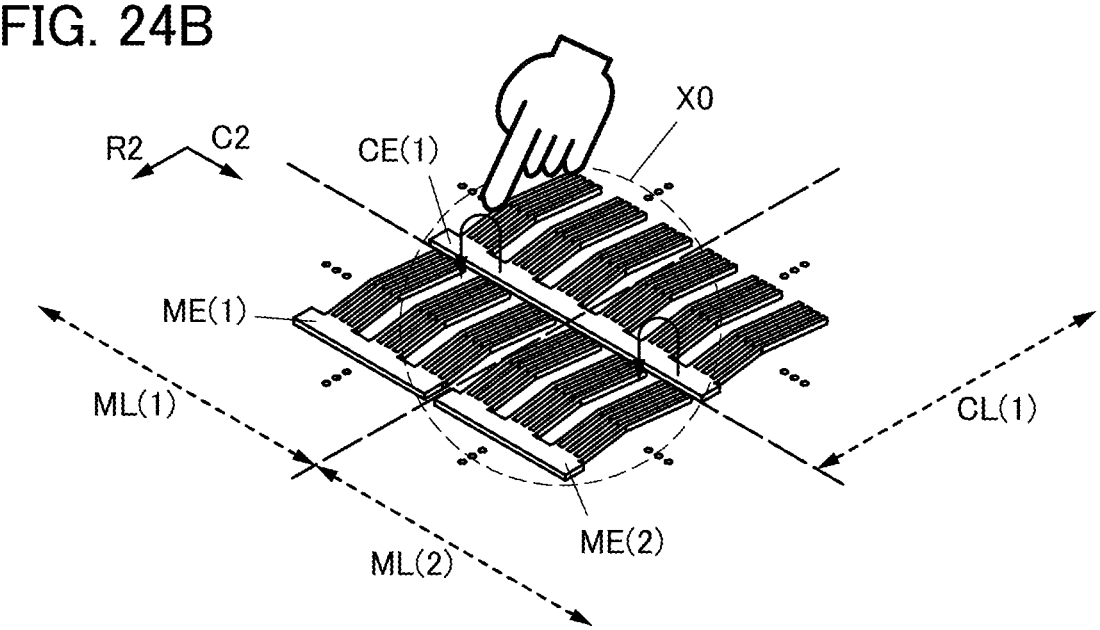

FIG. 24A is a top view of a portion in which a control line and a sensing signal line are adjacent to each other. FIG. 24B is a projection view that schematically illustrates an electric field generated in the adjoining portion.

The touch sensor unit 70 includes the sensor array 71. The sensor array 71 includes a wiring CL(g), a wiring ML(h), and a conductive film (see FIG. 23A). Note that g and h are each an integer greater than or equal to 2.

For example, a conductive film divided into a plurality of regions can be used for the sensor array 71 (see FIG. 23A). This enables the same potential or different potentials to be supplied to the plurality of regions.

Specifically, a conductive film divided into a conductive film that can be used as the wiring CL(g) and a conductive film that can be used as the wiring ML(h) can be used for the sensor array 71. The conductive films obtained by dividing a conductive film into a plurality of regions can each have a comb-like shape, for example (see an electrode CE(1), an electrode ME(1), and an electrode ME(2) in FIGS. 24A and 24B). In this manner, the divided conductive films can be used as electrodes of sensing elements.

For example, a conductive film that can be used as the wiring CL(1), a conductive film that can be used as the wiring ML(1), and a conductive film that can be used as the wiring ML(2), which are obtained by dividing a conductive film, are adjacent to each other in an adjoining portion X0 (see FIG. 23A, FIG. 23C or FIGS. 24A and 24B).

A sensing element 475(g,h) is electrically connected to the wiring CL(g) and the wiring ML(h) (see FIG. 23A).

The wiring CL(g) has a function of supplying the signal Tx, and the wiring ML(h) has a function of receiving the signal Rx.

The wiring ML(h) includes a conductive film BR(g,h) (see FIG. 23B). The conductive film BR(g,h) includes a region overlapping with the wiring CL(g).

Note that the sensing element 475(g,h) includes an insulating film. The insulating film includes a region positioned between the wiring ML(h) and the conductive film BR(g,h). Thus, a short circuit between the wiring ML(h) and the conductive film BR(g,h) can be prevented.

The electrode CE(1) is electrically connected to the wiring CL(1), and the electrode ME(1) is electrically connected to the wiring ML(1) (see FIGS. 24A and 24B).

In a similar manner, an electrode CE(g) is electrically connected to the wiring CL(g), and an electrode ME(h) is electrically connected to the wiring ML(h).

A sensing element 475(1,1) senses a touch by sensing a change in the value of the capacitance generated between the electrode CE(1) and the electrode ME(1) (see FIGS. 24A and 24B).

In a similar manner, the sensing element 475(g,h) senses a touch by sensing a change in the value of the capacitance generated between the electrode CE(g) and the electrode ME(h).

Conductive films which can be formed in the same process can be used as the wiring CL(1) and the electrode CE(1). Conductive films which can be formed in the same process can be used as the wiring ML(1) and the electrode ME(1) (see FIGS. 24A and 24B).

In a similar manner, conductive films which can be formed in the same process can be used as the wiring CL(g) and the electrode CE(g). Conductive films which can be formed in the same process can be used as the wiring ML(h) and the electrode ME(h).

For example, a light-transmitting conductive film can be used as each of the electrodes CE(g) and ME(h). Alternatively, a conductive film having an opening or a comb-like shape in a region overlapping with the pixel can be used as each of the electrodes CE(g) and ME(h). Accordingly, an object that approaches a region overlapping with a display panel can be sensed without disturbing display of the display panel.

Note that this embodiment can be combined with any of the other embodiments in this specification as appropriate.

Embodiment 3

In this embodiment, a structure example of the source driver IC 64 mentioned in the above embodiment is described with reference to FIGS. 25A and 25B.

Figure 25A:
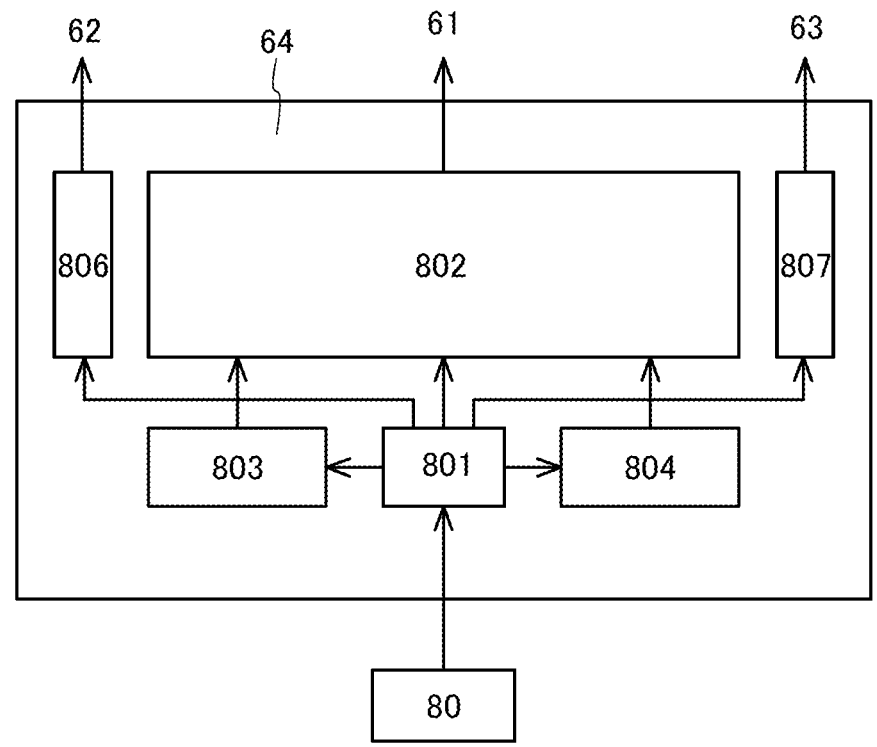
FIGS. 25A and 25B are block diagrams each illustrating a structure example of a source driver IC.
Figure 25B:
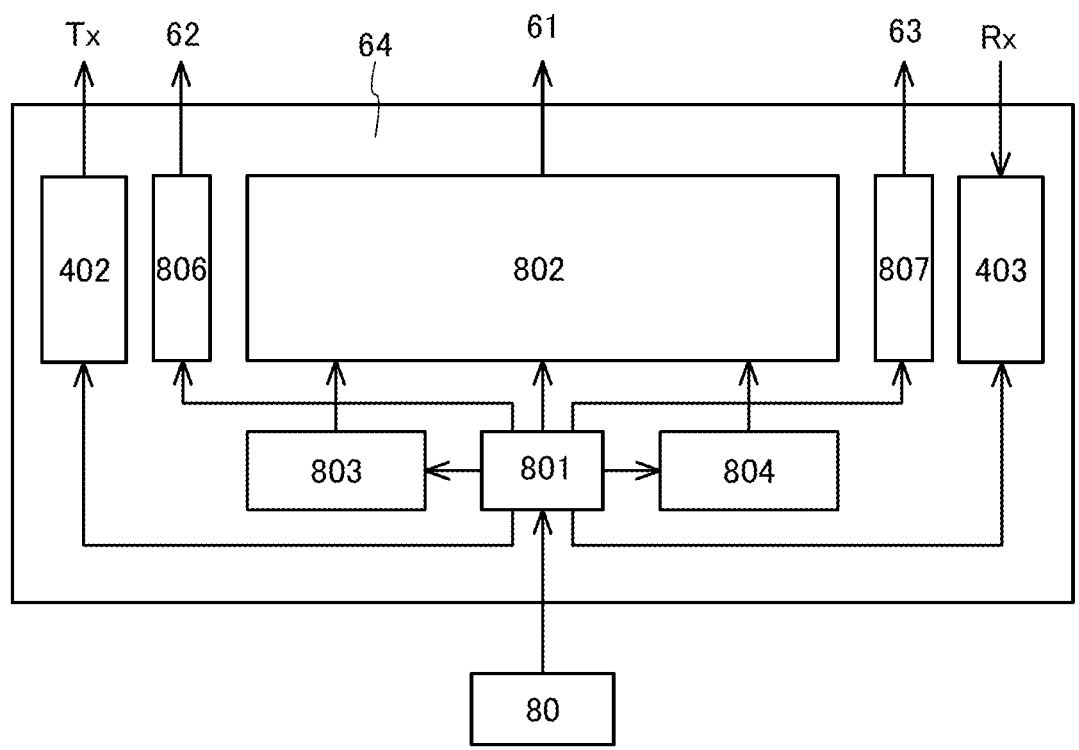

FIGS. 25A and 25B are block diagrams of the source driver IC 64 in the case where a hybrid element including a reflective element and a light-emitting element is used for the pixel 10.

The source driver IC 64 illustrated in FIG. 25A includes a control circuit 801, a driver 802, a frame memory 803, a frame memory 804, a gate driver signal generation circuit 806, and a gate driver signal generation circuit 807.

The control circuit 801 has a function of receiving a signal from the application processor 80 and transmitting the signal to each circuit included in the source driver IC 64. Examples of interface standards of the signal transmitted from the application processor 80 to the control circuit 801 include a mobile industry processor interface (MIPI) and a serial peripheral interface (SPI).

The driver 802 has a function of supplying an image signal to the pixel array 61.

The frame memory 803 has a function of storing the image signal temporarily.

The gate driver signal generation circuit 806 and the gate driver signal generation circuit 807 have a function of supplying a signal to the gate driver 62 and the gate driver 63, respectively.

One of the gate driver signal generation circuit 806 and the gate driver signal generation circuit 807 has a function of generating a signal for driving the reflective element of the pixel 10 and the other of the gate driver signal generation circuit 806 and the gate driver signal generation circuit 807 has a function of generating a signal for driving the light-emitting element of the pixel 10.

The source driver IC 64 may also function as the touch sensor IC 72 illustrated in FIG. 1. FIG. 25B illustrates a block diagram in that case.

In the source driver IC 64 illustrated in FIG. 25B, the driver circuit 402 and the sensing circuit 403 illustrated in FIG. 2 are added to the block diagram of FIG. 25A. When the touch sensor IC 72 is included in the source driver IC 64 in this manner, manufacturing costs of the display device can be reduced.

In the case where the driver circuit 402 and the sensing circuit 403 are included in one IC, those two circuits are preferably apart from each other. When the driver circuit 402 is near the sensing circuit 403, the sensitivity of the sensing circuit 403 deteriorates by the influence of noise generated by the driver circuit 402 and touch sensing becomes difficult in some cases. Thus, the driver circuit 402 and the sensing circuit 403 are preferably positioned with a circuit such as the gate driver signal generation circuit 806 or 807 or the driver 802 provided therebetween.

Here, it is assumed that the gate driver 62 drives the liquid crystal element and the gate driver 63 drives the light-emitting element. That is, it is assumed that the gate driver signal generation circuit 806 generates a signal for driving the liquid crystal element and the gate driver signal generation circuit 807 generates a signal for driving the light-emitting element. In this case, the driver circuit 402 and the sensing circuit 403 are preferably near the gate driver signal generation circuit 806 and the gate driver signal generation circuit 807, respectively.

The drive voltage of a light-emitting element is generally lower than that of a liquid crystal element. Thus, the amplitude of a voltage output from the gate driver signal generation circuit 807 is lower than that of a voltage output from the gate driver signal generation circuit 806. That is, noise generated by the gate driver signal generation circuit 807 is smaller than that generated by the gate driver signal generation circuit 806. Accordingly, the sensing circuit 403 is preferably provided at a position that is closer to the gate driver signal generation circuit 807 than to the gate driver signal generation circuit 806.

Note that this embodiment can be combined with any of the other embodiments in this specification as appropriate.

Embodiment 4

Figure 26A:
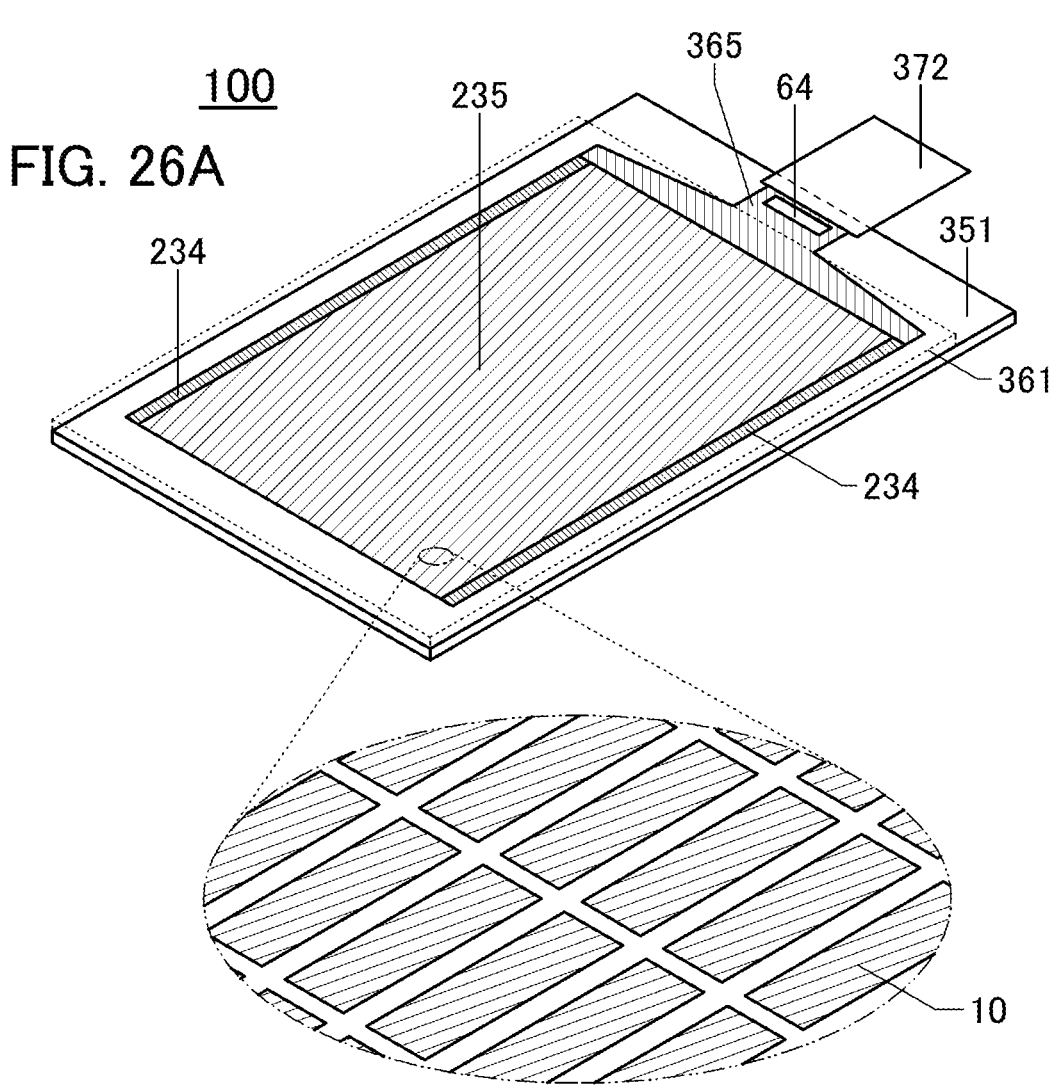
FIG. 26A illustrates an example of a display device.

In this embodiment, one embodiment of the display device 100 including a hybrid element is described with reference to drawings.
<Structure Example>
FIG. 26A is a schematic perspective view of the display device 100. In the display device 100, a substrate 351 and a substrate 361 are bonded to each other. In FIG. 26A, the substrate 361 is denoted by a dashed line.

The display device 100 includes a display region 235, a peripheral circuit region 234, a wiring 365, and the like. FIG. 26A illustrates an example in which the source driver IC 64 and an FPC 372 are mounted on the display device 100.

The peripheral circuit region 234 includes a circuit for supplying a signal to the display region 235. The circuit included in the peripheral circuit region 234 is, for example, a gate driver.

The wiring 365 has a function of supplying a signal and power to the display region 235 and the peripheral circuit region 234. The signal and power are input to the wiring 365 from the outside through the FPC 372 or from the source driver IC 64.

In the example of FIG. 26A, the source driver IC 64 is provided over the substrate 351 by a COG method. The source driver IC 64 here corresponds to the source driver IC 64 in Embodiment 1. An IC including a scan line driver circuit, a signal line driver circuit, or the like can be used, for example. Note that the source driver IC 64 may be mounted on the FPC by a COF method or the like.

FIG. 26A also illustrates an enlarged view of part of the display region 235. In the display region 235, a plurality of pixels 10 are arranged in a matrix. Each of the pixels 10 includes a light-emitting element 170 and a liquid crystal element 180 as display elements. The pixel 10 also includes a pixel circuit 236 for driving the display elements.

Figure 26B:
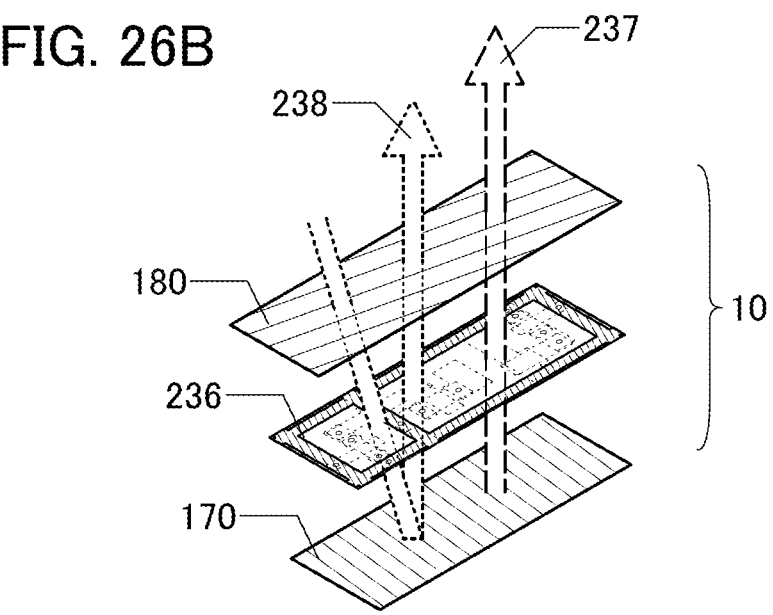
FIG. 26B illustrates an example of a pixel.

FIG. 26B is a schematic perspective view of the pixel 10. The light-emitting element 170 and the liquid crystal element 180 that are included in the pixel 10 overlap with each other with the pixel circuit 236 positioned therebetween. The pixel circuit 236 includes a first circuit for driving the light-emitting element 170 and a second circuit for driving the liquid crystal element 180.

Light 237 emitted from the light-emitting element 170 passes through the pixel circuit 236 and the liquid crystal element 180 and is extracted to the outside. Light 238 entering from the outside passes through the liquid crystal element 180 and the pixel circuit 236, is reflected by an electrode of the light-emitting element 170, passes through the pixel circuit 236 and the liquid crystal element 180 again, and is extracted to the outside as reflected light.

Figure 27A:
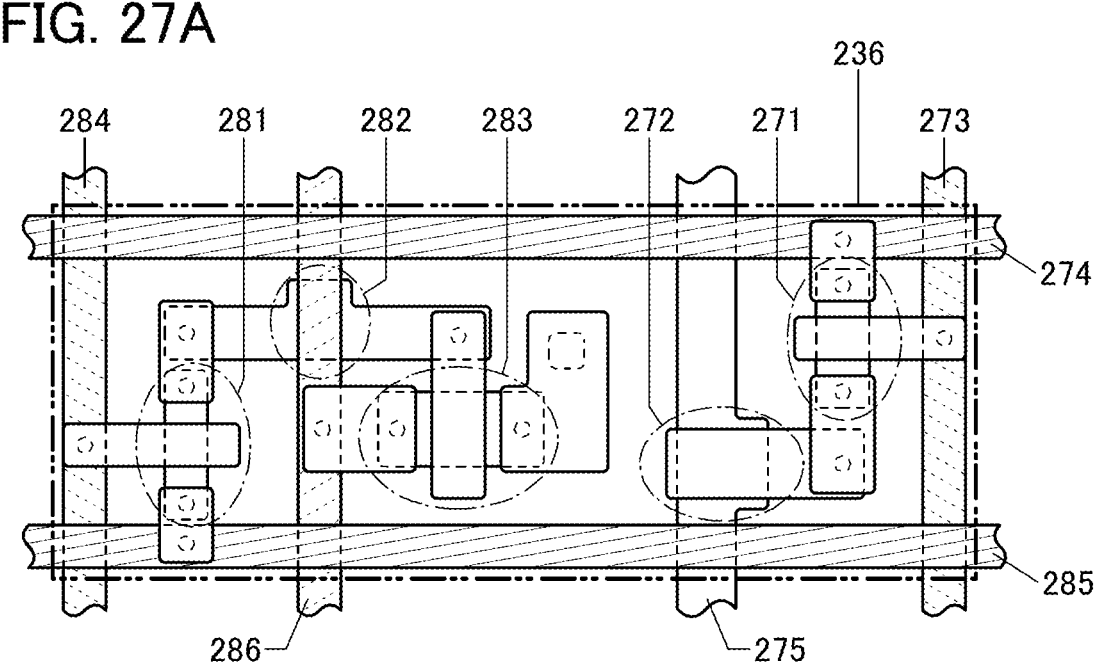
FIG. 27A illustrates a configuration example of a pixel circuit.

FIG. 27A illustrates a planar structure example of the pixel circuit 236. The pixel circuit 236 in FIG. 27A includes elements such as a transistor 271, a capacitor 272, a transistor 281, a capacitor 282, and a transistor 283. The pixel circuit 236 also includes part of a scan line 273, part of a signal line 274, part of a common potential line 275, part of a scan line 284, part of a signal line 285, and part of a power supply line 286.

As described above, the light 237 passes through the pixel circuit 236 once, and the light 238 passes through the pixel circuit 236 twice. Thus, the pixel circuit 236 preferably contains a light-transmitting material.

At least one of the transistor 271, the capacitor 272, the transistor 281, the capacitor 282, and the transistor 283 is preferably formed using a light-transmitting conductive material. In addition, electrodes connected to the above elements in the pixel circuit 236 are preferably formed using a light-transmitting material.

As the light-transmitting conductive material, a conductive oxide such as indium oxide, indium tin oxide, indium zinc oxide, zinc oxide, or zinc oxide to which gallium is added is used, for example. A conductive material having an energy band gap of 2.5 eV or more is particularly preferable because of its high visible-light transmittance.

However, the light-transmitting conductive material has resistivity higher than that of a light-blocking conductive material such as copper or aluminum. To prevent signal delay, bus lines such as the scan line 273, the signal line 274, the scan line 284, the signal line 285, and the power supply line 286 are preferably formed using a light-blocking conductive material (metal material) having low resistivity. Note that the bus lines are formed using the light-transmitting conductive material in some cases depending on the size of the display region 235, the widths of the bus lines, and the thicknesses of the bus lines, for example.

In general, the common potential line 275 is used to supply a constant potential to the pixel circuit 236, and a large amount of current does not flow in the common potential line 275. Thus, the common potential line 275 can be formed using the light-transmitting conductive material having high resistivity. Note that in the case where the display element is driven by changing the potential of the common potential line 275, the common potential line 275 is preferably formed using the light-blocking metal material having low resistivity.

Figure 27B:
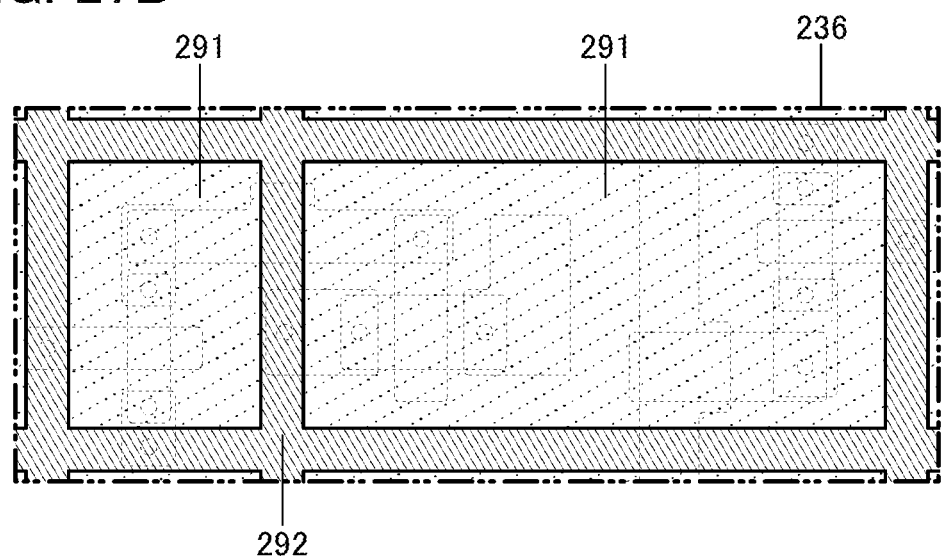
FIG. 27B illustrates a light-transmitting region and a light-blocking region in the pixel circuit.

FIG. 27B is a plan view illustrating a light-transmitting region 291 and a light-blocking region 292 in the pixel circuit 236. The light 237 and the light 238 are emitted through the light-transmitting region 291. Thus, in the plan view, the higher the proportion of the area of the light-transmitting region 291 to the area of the pixel 10 (also referred to as aperture ratio) is, the higher the extraction efficiencies of the light 237 and the light 238 are. That is, the power consumption of the display device 100 can be reduced. Furthermore, the visibility of the display device 100 can be increased. Moreover, the display quality of the display device 100 can be improved.

The aperture ratio of the display device 100 of one embodiment of the present invention can be 60% or higher or 80% or higher, by forming the elements included in the pixel circuit 236 using a light-transmitting material. In addition, since the light-emitting element 170 can be provided to overlap with the liquid crystal element 180, the total area of the light-emitting area of the light-emitting element 170 and the reflection area of the liquid crystal element 180 can be larger than or equal to the area of the pixel 10. In other words, when the area occupied by the pixel 10 is regarded as 100%, the total area of the light-emitting area and the reflection area can be 100% or higher. That is, the aperture ratio can be 100% or higher.

For example, in the case where the constant emission luminance (amount of light) per pixel is obtained, emission luminance per unit area can be lowered by increasing the light-emitting area of the light-emitting element 170. Accordingly, the deterioration of the light-emitting element 170 is reduced, leading to an increase in the reliability of the display device 100.

A self-luminous light-emitting element such as an organic EL element, an inorganic EL element, a light-emitting diode (LED), a QLED, or a semiconductor laser is preferably used as the light-emitting element 170. Alternatively, a transmissive liquid crystal element in which a light source (e.g., an LED) and a liquid crystal are combined can be used as the light-emitting element 170. Note that in this embodiment, the light-emitting element 170 is described as an organic EL element.

[Cross-Sectional Structure Example]

Figure 28:
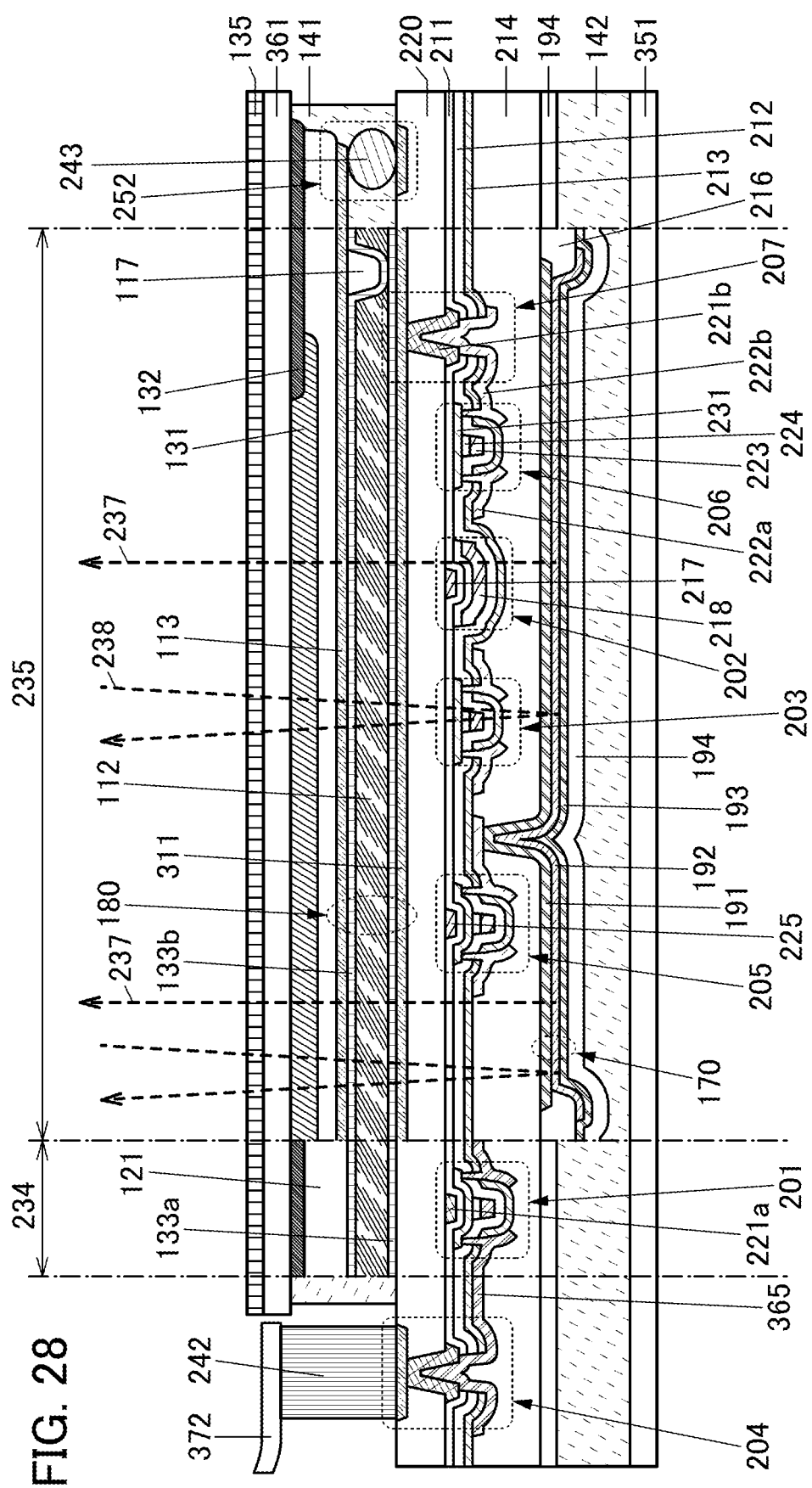
FIG. 28 is a cross-sectional view illustrating an example of a display device.

FIG. 28 illustrates an example of cross-sections of part of a region including the FPC 372, part of a region including the peripheral circuit region 234, and part of a region including the display region 235 of the display device 100 illustrated in FIG. 26A.

The display device 100 illustrated in FIG. 28 includes a transistor 201, a transistor 203, a transistor 205, a transistor 206, a capacitor 202, the liquid crystal element 180, the light-emitting element 170, an insulating layer 220, a coloring layer 131, and the like, between the substrate 351 and the substrate 361. The substrate 361 and the insulating layer 220 are bonded to each other with an adhesive layer 141. The substrate 351 and the insulating layer 220 are bonded to each other with an adhesive layer 142.

The substrate 361 is provided with the coloring layer 131, a light-blocking layer 132, an insulating layer 121, an electrode 113 functioning as a common electrode of the liquid crystal element 180, an alignment film 133b, an insulating layer 117, and the like. The insulating layer 121 may function as a planarization layer. The insulating layer 121 enables the electrode 113 to have an almost flat surface, resulting in a uniform alignment state of a liquid crystal 112. The insulating layer 117 serves as a spacer for holding a cell gap of the liquid crystal element 180. In the case where the insulating layer 117 transmits visible light, the insulating layer 117 may be positioned to overlap with a display region of the liquid crystal element 180.

Note that a functional member 135 such as an optical member can be placed on the outer surface of the substrate 361. Examples of the optical member include a polarizing plate, a retardation plate, a light diffusion layer (e.g., a diffusion film), an anti-reflection layer (also referred to as an AR layer), an anti-glare layer (also referred to as an AG layer), and a light-condensing film. Examples of the functional member except the optical member include an antistatic film preventing the attachment of dust, a water repellent film suppressing the attachment of stain, and a hard coat film suppressing generation of a scratch in use. As the functional member 135, some of the above members may be used in combination. For example, a circularly polarizing plate in which a linear polarizing plate and a retardation plate are combined may be used.

The AR layer has a function of reducing regular reflection (specular reflection) of external light by utilizing an optical interference effect. When the AR layer is used as the functional member 135, the AR layer is formed using a material with a refractive index different from that of the substrate 361. The AR layer can be formed using, for example, a material such as zirconium oxide, magnesium fluoride, aluminum oxide, or silicon oxide.

The anti-glare layer (AG layer) may be used instead of the AR layer. The AG layer has a function of reducing regular reflection (specular reflection) by diffusing incident external light.

As a method for forming the AG layer, a method in which fine unevenness is formed on a surface, a method in which materials with different refractive indices are mixed, a combination of both methods, and the like are known. For example, the AG layer can be formed by mixing a light-transmitting resin with nanofibers such as cellulose fibers, inorganic beads formed of silicon oxide or the like, resin beads, or the like.

The AG layer may be provided to overlap with the AR layer. When a stack including the AG layer and the AR layer is used, a function of preventing reflection and glare of external light can be enhanced. With the use of the AR layer and/or the AG layer, for example, the external-light reflectivity of a surface of the display device is preferably less than 1%, further preferably less than 0.3%.

The liquid crystal element 180 described in this embodiment is a reflective liquid crystal element using a conductive layer 193 of the light-emitting element 170 as a reflective electrode. The liquid crystal element 180 has a stacked-layer structure of an electrode 311, the liquid crystal 112, and the electrode 113. The electrode 311 and the electrode 113 transmit visible light. An alignment film 133a is provided between the liquid crystal 112 and the electrode 311. The alignment film 133b is provided between the liquid crystal 112 and the electrode 113.

When the conductive layer 193 of the light-emitting element 170 also serves as the reflective electrode of the liquid crystal element 180, the reflective electrode for the liquid crystal element 180 can be omitted. Accordingly, manufacturing costs of the display device can be reduced. In addition, the productivity of the display device can be improved.

In this embodiment, a circularly polarizing plate is used as the functional member 135. Light entering from the substrate 361 side is polarized by the functional member 135 (circularly polarizing plate), passes through the electrode 113, the liquid crystal 112, and the electrode 311, and is reflected by the conductive layer 193. Then, the light passes through the electrode 311, the liquid crystal 112, and the electrode 113 again and reaches the functional member 135 (circularly polarizing plate). In this case, alignment of the liquid crystal can be controlled with a voltage that is applied between the electrode 311 and the electrode 113, and thus optical modulation of light can be controlled. In other words, the intensity of light emitted through the functional member 135 (circularly polarizing plate) can be controlled. Light excluding light in a particular wavelength range is absorbed by the coloring layer 131, and thus, emitted light is red light, for example.

At a connection portion 207, the electrode 311 is electrically connected to a conductive layer 222b included in the transistor 206 via a conductive layer 221b. The transistor 206 has a function of controlling the driving of the liquid crystal element 180.

A connection portion 252 is provided in part of a region where the adhesive layer 141 is provided. In the connection portion 252, a conductive layer obtained by processing the same conductive film as the electrode 311 is electrically connected to part of the electrode 113 with a connector 243. Accordingly, a signal or a potential input from the FPC 372 can be supplied to the electrode 113 formed on the substrate 361 side through the connection portion 252.

As the connector 243, a conductive particle can be used, for example. As the conductive particle, a particle of an organic resin, silica, or the like coated with a metal material can be used. It is preferable to use nickel or gold as the metal material because contact resistance can be decreased. It is also preferable to use a particle coated with layers of two or more kinds of metal materials, such as a particle coated with nickel and further with gold. A material capable of elastic deformation or plastic deformation is preferably used for the connector 243. As illustrated in FIG. 28, the connector 243, which is a conductive particle, has a shape that is vertically crushed in some cases. With the crushed shape, the contact area between the connector 243 and a conductive layer electrically connected to the connector 243 can be increased, thereby reducing contact resistance and suppressing the generation of problems such as disconnection.

The connector 243 is preferably provided to be covered with the adhesive layer 141. For example, the connectors 243 are dispersed in the adhesive layer 141 that is not yet cured.

The light-emitting element 170 is a bottom-emission light-emitting element. The light-emitting element 170 has a structure in which a conductive layer 191, an EL layer 192, and the conductive layer 193 are stacked in this order from the insulating layer 220 side. The conductive layer 191 is connected to the conductive layer 222b included in the transistor 205 through an opening provided in an insulating layer 214. The transistor 205 has a function of controlling the driving of the light-emitting element 170. An insulating layer 216 covers an end portion of the conductive layer 191. The conductive layer 193 has a function of reflecting visible light, and the conductive layer 191 has a function of transmitting visible light. An insulating layer 194 is provided to cover the conductive layer 193. Light is emitted from the light-emitting element 170 to the substrate 361 side through the insulating layer 220, the electrode 311, the coloring layer 131, and the like.

The emission color of the light-emitting element 170 can be changed to white, red, green, blue, cyan, magenta, yellow, or the like depending on the material of the EL layer 192. The color of reflected light adjusted by the liquid crystal element 180 can be changed to white, red, green, blue, cyan, magenta, yellow, or the like depending on the material of the coloring layer 131. The light-emitting element 170 and the liquid crystal element 180 can achieve color display when the color of light varies among pixels.

It is possible that the light-emitting element 170 includes the EL layer 192 emitting white light and the white light is colored by the coloring layer 131.

To achieve color display, the emission colors of the light-emitting element 170 and the colors of the coloring layers combined with the liquid crystal element 180 may be yellow, cyan, and magenta, as well as red, green, and blue. The colors of the combined coloring layers may be determined as appropriate in accordance with the purpose, the uses, or the like.

The transistors 201, 203, 205, and 206 and the capacitor 202 are formed on a plane of the insulating layer 220 on the substrate 351 side. In FIG. 28, the transistors 201, 203, 205, and 206 are top-gate transistors.

The transistor 203 is used for controlling whether the pixel is selected or not (such a transistor is also referred to as a switching transistor or a selection transistor). The transistor 205 is used for controlling current flowing to the light-emitting element 170 (such a transistor is also referred to as a driving transistor).

Insulating layers such as an insulating layer 211, an insulating layer 212, an insulating layer 213, and the insulating layer 214 are provided on the substrate 351 side of the insulating layer 220. The insulating layers 212 and 213 are provided to cover gate electrodes of the transistors 201, 203, 205, and 206, and the like. The insulating layer 214 functions as a planarization layer. Note that the number of insulating layers covering the transistor is not limited and may be one or two or more.

A material through which impurities such as water and hydrogen do not easily diffuse is preferably used for at least one of the insulating layers that cover the transistors. This is because such an insulating layer can serve as a barrier film. Such a structure can effectively suppress diffusion of the impurities into the transistors from the outside, and a highly reliable display device can be achieved.

The capacitor 202 includes a conductive layer 217 and a conductive layer 218 partly overlapping with each other with the insulating layer 211 positioned therebetween. The conductive layer 217 can be formed using a material and a method that are similar to those of a conductive layer 225. The conductive layer 218 can be formed using a material and a method that are similar to those of a conductive layer 223. Note that the conductive layer 223, the conductive layer 225, and a conductive layer 222a are each preferably formed using a light-transmitting material.

The transistors 203, 205, and 206 are each formed using a light-transmitting material. As described above, a light-transmitting conductive material has resistivity higher than that of a light-blocking conductive material such as copper or aluminum. Accordingly, a conductive layer of the transistor 201 included in the peripheral circuit region 234 which should operate at high speed is formed using a light-blocking conductive material (metal material) having low resistivity.

Each of the transistors 203, 205, and 206 includes the conductive layer 223 functioning as a gate, an insulating layer 224 functioning as a gate insulating layer, the conductive layer 222a and the conductive layer 222b functioning as a source and a drain, and a semiconductor layer 231. Here, a plurality of layers obtained by processing the same conductive film are shown with the same hatching pattern. The transistor 205 also includes the conductive layer 225 which can function as another gate.

Similarly, the transistor 201 includes a conductive layer functioning as a gate, an insulating layer functioning as a gate insulating layer, conductive layers functioning as a source and a drain, and a semiconductor layer. The transistor 201 also includes a conductive layer 221a which can function as another gate. The conductive layer 221a and the conductive layer 221b can be obtained by processing the same conductive film.

The structure in which the semiconductor layer where a channel is formed is provided between two gates is used for the transistors 201 and 205. Such a structure enables the control of the threshold voltage of the transistors. The two gates may be connected to each other and supplied with the same signal to operate the transistors. Such transistors can have higher field-effect mobility and thus have higher on-state current than other transistors. Consequently, a circuit capable of high-speed operation can be obtained. Furthermore, the area occupied by a circuit portion can be reduced. The use of the transistor having high on-state current can reduce signal delay in wirings and can reduce display unevenness even in a display device in which the number of wirings is increased because of increase in size or definition.

Alternatively, by supplying a potential for controlling the threshold voltage to one of the two gates and a potential for driving to the other, the threshold voltage of the transistor can be controlled.

There is no limitation on the structure of the transistors included in the display device. The transistor included in the peripheral circuit region 234 and the transistor included in the display region 235 may have the same structure or different structures. A plurality of transistors included in the peripheral circuit region 234 may have the same structure or a combination of two or more kinds of structures. Similarly, a plurality of transistors included in the display region 235 may have the same structure or a combination of two or more kinds of structures.

The conductive layers functioning as the gates may be formed using a conductive material containing oxide. The conductive layers are formed in an oxygen-containing atmosphere, whereby oxygen can be supplied to the gate insulating layer. The proportion of an oxygen gas in a deposition gas is preferably higher than or equal to 90% and lower than or equal to 100%. Oxygen supplied to the gate insulating layer is then supplied to the semiconductor layer by later heat treatment; as a result, oxygen vacancies in the semiconductor layer can be reduced.

A connection portion 204 is provided in a region where the substrate 351 and the substrate 361 do not overlap with each other. In the connection portion 204, the wiring 365 is electrically connected to the FPC 372 via a connection layer 242. The connection portion 204 has a structure similar to that of the connection portion 207. On the top surface of the connection portion 204, a conductive layer obtained by processing the same conductive film as the electrode 311 is exposed. Thus, the connection portion 204 and the FPC 372 can be electrically connected to each other via the connection layer 242.

The liquid crystal element 180 can employ, for example, a vertical alignment (VA) mode. Examples of the vertical alignment mode include a multi-domain vertical alignment (MVA) mode, a patterned vertical alignment (PVA) mode, and an advanced super view (ASV) mode.

The liquid crystal element 180 can employ a variety of modes. For example, a liquid crystal element using a VA mode, a twisted nematic (TN) mode, an in-plane switching (IPS) mode, a VA-IPS mode, a fringe field switching (FFS) mode, an axially symmetric aligned micro-cell (ASM) mode, an optically compensated birefringence (OCB) mode, a ferroelectric liquid crystal (FLC) mode, an antiferroelectric liquid crystal (AFLC) mode, a guest-host mode, or the like can be used.

The liquid crystal element controls transmission or non-transmission of light utilizing an optical modulation action of a liquid crystal. The optical modulation action of the liquid crystal is controlled by an electric field applied to the liquid crystal (including a horizontal electric field, a vertical electric field, or an oblique electric field). As the liquid crystal used for the liquid crystal element, a thermotropic liquid crystal, a low-molecular liquid crystal, a high-molecular liquid crystal, a polymer dispersed liquid crystal (PDLC), a ferroelectric liquid crystal, an anti-ferroelectric liquid crystal, or the like can be used. Such a liquid crystal material exhibits a cholesteric phase, a smectic phase, a cubic phase, a chiral nematic phase, an isotropic phase, or the like depending on conditions.

As the liquid crystal material, a positive liquid crystal or a negative liquid crystal may be used, and an appropriate liquid crystal material can be used depending on the mode or design to be used.

An alignment film can be provided to adjust the alignment of a liquid crystal. In the case where a horizontal electric field mode is employed, a liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase appears only in a narrow temperature range, a liquid crystal composition in which a chiral material is mixed to account for several weight percent or more is used for the liquid crystal in order to improve the temperature range. The liquid crystal composition which includes a liquid crystal exhibiting a blue phase and a chiral material has a short response time and optical isotropy, which makes the alignment process unneeded. In addition, the liquid crystal composition which includes a liquid crystal exhibiting a blue phase and a chiral material has a small viewing angle dependence. An alignment film does not need to be provided and rubbing treatment is thus not necessary; accordingly, electrostatic discharge damage caused by the rubbing treatment can be prevented and defects and damage of a liquid crystal display device in the manufacturing process can be reduced.

Note that when a guest-host mode liquid crystal material is used for the liquid crystal element 180, a functional member such as a light diffusion layer or a polarizing plate is not necessarily provided. Accordingly, the productivity of the display device can be improved. In addition, since a functional member such as a polarizing plate is unnecessary, the luminance of reflected light of the liquid crystal element 180 can be increased. Accordingly, the visibility of the display device can be increased.

The on and off states (bright and dark states) of a reflective liquid crystal display device including a circularly polarizing plate are switched depending on the alignment direction of the major axes of liquid crystal molecules: a direction substantially perpendicular to a substrate or a direction substantially parallel to the substrate. In general, it is difficult to use a liquid crystal element that operates in a horizontal electric field mode such as an IPS mode in a reflective liquid crystal display device because the major axes of liquid crystal molecules in the liquid crystal element are aligned in a direction substantially parallel to a substrate in both of the on and off states.

The on and off states of a liquid crystal element that operates in a horizontal electric field mode such as a VA-IPS mode are switched depending on the alignment direction of the major axes of liquid crystal molecules: a direction substantially perpendicular to a substrate or a direction substantially parallel to the substrate. Thus, when a liquid crystal element that operates in a horizontal electric field mode is used in a reflective liquid crystal display device, the liquid crystal element preferably operates in a VA-IPS mode.

A front light may be provided on the outer side of the functional member 135. As the front light, an edge-light front light is preferably used. A front light including a light-emitting diode (LED) is preferably used to reduce power consumption.

As the adhesive layer, a variety of curable adhesives such as a reactive curable adhesive, a thermosetting adhesive, an anaerobic adhesive, and a photocurable adhesive such as an ultraviolet curable adhesive can be used. Examples of these adhesives include an epoxy resin, an acrylic resin, a silicone resin, a phenol resin, a polyimide resin, an imide resin, a polyvinyl chloride (PVC) resin, a polyvinyl butyral (PVB) resin, and an ethylene vinyl acetate (EVA) resin. In particular, a material with low moisture permeability, such as an epoxy resin, is preferred. Alternatively, a two-component resin may be used. Further alternatively, an adhesive sheet or the like may be used.

As the connection layer 242, an anisotropic conductive film (ACF), an anisotropic conductive paste (ACP), or the like can be used.

The light-emitting element has a top-emission structure, a bottom-emission structure, a dual-emission structure, or the like. A conductive film that transmits visible light is used as the electrode through which light is extracted. A conductive film that reflects visible light is preferably used as the electrode through which light is not extracted. The light-emitting element 170 can be referred to as a bottom-emission light-emitting element.

The EL layer 192 includes at least a light-emitting layer. In addition to the light-emitting layer, the EL layer 192 may further include one or more layers containing any of a substance with a high hole-injection property, a substance with a high hole-transport property, a hole-blocking material, a substance with a high electron-transport property, a substance with a high electron-injection property, a substance with a bipolar property (a substance with a high electron- and hole-transport property), and the like.

The emission color of the light-emitting element 170 can be changed to white, red, green, blue, cyan, magenta, yellow, or the like depending on the material of the EL layer 192.

As a color display method, there are a method in which the light-emitting element 170 whose emission color is white is combined with a coloring layer and a method in which the light-emitting element 170 with a different emission color is provided in each subpixel. The former method is more productive than the latter method. In other words, the latter method, which requires separate formation of the EL layer 192 subpixel by subpixel, is less productive than the former method. However, the latter method can produce the emission color with higher color purity than the emission color produced by the former method. When the light-emitting element 170 has a microcavity structure in the latter method, the color purity can be further increased.

For the EL layer 192, either a low molecular compound or a high molecular compound can be used, and an inorganic compound may also be contained. The layers included in the EL layer 192 can be formed by any of the following methods: an evaporation method (including a vacuum evaporation method), a transfer method, a printing method, an inkjet method, a coating method, and the like.

The EL layer 192 may contain an inorganic compound such as quantum dots. For example, quantum dots used for the light-emitting layer can serve as light-emitting materials.

The display device 100 of one embodiment of the present invention does not include a substrate between the light-emitting element 170 and the liquid crystal element 180. Thus, a distance in the thickness direction between the light-emitting element 170 and the liquid crystal element 180 can be less than 30 µm, preferably less than 10 µm, and further preferably less than 5 µm. Accordingly, in the case of using the light-emitting element 170 and the liquid crystal element 180 at the same time or alternately, a difference between the display using the light-emitting element 170 and the display using the liquid crystal element 180 can be reduced. Furthermore, the weight of the display device 100 can be reduced. Moreover, the thickness of the display device 100 can be reduced. In addition, the display device 100 is easily bendable.

[Substrate]

There is no particular limitation on a material used for the substrate 351 and the substrate 361. The material is determined according to the purpose in consideration of whether it has a light-transmitting property, heat resistance high enough to withstand heat treatment, or the like. For example, a glass substrate of barium borosilicate glass, aluminoborosilicate glass, or the like, a ceramic substrate, a quartz substrate, a sapphire substrate, or the like can be used. Alternatively, a semiconductor substrate, a flexible substrate, an attachment film, a base film, or the like may be used.

As the semiconductor substrate, a semiconductor substrate of silicon, germanium, or the like or a compound semiconductor substrate of silicon carbide, silicon germanium, gallium arsenide, indium phosphide, zinc oxide, or gallium oxide, or the like is used, for example. As the semiconductor substrate, a single-crystal semiconductor or a polycrystalline semiconductor may be used.

To increase the flexibility of the display device 100, a flexible substrate, an attachment film, a base film, or the like may be used as each of the substrate 351 and the substrate 361.

Examples of materials that can be used for the flexible substrate, the attachment film, the base film, and the like include polyester resins such as polyethylene terephthalate (PET) and polyethylene naphthalate (PEN), a polyacrylonitrile resin, an acrylic resin, a polyimide resin, a polymethyl methacrylate resin, a polycarbonate (PC) resin, a polyethersulfone (PES) resin, polyamide resins (e.g., nylon and aramid), a polysiloxane resin, a cycloolefin resin, a polystyrene resin, a polyamide-imide resin, a polyurethane resin, a polyvinyl chloride resin, a polyvinylidene chloride resin, a polypropylene resin, a polytetrafluoroethylene (PTFE) resin, an ABS resin, and cellulose nanofiber.

When any of the above-described materials is used for the substrates, a lightweight display device can be provided. Furthermore, when any of the above-described materials is used for the substrates, a shock-resistant display device can be provided. Moreover, when any of the above-described materials is used for the substrates, a non-breakable display device can be provided.

The flexible substrate used as the substrate 351 or 361 preferably has a lower coefficient of linear expansion because deformation due to an environment is suppressed. The flexible substrate used as the substrate 351 or 361 is formed using, for example, a material whose coefficient of linear expansion is lower than or equal to $1 \times 10^{-3}$/K, lower than or equal to $5 \times 10^{-5}$/K, or lower than or equal to $1 \times 10^{-5}$/K. In particular, aramid is preferably used for the flexible substrate because of its low coefficient of linear expansion.

[Conductive Layer]

As materials for a gate, a source, and a drain of a transistor, and a conductive layer such as a wiring or an electrode included in a display device, any of metals such as aluminum, titanium, chromium, nickel, copper, yttrium, zirconium, molybdenum, silver, tantalum, and tungsten, or an alloy containing any of these metals as its main component can be used. A single-layer structure or multi-layer structure including a film containing any of these materials can be used.

As a light-transmitting conductive material, a conductive oxide such as indium oxide, indium tin oxide, indium zinc oxide, zinc oxide, or zinc oxide to which gallium is added, or graphene can be used. Alternatively, as a light-transmitting conductive material, an oxide conductor can be used. Alternatively, a metal material such as gold, silver, platinum, magnesium, nickel, tungsten, chromium, molybdenum, iron, cobalt, copper, palladium, or titanium, or an alloy material containing any of these metal materials can be used. Alternatively, a nitride of the metal material (e.g., titanium nitride) or the like may be used. In the case of using the metal material or the alloy material (or the nitride thereof), the thickness is set small enough to be able to transmit light. Alternatively, a stacked film of any of the above materials can be used for the conductive layers. For example, a stacked film of indium tin oxide and an alloy of silver and magnesium is preferably used because the conductivity can be increased. They can also be used for conductive layers such as a variety of wirings and electrodes included in a display device, and conductive layers (e.g., conductive layers serving as a pixel electrode or a common electrode) included in a display element.

Here, an oxide conductor is described. In this specification and the like, an oxide conductor may be referred to as OC. For example, the oxide conductor is obtained in the following manner. Oxygen vacancies are formed in a metal oxide, and then hydrogen is added to the oxygen vacancies, so that a donor level is formed in the vicinity of the conduction band. This increases the conductivity of the metal oxide; accordingly, the metal oxide becomes a conductor. The metal oxide having become a conductor can be referred to as an oxide conductor. An oxide semiconductor generally transmits visible light because of its large energy gap. Since an oxide conductor is a metal oxide having a donor level in the vicinity of the conduction band, the influence of absorption due to the donor level is small in the oxide conductor, and the oxide conductor has a visible light transmitting property comparable to that of an oxide semiconductor.

[Insulating Layer]

Examples of an insulating material that can be used for the insulating layers include a resin material such as acrylic or epoxy, and an inorganic insulating material such as silicon oxide, silicon oxynitride, silicon nitride oxide, silicon nitride, or aluminum oxide.

[Coloring Layer]

Examples of a material that can be used for the coloring layer include a metal material, a resin material, and a resin material containing a pigment or dye.

[Light-Blocking Layer]

Examples of a material that can be used for the light-blocking layer include carbon black, titanium black, a metal, a metal oxide, and a composite oxide containing a solid solution of a plurality of metal oxides. The light-blocking layer may be a film containing a resin material or a thin film of an inorganic material such as a metal. Stacked films containing the material of the coloring layer can also be used for the light-blocking layer. For example, a stacked-layer structure of a film containing a material of a coloring layer which transmits light of a certain color and a film containing a material of a coloring layer which transmits light of another color can be employed. The coloring layer and the light-blocking layer are preferably formed using the same material, in which case the same manufacturing apparatus can be used and the process can be simplified.

MODIFICATION EXAMPLE 1

Figure 29:
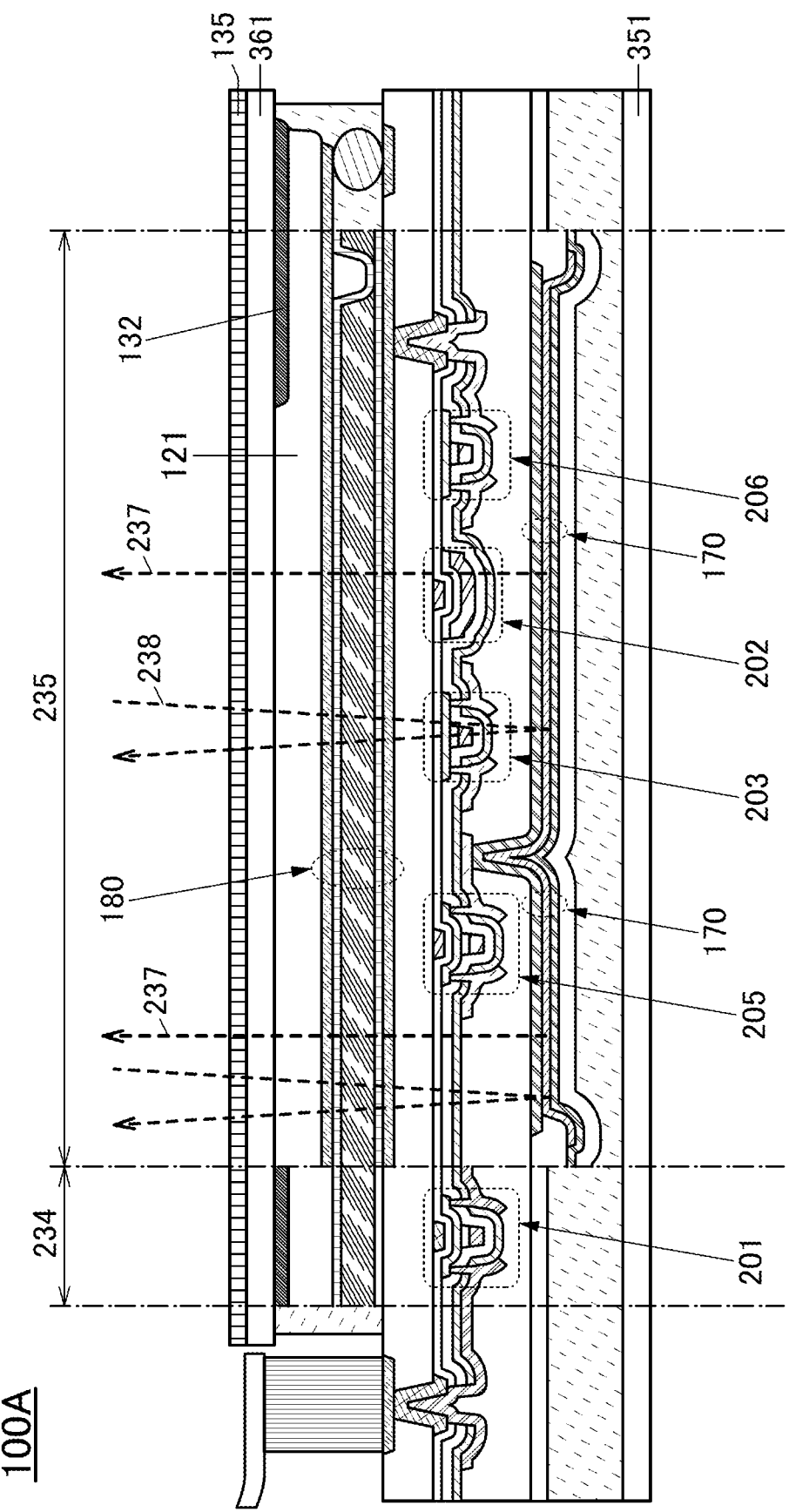
FIG. 29 is a cross-sectional view illustrating an example of a display device.

FIG. 29 illustrates a cross section of a display device 100A, which is a modification example of the display device 100. The display device 100A is different from the display device 100 in that the coloring layer 131 is not provided. Other components are similar to those of the display device 100 and thus are not described in detail.

In the display device 100A, the liquid crystal element 180 emits white light. Since the coloring layer 131 is not provided, the display device 100A can display a black and white image or a grayscale image using the liquid crystal element 180.

MODIFICATION EXAMPLE 2

Figure 30:
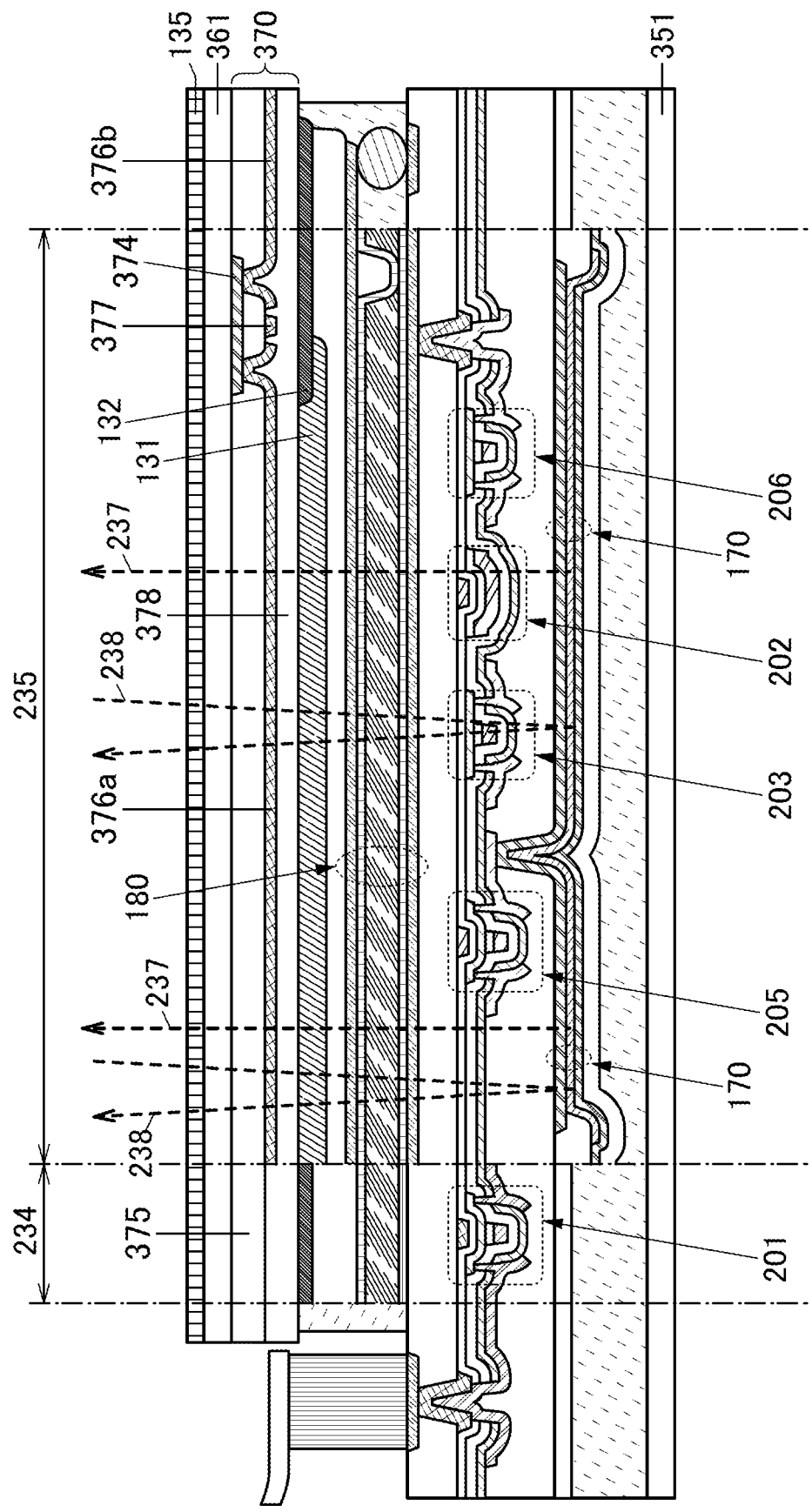
FIG. 30 is a cross-sectional view illustrating an example of a display device.

FIG. 30 illustrates a cross section of a display device 100B, which is another modification example of the display device 100. The display device 100B includes a touch sensor 370 between the substrate 361 and the coloring layer 131. In this embodiment, the touch sensor 370 includes a conductive layer 374, an insulating layer 375, a conductive layer 376a, a conductive layer 376b, a conductive layer 377, and an insulating layer 378.

The conductive layers 376a, 376b, and 377 are preferably formed using a light-transmitting conductive material. However, a light-transmitting conductive material generally has resistivity higher than that of a metal material that does not have a light-transmitting property. Thus, the conductive layers 376a, 376b, and 377 are formed using a metal material having low resistivity in some cases to increase the size and definition of the touch sensor.

When the conductive layers 376a, 376b, and 377 are formed using a metal material, the reflection of external light is preferably reduced. Although a metal material generally has high reflectivity, the reflectivity of the metal material can be reduced by oxidation treatment or the like to make the metal material darkened.

The conductive layers 376a, 376b, and 377 may be formed using a stack including a metal layer and a layer having low reflectivity (also referred to as a dark layer). The dark layer has high resistivity; thus, the stack including the metal layer and the dark layer is preferable. Examples of the dark layer include a layer containing copper oxide and a layer containing copper chloride or tellurium chloride. Alternatively, the dark layer may be formed using a metal particle such as an Ag particle, an Ag fiber, or a Cu particle, a carbon nanoparticle such as a carbon nanotube (CNT) or graphene, or a conductive high molecule such as PEDOT, polyaniline, or polypyrrole, for example.

As the touch sensor 370, an optical touch sensor including a photoelectric conversion element as well as a resistive touch sensor or a capacitive touch sensor may be used. Examples of the capacitive touch sensor include a surface capacitive touch sensor and a projected capacitive touch sensor. Examples of the projected capacitive touch sensor include a self-capacitive touch sensor and a mutual capacitive touch sensor, which differ mainly in the driving method. The use of a mutual capacitive touch sensor is preferable because multiple points can be sensed simultaneously.

Other components are similar to those of the display device 100 and thus are not described in detail.

Alternatively, a touch sensor may be provided to overlap with the substrate 361 of the display device 100 without the formation of the touch sensor 370 between the substrate 361 and the coloring layer 131. For example, a sheet-like touch sensor 176 may be provided to overlap with the display region 235.

[Transistor]

There is no particular limitation on the structure of the transistor included in the display device of one embodiment of the present invention. For example, a planar transistor, a staggered transistor, or an inverted staggered transistor may be used. A top-gate transistor or a bottom-gate transistor may be used. Gate electrodes may be provided above and below a channel.

[Semiconductor Material]

There is no particular limitation on the crystallinity of a semiconductor material used for the semiconductor layer of the transistor. An amorphous semiconductor or a semiconductor having crystallinity (a microcrystalline semiconductor, a polycrystalline semiconductor, a single-crystal semiconductor, or a semiconductor partly including crystal regions) may be used. A semiconductor having crystallinity is preferably used, in which case deterioration of the transistor characteristics can be suppressed.

As the semiconductor material used for the semiconductor layer of the transistor, silicon or germanium can be used, for example. Alternatively, a compound semiconductor such as silicon carbide, gallium arsenide, or a nitride semiconductor, an organic semiconductor, or the like can be used.

As a semiconductor material used for the transistor, polycrystalline silicon (polysilicon) or amorphous silicon can be used, for example.

An OS transistor including a metal oxide can be used as the transistor. The use of the OS transistor is preferable because current flowing between a source and a drain in an off state of the transistor can be reduced.

<Circuit Configuration Example of Pixel 10>

Figure 31:
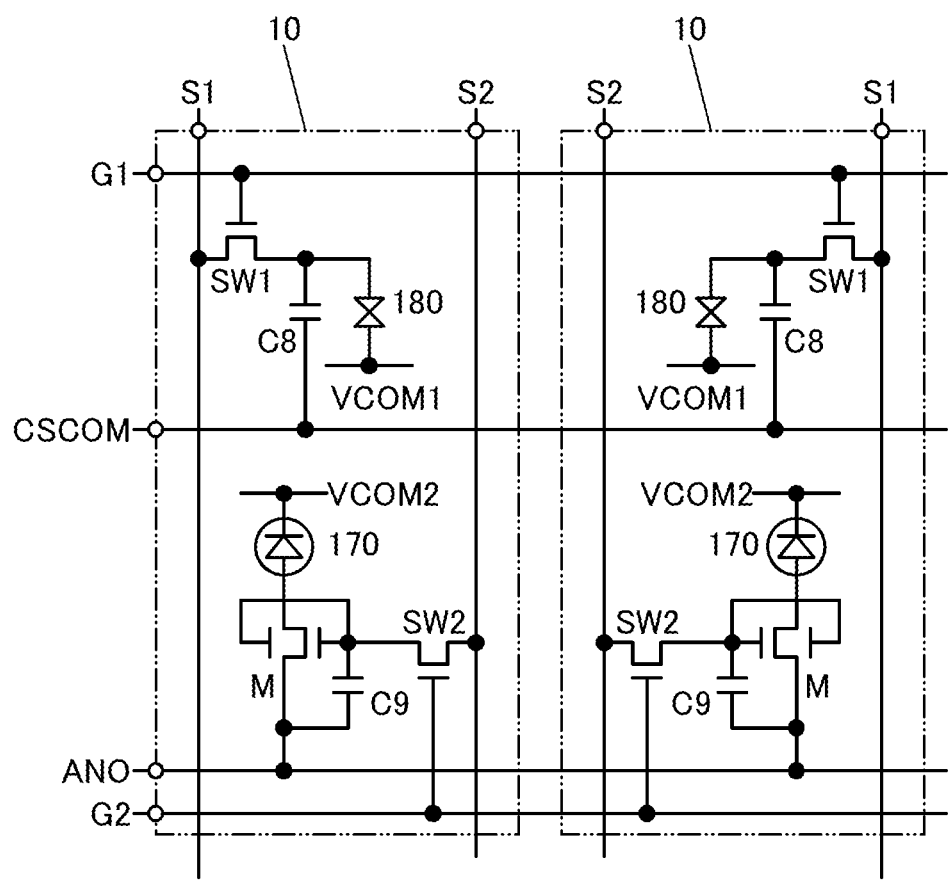
FIG. 31 illustrates a circuit configuration example of a pixel.

FIG. 31 illustrates a circuit configuration example of the pixel 10. FIG. 31 illustrates two adjacent pixels 10.

The pixels 10 each include a switch SW1, a capacitor C8, the liquid crystal element 180, a switch SW2, a transistor M, a capacitor C9, the light-emitting element 170, and the like. The pixel 10 is electrically connected to a wiring G1, a wiring G2, a wiring ANO, a wiring CSCOM, a wiring S1, and a wiring S2. FIG. 31 illustrates a wiring VCOM1 electrically connected to the liquid crystal element 180 and a wiring VCOM2 electrically connected to the light-emitting element 170.

FIG. 31 illustrates an example in which a transistor is used as each of the switches SW1 and SW2. Note that the switch SW1 corresponds to the transistor 271. The switch SW2 corresponds to the transistor 281. The transistor M corresponds to the transistor 283. The capacitor C8 corresponds to the capacitor 272. The capacitor C9 corresponds to the capacitor 282 (see FIG. 31 and FIG. 27A).

A gate of the switch SW1 is connected to the wiring G1. One of a source and a drain of the switch SW1 is connected to the wiring S1, and the other of the source and the drain is connected to one electrode of the capacitor C8 and one electrode of the liquid crystal element 180. The other electrode of the capacitor C8 is connected to the wiring CSCOM. The other electrode of the liquid crystal element 180 is connected to the wiring VCOM1.

A gate of the switch SW2 is connected to the wiring G2. One of a source and a drain of the switch SW2 is connected to the wiring S2, and the other of the source and the drain is connected to one electrode of the capacitor C9 and a gate of the transistor M. The other electrode of the capacitor C9 is connected to one of a source and a drain of the transistor M and the wiring ANO. The other of the source and the drain of the transistor M is connected to one electrode of the light-emitting element 170. The other electrode of the light-emitting element 170 is connected to the wiring VCOM2.

FIG. 31 illustrates an example in which the transistor M includes two gates between which a semiconductor is provided and which are connected to each other. This structure can increase the amount of current flowing through the transistor M.

The wiring G1 can be supplied with a signal for changing the on/off state of the switch SW1. A predetermined potential can be supplied to the wiring VCOM1. The wiring S1 can be supplied with a signal for changing the orientation of liquid crystals of the liquid crystal element 180. A predetermined potential can be supplied to the wiring CSCOM.

The wiring G2 can be supplied with a signal for changing the on/off state of the switch SW2. The wiring VCOM2 and the wiring ANO can be supplied with potentials having a difference large enough to make the light-emitting element 170 emit light. The wiring S2 can be supplied with a signal for changing the conduction state of the transistor M.

In the pixel 10 of FIG. 31, for example, an image can be displayed in the reflective mode by driving the pixel with the signals supplied to the wiring G1 and the wiring S1 and utilizing the optical modulation of the liquid crystal element 180. In the case where an image is displayed in the light-emitting mode, the pixel is driven with the signals supplied to the wiring G2 and the wiring S2 and the light-emitting element 170 emits light. In the case where both modes are performed at the same time, the pixel can be driven with the signals supplied to the wiring G1, the wiring G2, the wiring S1, and the wiring S2.

Figure 32:
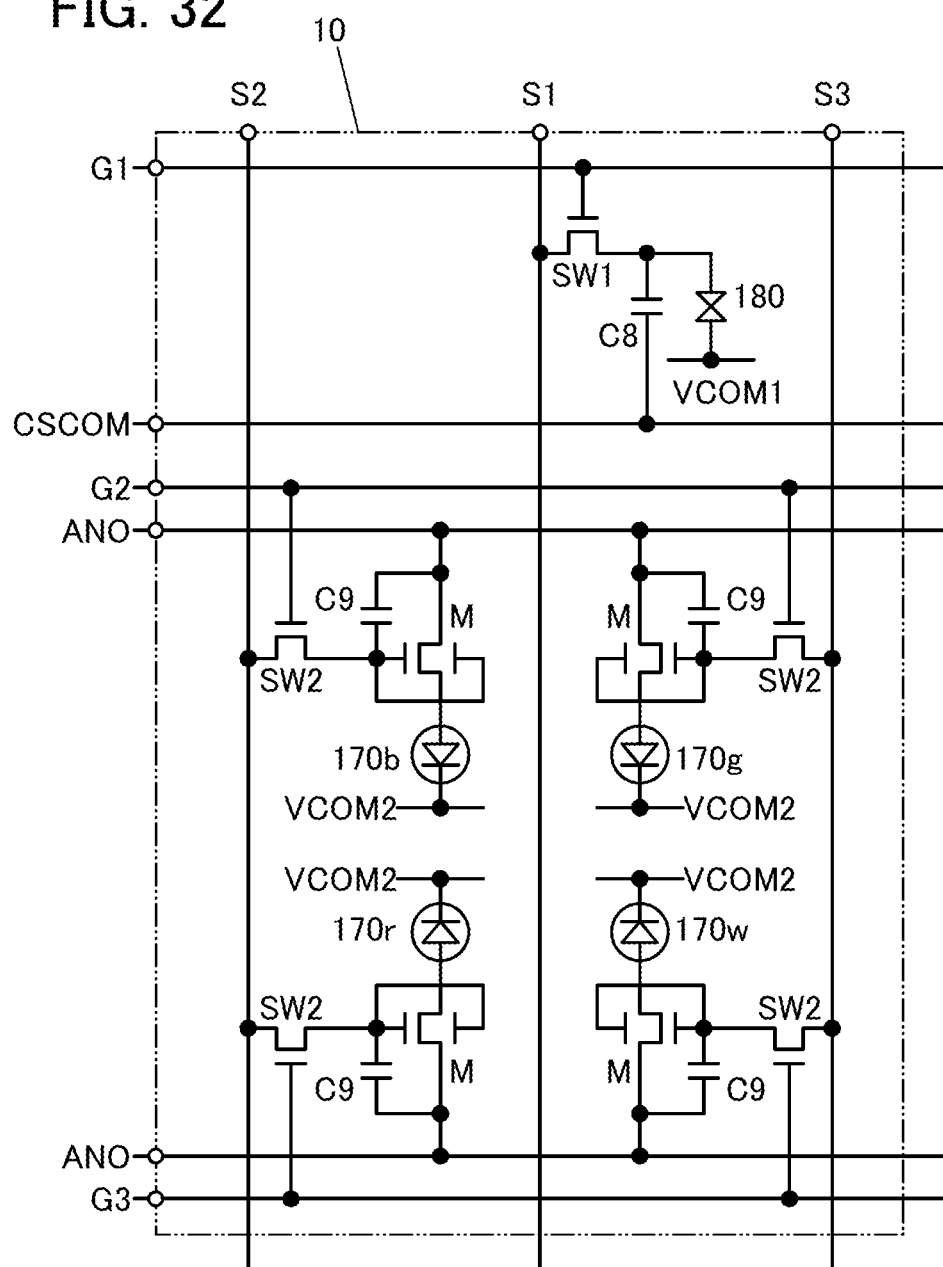
FIG. 32 illustrates a circuit configuration example of a pixel.

Although FIG. 31 illustrates an example in which one pixel 10 includes one liquid crystal element 180 and one light-emitting element 170, one embodiment of the present invention is not limited to this example. FIG. 32 illustrates an example in which one pixel 10 includes one liquid crystal element 180 and four light-emitting elements 170 (light-emitting elements 170r, 170g, 170b, and 170w). The pixel 10 illustrated in FIG. 32 differs from that in FIG. 31 in being capable of performing full-color display by one pixel.

In addition to the example in FIG. 31, the pixel 10 in FIG. 32 is connected to a wiring G3 and a wiring S3.

In the example in FIG. 32, light-emitting elements emitting red light (R), green light (G), blue light (B), and white light (W) can be used as the four light-emitting elements 170, for example. Furthermore, as the liquid crystal element 180, a reflective liquid crystal element emitting white light can be used. Thus, in the case of performing display in the reflective mode, white display with high reflectivity can be performed. In the case of performing display in the light-emitting mode, images can be displayed with a high color rendering property at low power consumption.

<Display Mode>

The display device 100 can be operated in three display modes. A first display mode (mode 1) is a display mode for displaying an image as a reflective liquid crystal display device. A second display mode (mode 2) is a display mode for displaying an image as a light-emitting display device. A third display mode (mode 3) is a display mode in which the first display mode and the second display mode are adopted at the same time.

[First Display Mode]

The first display mode does not require a light source and thus is an extremely low-power display mode. The first display mode is particularly effective in the case where, for example, external light is white or near-white light with sufficiently high illuminance. Furthermore, the first display mode is particularly effective in an environment with illuminance of more than approximately 300 lx, for example, in the light of daytime. However, depending on the purpose, uses, or the like, the display device 100 is made to operate in the first display mode even in an environment with illuminance of less than approximately 300 lx, in some cases.

The first display mode is suitable for displaying text information of a book or a document, for example. The first display mode can offer eye-friendly display because reflected light is used for displaying an image, and thus has an effect of being unlikely to cause eyestrain.

FIG. 33A1 illustrates a state in which an electronic device 910 is used outdoors in the daytime. In FIG. 33A1, a display device of the electronic device 910 operates in the first display mode. The electronic device 910 is a portable information terminal such as a smartphone, for example. The electronic device 910 includes the display device 100 of one embodiment of the present invention.

FIG. 33A2 illustrates incident light 901 which enters the display device 100 of the electronic device 910 and reflected light 902 which is reflected by the display device 100.

[Second Display Mode]

The second display mode is a display mode that allows extremely vivid (high contrast and high color reproducibility) display regardless of the illuminance and chromaticity of external light. For example, the second display mode is effective in the case where the illuminance of external light is low, such as during the nighttime or in a room. The second display mode is particularly effective in an environment with illuminance of less than approximately 5000 lx. However, depending on the purpose, uses, or the like, the display device 100 is made to operate in the second display mode even in an environment with illuminance of more than approximately 5000 lx, in some cases. When a bright image is displayed with low external light illuminance, a user may feel that the image is too bright. To prevent this, an image with reduced luminance is preferably displayed in the second display mode. Thus, not only a reduction in luminance but also low power consumption can be achieved. The second display mode is suitable for displaying a vivid image and a smooth moving image, for example.

FIG. 33B1 illustrates a state in which the electronic device 910 is used outdoors in the nighttime. An electronic device 920 in FIG. 33B1 is an electronic device used for digital signage. In FIG. 33B1, the display devices in the electronic device 910 and the electronic device 920 operate in the second display mode. The electronic device 920 includes the display device 100 of one embodiment of the present invention.

FIG. 33B2 illustrates emitted light 903 which is emitted from the display device 100 of the electronic device 910 and emitted light 903 which is emitted from the display device 100 of the electronic device 920.

[Third Display Mode]

The third display mode is a display mode for displaying an image by utilizing both reflected light in the first display mode and emitted light in the second display mode. For example, in the case where light having luminance that is more than or equal to maximum luminance of the reflected light in the first display mode needs to be emitted from the display device 100, light emission in the second display mode can make up for a shortage of light. Furthermore, for example, reflected light in the first display mode and emitted light in the second display mode can be combined to express one color.

The third display mode can display a more vivid image than the first display mode and suppress power consumption compared with the second display mode. For example, the third display mode is effective when the illuminance of external light is relatively low such as under indoor illumination or in the morning or evening, or when the external light does not represent a white chromaticity.

The third display mode is particularly effective in an environment with illuminance of less than approximately 5000 lx. However, depending on the purpose, uses, or the like, the display device 100 is made to operate in the third display mode even in an environment with illuminance of more than approximately 5000 lx, in some cases.

FIG. 33C1 illustrates a state in which the electronic device 910 is used indoors. An electronic device 930 in FIG. 33C1 is an electronic device that can function as a television or a monitor. Furthermore, an electronic device 940 in FIG. 33C1 is a laptop personal computer. In FIG. 33C1, the display devices in the electronic devices 910, 930, and 940 operate in the third display mode. The electronic device 930 and the electronic device 940 each include the display device 100 of one embodiment of the present invention.

FIG. 33C2 illustrates the emitted light 903 which is emitted from the display device 100 of the electronic device 910, the incident light 901 which enters the display device 100 of the electronic device 910, and the reflected light 902 which is reflected by the display device 100 of the electronic device 910. In addition, FIG. 33C2 illustrates the emitted light 903 which is emitted from the display device 100 of the electronic device 930, the incident light 901 which enters the display device 100 of the electronic device 930, and the reflected light 902 which is reflected by the display device 100 of the electronic device 930. The display device 100 of the electronic device 940 can function in a manner similar to that of the other display devices 100.

Note that display using the third display mode can also be referred to as a hybrid display mode. Hybrid display is a method for displaying a letter and/or an image using reflected light and self-emitted light together in one panel that complement the color tone or light intensity of each other. Alternatively, hybrid display is a method for displaying a letter and/or an image using light from a plurality of display elements in one pixel or one subpixel. Note that when a display device that performs hybrid display (also referred to as "a hybrid display device" or "a hybrid display") is locally observed, a pixel or a subpixel performing display using any one of the plurality of display elements and a pixel or a subpixel performing display using two or more of the plurality of display elements are included in some cases.

Note that in the present specification and the like, hybrid display satisfies any one or a plurality of the above-described descriptions.

Furthermore, a hybrid display includes a plurality of display elements in one pixel or one subpixel. Note that as an example of the plurality of display elements, a reflective element that reflects light and a self-luminous element that emits light can be given. Note that the reflective element and the self-luminous element can be controlled independently. A hybrid display has a function of displaying a letter and/or an image using one or both of reflected light and self-emitted light in a display portion.

This embodiment can be implemented in appropriate combination with any of the structures described in the other embodiments and the like.

Embodiment 5

In this embodiment, a data processor in which the display device of any of the above embodiments can be used is described with reference to FIGS. 37A to 37E and FIGS. 38A to 38E.

Figure 37A:
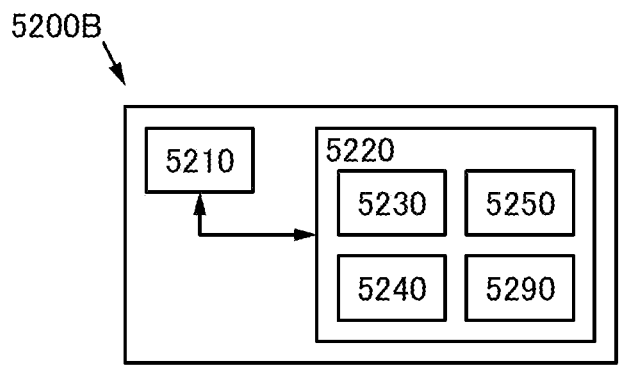
FIGS. 37A to 37E illustrate structures of a data processor.

FIGS. 37A to 37E and FIGS. 38A to 38E illustrate structures of the data processor of one embodiment of the present invention. FIG. 37A is a block diagram of the data processor, and FIGS. 37B to 37E are perspective views illustrating the structures of the data processor. FIGS. 38A to 38E are perspective views illustrating the structures of the data processor.

<Data Processor>

A data processor 5200B described in this embodiment includes an arithmetic device 5210 and an input/output device 5220 (see FIG. 37A).

The arithmetic device 5210 has a function of receiving operation data and a function of supplying image data on the basis of the operation data.

The input/output device 5220 includes a display portion 5230, an input portion 5240, a sensor portion 5250, and a communication portion 5290 and has a function of supplying operation data and a function of receiving image data. The input/output device 5220 also has a function of supplying sensing data, a function of supplying communication data, and a function of receiving communication data.

The input portion 5240 has a function of supplying operation data. For example, the input portion 5240 supplies operation data on the basis of operation by the user of the data processor 5200B.

Specifically, a keyboard, a hardware button, a pointing device, a touch sensor, an audio input device, an eye-gaze input device, or the like can be used as the input portion 5240.

The display portion 5230 includes a display panel and has a function of displaying image data. For example, the display device 100 described in the above embodiment can be used for the display portion 5230.

The sensor portion 5250 has a function of supplying sensing data. For example, the sensor portion 5250 has a function of sensing a surrounding environment where the data processor is used and supplying sensing data.

Specifically, an illuminance sensor, an imaging device, an attitude determination device, a pressure sensor, a human motion sensor, or the like can be used as the sensor portion 5250.

The communication portion 5290 has a function of receiving and supplying communication data. For example, the communication portion 5290 has a function of being connected to another electronic device or a communication network through wireless communication or wired communication. Specifically, the communication portion 5290 has a function of wireless local area network communication, telephone communication, or near field communication, for example.

《Structure Example 1 of Data Processor》

Figure 37B:
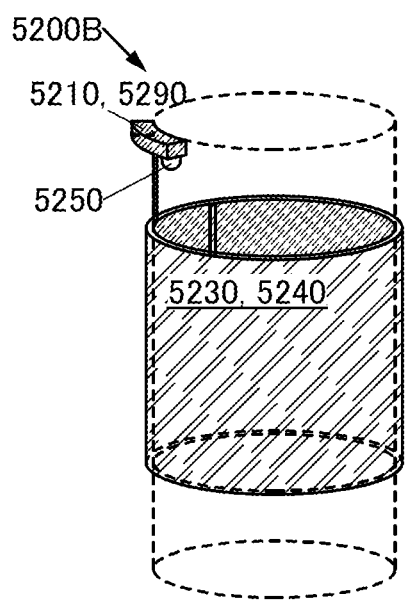

For example, the display portion 5230 can have an outer shape along a cylindrical column (see FIG. 37B). The display portion 5230 can change its display method in accordance with the illuminance of a usage environment. In addition, the display portion 5230 can change the displayed content in response to sensed existence of a person. This allows the data processor 5200B to be provided on a column of a building, for example. The data processor 5200B can display advertising, guidance, or the like. The data processor 5200B can be used for digital signage or the like.

《Structure Example 2 of Data Processor》

Figure 37C:
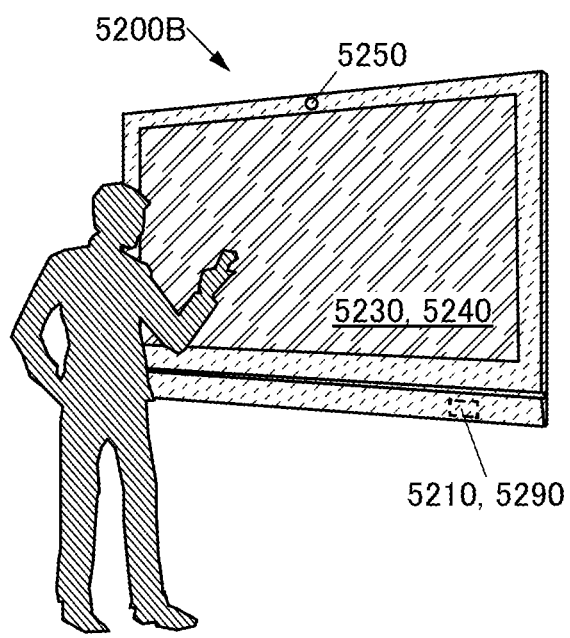

For example, the data processor 5200B has a function of generating image data on the basis of the path of a pointer used by a user (see FIG. 37C). Specifically, the display panel with a diagonal line of 20 inches or longer, preferably 40 inches or longer, further preferably 55 inches or longer can be used. Alternatively, a plurality of display panels can be arranged in one display region. Alternatively, a plurality of display panels can be arranged and used for multiscreen. Thus, the data processor 5200B can be used for an electronic blackboard, an electronic bulletin board, or digital signage, for example.

《Structure Example 3 of Data Processor》

Figure 37D:
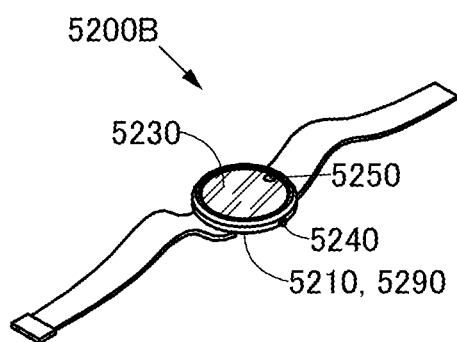

For example, the data processor 5200B has a function of changing a display method in accordance with the illuminance of a usage environment (see FIG. 37D). Thus, for example, the power consumption of a smartwatch can be reduced. Alternatively, for example, a smartwatch can display an image in such a manner that the smartwatch can be suitably used in an environment under strong external light, e.g., outdoors in fine weather.

《Structure Example 4 of Data Processor》

Figure 37E:
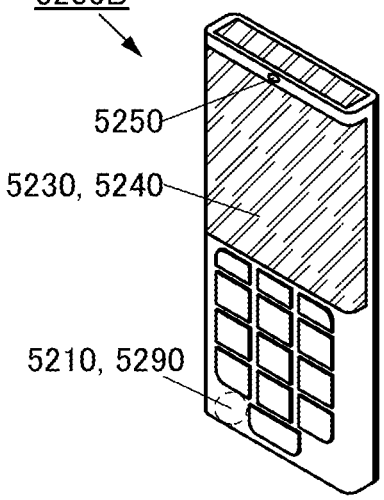

For example, the display portion 5230 has a surface gently curved along a side surface of a housing (see FIG. 37E). The display portion 5230 includes a display panel that can display an image on the front surface, the side surfaces, and the top surface, for example. Accordingly, image data can be displayed on the side surfaces and the top surface of a mobile phone in addition to the front surface, for example.

《Structure Example 5 of Data Processor》

Figure 38A:
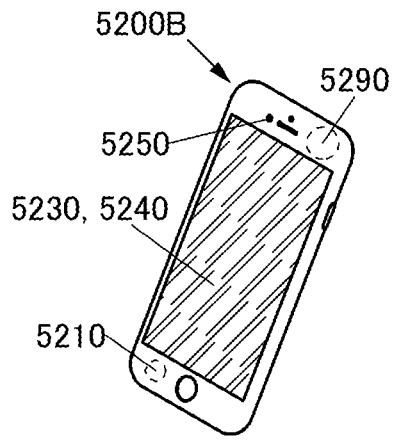
FIGS. 38A to 38E illustrate structures of a data processor.

For example, the data processor 5200B has a function of changing a display method in accordance with the illuminance of a usage environment (see FIG. 38A). Thus, the power consumption of a smartphone can be reduced. Alternatively, for example, a smartphone can display an image in such a manner that the smartphone can be suitably used in an environment under strong external light, e.g., outdoors in fine weather.

《Structure Example 6 of Data Processor》

Figure 38B:
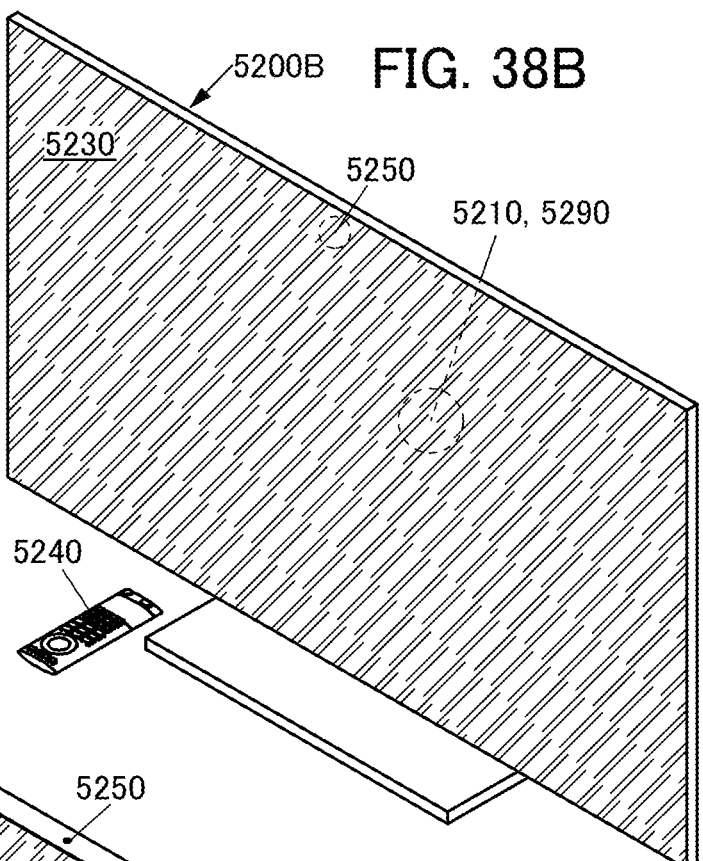

For example, the data processor 5200B has a function of changing a display method in accordance with the illuminance of a usage environment (see FIG. 38B). Accordingly, a television system can display an image in such a manner that the television system can be suitably used even when irradiated with strong external light that enters the room from the outside in fine weather.

《Structure Example 7 of Data Processor》

Figure 38C:
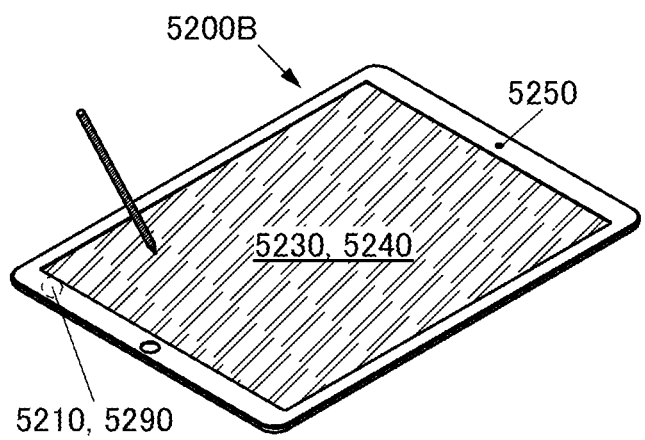

For example, the data processor 5200B has a function of changing a display method in accordance with the illuminance of a usage environment (see FIG. 38C). Accordingly, for example, a tablet computer can display an image in such a manner that the tablet computer can be suitably used in an environment under strong external light, e.g., outdoors in fine weather.

《Structure Example 8 of Data Processor》

Figure 38D:
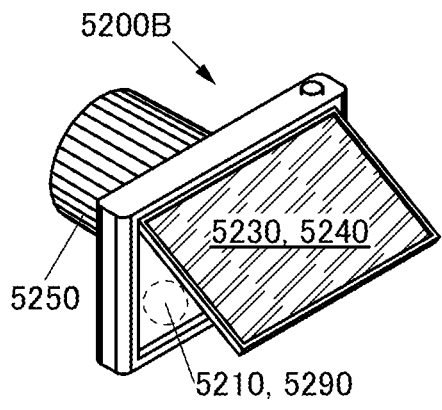

For example, the data processor 5200B has a function of changing a display method in accordance with the illuminance of a usage environment (see FIG. 38D). Accordingly, for example, a digital camera can display an image of an object to be captured in such a manner that the displayed image can be clearly seen in an environment under strong external light, e.g., outdoors in fine weather.

《Structure Example 9 of Data Processor》

Figure 38E:
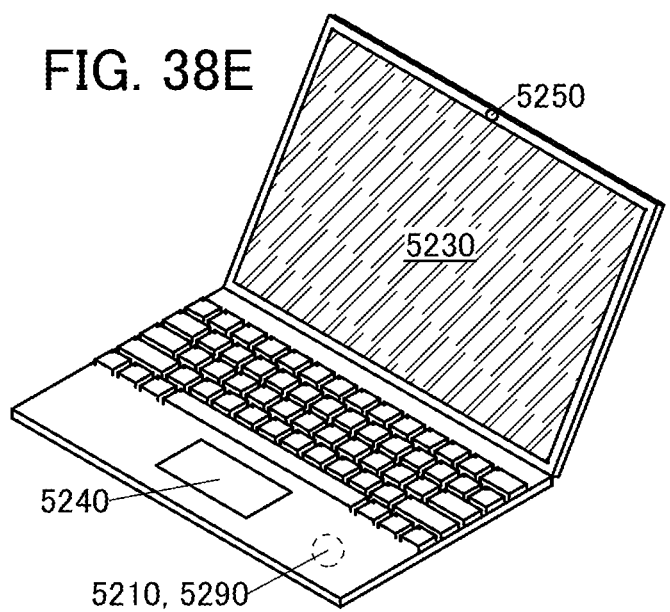

For example, the data processor 5200B has a function of changing a display method in accordance with the illuminance of a usage environment (see FIG. 38E). Accordingly, for example, a personal computer can display an image in such a manner that the personal computer can be suitably used in an environment under strong external light, e.g., outdoors in fine weather.

Note that this embodiment can be combined with any of the other embodiments in this specification as appropriate.

For example, in this specification and the like, an explicit description "X and Y are connected" means that X and Y are electrically connected, X and Y are functionally connected, and X and Y are directly connected. Accordingly, without being limited to a predetermined connection relationship, for example, a connection relationship shown in drawings or texts, another connection relationship is included in the drawings or the texts.

Here, X and Y each denote an object (e.g., a device, an element, a circuit, a wiring, an electrode, a terminal, a conductive film, or a layer).

Examples of the case where X and Y are directly connected include the case where an element that allows an electrical connection between X and Y (e.g., a switch, a transistor, a capacitor, an inductor, a resistor, a diode, a display element, a light-emitting element, and a load) is not connected between X and Y, and the case where X and Y are connected without the element that allows the electrical connection between X and Y provided therebetween.

For example, in the case where X and Y are electrically connected, one or more elements that allow an electrical connection between X and Y (e.g., a switch, a transistor, a capacitor, an inductor, a resistor, a diode, a display element, a light-emitting element, and a load) can be connected between X and Y. Note that the switch is controlled to be turned on or off. That is, the switch is conducting or not conducting (is turned on or off) to determine whether current flows therethrough or not. Alternatively, the switch has a function of selecting and changing a current path. Note that the case where X and Y are electrically connected includes the case where X and Y are directly connected.

For example, in the case where X and Y are functionally connected, one or more circuits that enable a functional connection between X and Y (e.g., a logic circuit such as an inverter, a NAND circuit, or a NOR circuit; a signal converter circuit such as a D/A converter circuit, an A/D converter circuit, or a gamma correction circuit; a potential level converter circuit such as a power supply circuit (e.g., a step-up circuit or a step-down circuit) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, and a buffer circuit; a signal generation circuit; a memory circuit; or a control circuit) can be connected between X and Y. For example, even when another circuit is interposed between X and Y, X and Y are functionally connected when a signal output from X is transmitted to Y. Note that the case where X and Y are functionally connected includes the case where X and Y are directly connected and the case where X and Y are electrically connected.

Note that in this specification and the like, an explicit description "X and Y are electrically connected" means that X and Y are electrically connected (i.e., the case where X and Y are connected with another element or another circuit provided therebetween), X and Y are functionally connected (i.e., the case where X and Y are functionally connected with another circuit provided therebetween), and X and Y are directly connected (i.e., the case where X and Y are connected without another element or another circuit provided therebetween). That is, in this specification and the like, the explicit description "X and Y are electrically connected" is the same as the description "X and Y are connected".

For example, any of the following expressions can be used for the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y.

Examples of the expressions include, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit configuration is defined by an expression similar to the above examples, a source (or a first terminal or the like) and a drain (or a second terminal or the like) of a transistor can be distinguished from each other to specify the technical scope.

Other examples of the expressions include, "a source (or a first terminal or the like) of a transistor is electrically connected to X through at least a first connection path, the first connection path does not include a second connection path, the second connection path is a path between the source (or the first terminal or the like) of the transistor and a drain (or a second terminal or the like) of the transistor, Z1 is on the first connection path, the drain (or the second terminal or the like) of the transistor is electrically connected to Y through at least a third connection path, the third connection path does not include the second connection path, and Z2 is on the third connection path" and "a source (or a first terminal or the like) of a transistor is electrically connected to X through at least Z1 on a first connection path, the first connection path does not include a second connection path, the second connection path includes a connection path on which the transistor is present, a drain (or a second terminal or the like) of the transistor is electrically connected to Y through at least Z2 on a third connection path, and the third connection path does not include the second connection path". Still another example of the expression is "a source (or a first terminal or the like) of a transistor is electrically connected to X through at least Z1 on a first electrical path, the first electrical path does not include a second electrical path, the second electrical path is an electrical path from the source (or the first terminal or the like) of the transistor to a drain (or a second terminal or the like) of the transistor, the drain (or the second terminal or the like) of the transistor is electrically connected to Y through at least Z2 on a third electrical path, the third electrical path does not include a fourth electrical path, and the fourth electrical path is an electrical path from the drain (or the second terminal or the like) of the transistor to the source (or the first terminal or the like) of the transistor". When the connection path in a circuit configuration is defined by an expression similar to the above examples, a source (or a first terminal or the like) and a drain (or a second terminal or the like) of a transistor can be distinguished from each other to specify the technical scope.

Note that these expressions are examples and there is no limitation on the expressions. Here, X, Y, Z1, and Z2 each denote an object (e.g., a device, an element, a circuit, a wiring, an electrode, a terminal, a conductive film, and a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

Embodiment 6

Figure 34A:
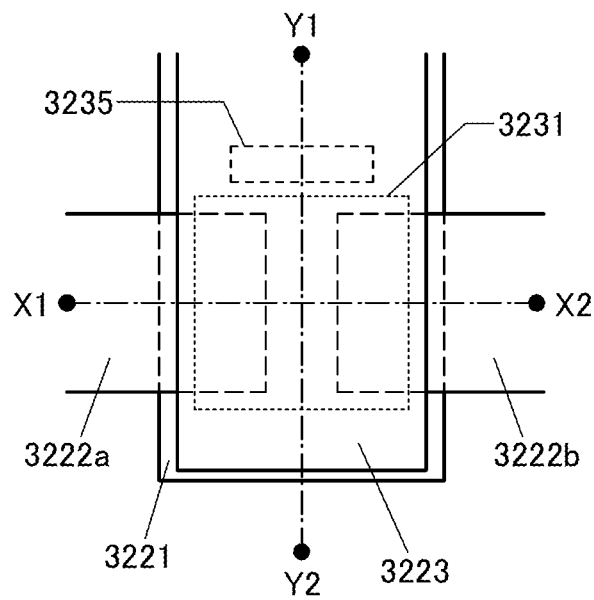
FIGS. 34A to 34C are a top view and cross-sectional views illustrating an example of a transistor used in a display device.
Figure 34B:
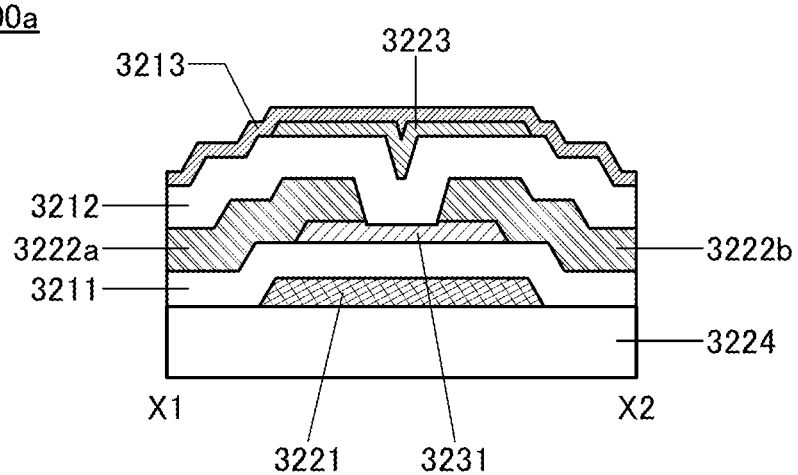
Figure 34C:
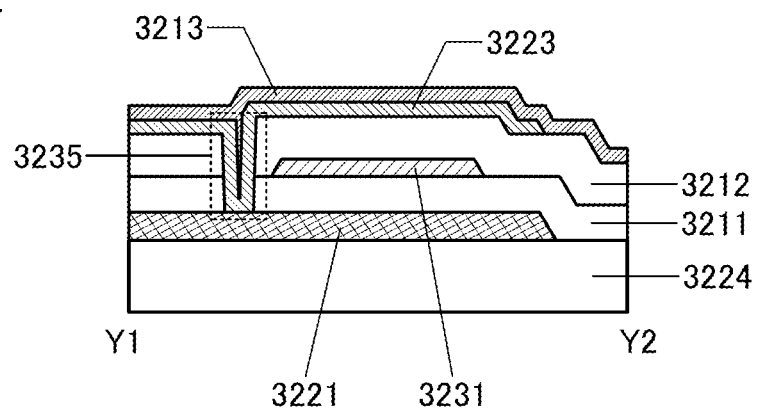

In this embodiment, a structure example of the OS transistor described in the above embodiment will be described.
<Structure Example 1 of OS Transistor>
To show a structure example of a transistor, a transistor 3200a is described with reference to FIGS. 34A to 34C. FIG. 34A is a top view of the transistor 3200a. FIG. 34B is a cross-sectional view taken along the dashed-dotted line X1-X2 in FIG. 34A, and FIG. 34C is a cross-sectional view taken along the dashed-dotted line Y1-Y2 in FIG. 34A. Note that in FIG. 34A, some components of the transistor 3200a (e.g., an insulating layer serving as a gate insulating layer) are not illustrated to avoid complexity. Note that hereinafter, the direction of the dashed-dotted line X1-X2 may be called the channel length direction, and the direction of the dashed-dotted line Y1-Y2 may be called the channel width direction. As in FIG. 34A, some components are not illustrated in some cases in top views of transistors described below.

The transistor 3200a includes a conductive layer 3221 over an insulating layer 3224; an insulating layer 3211 over the insulating layer 3224 and the conductive layer 3221; a metal oxide layer 3231 over the insulating layer 3211; a conductive layer 3222a over the metal oxide layer 3231; a conductive layer 3222b over the metal oxide layer 3231; an insulating layer 3212 over the metal oxide layer 3231, the conductive layer 3222a, and the conductive layer 3222b; a conductive layer 3223 over the insulating layer 3212; and an insulating layer 3213 over the insulating layer 3212 and the conductive layer 3223.

The insulating layers 3211 and 3212 have an opening 3235. The conductive layer 3223 is electrically connected to the conductive layer 3221 in the opening 3235.

The insulating layer 3211 serves as a first gate insulating layer of the transistor 3200a. The insulating layer 3212 serves as a second gate insulating layer of the transistor 3200a. The insulating layer 3213 serves as a protective insulating layer of the transistor 3200a. The conductive layer 3221 serves as a first gate of the transistor 3200a. The conductive layer 3222a serves as one of a source and a drain of the transistor 3200a and the conductive layer 3222b serves as the other of the source and the drain. The conductive layer 3223 serves as a second gate of the transistor 3200a.

Note that the transistor 3200a is a channel-etched transistor, and has a dual-gate structure.

The transistor 3200a without the conductive layer 3223 is also available. In that case, the transistor 3200a is a channel-etched transistor, and has a bottom-gate structure.

As illustrated in FIGS. 34B and 34C, the metal oxide layer 3231 faces the conductive layer 3221 and the conductive layer 3223, and is between the conductive layers serving as the two gates. The length of the conductive layer 3223 in the channel length direction is longer than the length of the metal oxide layer 3231 in the channel length direction. The length of the conductive layer 3223 in the channel width direction is longer than the length of the metal oxide layer 3231 in the channel width direction. The whole metal oxide layer 3231 is covered with the conductive layer 3223 with the insulating layer 3212 positioned therebetween.

In other words, the conductive layers 3221 and 3223 are connected to each other in the opening 3235 provided in the insulating layers 3211 and 3212, and have a region located outside a side end portion of the metal oxide layer 3231.

With this structure, the metal oxide layer 3231 included in the transistor 3200a can be electrically surrounded by electric fields of the conductive layers 3221 and 3223. A device structure of a transistor in which electric fields of a first gate and a second gate electrically surround a metal oxide layer where a channel region is formed, like in the transistor 3200a, can be referred to as a surrounded channel (S-channel) structure.

Since the transistor 3200a has the S-channel structure, an electric field for inducing a channel can be effectively applied to the metal oxide layer 3231 by the conductive layer 3221 functioning as the first gate; therefore, the current drive capability of the transistor 3200a can be improved and high on-state current characteristics can be obtained. Since the on-state current can be increased, it is possible to reduce the size of the transistor 3200a. In addition, since the transistor 3200a has a structure in which the metal oxide layer 3231 is surrounded by the conductive layer 3221 serving as the first gate and the conductive layer 3223 serving as the second gate, the mechanical strength of the transistor 3200a can be increased.

For example, it is preferable that the metal oxide layer 3231 contain In, M (M is gallium, aluminum, silicon, boron, yttrium, tin, copper, vanadium, beryllium, titanium, iron, nickel, germanium, zirconium, molybdenum, lanthanum, cerium, neodymium, hafnium, tantalum, tungsten, or magnesium), and Zn.

The metal oxide layer 3231 preferably includes a region where the atomic proportion of In is larger than the atomic proportion of M. For example, the atomic ratio of In to M and Zn in the metal oxide layer 3231 is preferably In:M:Zn=4:2:3 or in the neighborhood thereof. As for the range expressed by the term "neighborhood" here, when In is 4, M ranges from 1.5 to 2.5 and Zn ranges from 2 to 4. Alternatively, the atomic ratio of In to M and Zn in the metal oxide layer 3231 is preferably In:M:Zn=5:1:6 or in the neighborhood thereof.

The metal oxide layer 3231 is preferably a CAC-OS. When the metal oxide layer 3231 is a CAC-OS and has a region where the atomic proportion of In is higher than the atomic proportion of M, the transistor 3200a can have high field-effect mobility. Note that the details of the CAC-OS will be described later.

Since the transistor 3200a having the S-channel structure has high field-effect mobility and high driving capability, the use of the transistor 3200a in the driver circuit, a typical example of which is a gate driver that generates a gate signal, allows the display device to have a narrow bezel. The use of the transistor 3200a in a source driver (particularly in a demultiplexer connected to an output terminal of a shift register included in the source driver) that supplies a signal to a signal line included in the display device can reduce the number of wirings connected to the display device.

Furthermore, the transistor 3200*a* is a channel-etched transistor and thus can be fabricated through a smaller number of steps than a transistor formed using low-temperature polysilicon. In addition, unlike the transistor formed using low-temperature polysilicon, the transistor 3200*a* including the metal oxide layer in the channel region does not need a laser crystallization step. Accordingly, the manufacturing cost can be reduced even in the case of a display device formed using a large substrate. Transistors having high field-effect mobility like the transistor 3200*a* are preferably used in a driver circuit and a display portion of a large display device having high resolution such as ultra high definition (4K resolution, 4K2K, or 4K) or super high definition (8K resolution, 8K4K, or 8K), in which case writing can be performed in a short time and display defects can be reduced.

The insulating layers 3211 and 3212 in contact with the metal oxide layer 3231 are preferably oxide insulating films, and further preferably include a region containing oxygen in excess of the stoichiometric composition (oxygen-excess region). In other words, the insulating layers 3211 and 3212 are insulating films from which oxygen can be released. In order to provide the oxygen-excess region in the insulating layers 3211 and 3212, the insulating layers 3211 and 3212 are formed in an oxygen atmosphere, or the deposited insulating layers 3211 and 3212 are subjected to heat treatment in an oxygen atmosphere, for example.

An oxide semiconductor, which is a kind of metal oxide, can be used as the metal oxide layer 3231.

In the case where the metal oxide layer 3231 includes an In-M-Zn oxide, it is preferable that the atomic ratio of metal elements of a sputtering target used for forming the In-M-Zn oxide satisfy In>M. The atomic ratio of metal elements in such a sputtering target is, for example, In:M:Zn=2:1:3, In:M:Zn=3:1:2, In:M:Zn=4:2:4.1, In:M:Zn=5:1:6, In:M:Zn=5:1:7, In:M:Zn=5:1:8, In:M:Zn=6:1:6, or In:M:Zn=5:2:5.

In the case where the metal oxide layer 3231 is formed using an In-M-Zn oxide, it is preferable to use a target including a polycrystalline In-M-Zn oxide as the sputtering target. The use of the target including a polycrystalline In-M-Zn oxide facilitates formation of the metal oxide layer 3231 having crystallinity. Note that the atomic ratio of metal elements in the formed metal oxide layer 3231 varies from the above atomic ratios of metal elements of the sputtering targets in a range of ±40%. For example, when a sputtering target with an atomic ratio of In:Ga:Zn=4:2:4.1 is used for forming the metal oxide layer 3231, the atomic ratio of In to Ga and Zn in the formed metal oxide layer 3231 may be 4:2:3 or in the neighborhood thereof.

The energy gap of the metal oxide layer 3231 is 2 eV or more, preferably 2.5 eV or more. The use of such an oxide semiconductor having a wide energy gap leads to a reduction in off-state current of a transistor.

Furthermore, the metal oxide layer 3231 preferably has a non-single-crystal structure. The non-single-crystal structure includes a c-axis aligned crystalline (CAAC) structure, a polycrystalline structure, a microcrystalline structure, or an amorphous structure, for example. Among the non-single-crystal structures, the amorphous structure has the highest density of defect states, whereas the CAAC structure has the lowest density of defect states.

The metal oxide layer 3231 formed with a metal oxide film with low impurity concentration and low density of defect states can give the transistor excellent electrical characteristics. Thus, the use of such a metal oxide film is preferable. Here, the state in which impurity concentration is low and density of defect states is low (the number of oxygen vacancies is small) is referred to as "highly purified intrinsic" or "substantially highly purified intrinsic". Note that impurities in the metal oxide film are typically water, hydrogen, and the like. In this specification and the like, reducing or removing water and hydrogen from the metal oxide film is referred to as dehydration or dehydrogenation in some cases. Moreover, adding oxygen to a metal oxide film or an oxide insulating film is referred to as oxygen addition in some cases, and a state in which oxygen in excess of the stoichiometric composition is contained due to the oxygen addition is referred to as an oxygen-excess state in some cases.

A highly purified intrinsic or substantially highly purified intrinsic metal oxide film has few carrier generation sources, and thus has a low carrier density. Thus, a transistor in which a channel region is formed in the metal oxide film rarely has a negative threshold voltage (is rarely normally on). The highly purified intrinsic or substantially highly purified intrinsic metal oxide film has a low density of defect states and accordingly has a low density of trap states in some cases. Furthermore, the highly purified intrinsic or substantially highly purified intrinsic metal oxide film has an extremely low off-state current; even when an element has a channel width W of $1\times10^6$ μm and a channel length L of 10 μm, the off-state current can be less than or equal to the measurement limit of a semiconductor parameter analyzer, that is, less than or equal to $1\times10^{-13}$ A, at a voltage (drain voltage) between a source electrode and a drain electrode of from 1 V to 10 V.

The insulating layer 3213 contains one or both of hydrogen and nitrogen. Alternatively, the insulating layer 3213 contains nitrogen and silicon. The insulating layer 3213 has a function of blocking oxygen, hydrogen, water, alkali metal, alkaline earth metal, or the like. The insulating layer 3213 can prevent outward diffusion of oxygen from the metal oxide layer 3231, outward diffusion of oxygen from the insulating layer 3212, and entry of hydrogen, water, or the like into the metal oxide layer 3231 from the outside.

The insulating layer 3213 can be a nitride insulating film, for example. The nitride insulating film is formed using silicon nitride, silicon nitride oxide, aluminum nitride, aluminum nitride oxide, or the like.

<Structure Example 2 of OS Transistor>

Figure 35A:
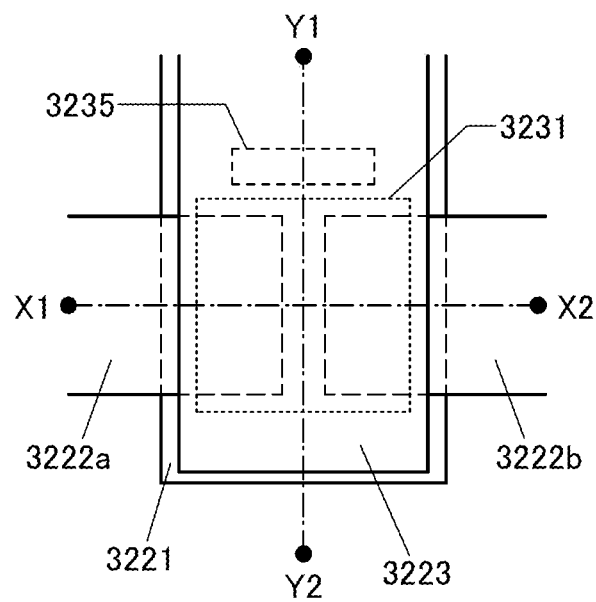
FIGS. 35A to 35C are a top view and cross-sectional views illustrating an example of a transistor used in a display device.
Figure 35B:
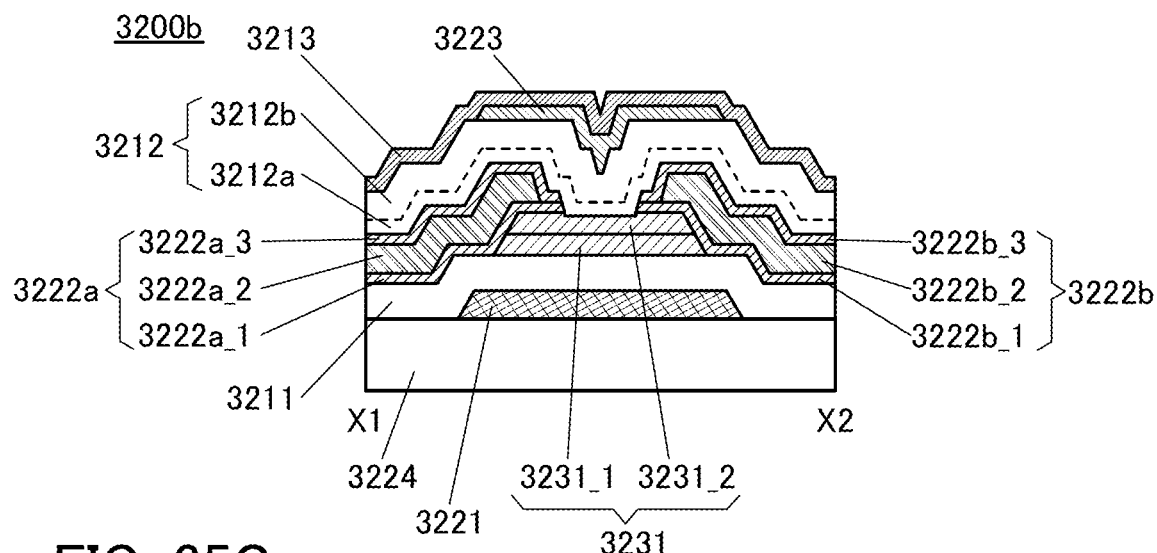
Figure 35C:
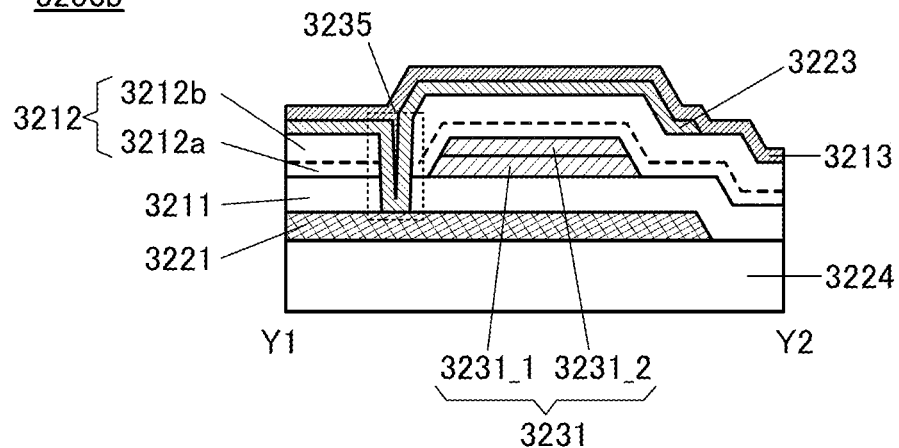

To show a structure example of a transistor, a transistor 3200*b* is described with reference to FIGS. 35A to 35C. FIG. 35A is a top view of the transistor 3200*b*. FIG. 35B is a cross-sectional view taken along the dashed-dotted line X1-X2 in FIG. 35A, and FIG. 35C is a cross-sectional view taken along the dashed-dotted line Y1-Y2 in FIG. 35A.

The transistor 3200*b* is different from the transistor 3200*a* in that the metal oxide layer 3231, the conductive layer 3222*a*, the conductive layer 3222*b*, and the insulating layer 3212 each have a multi-layer structure.

The insulating layer 3212 includes an insulating layer 3212*a* over the metal oxide layer 3231 and the conductive layers 3222*a* and 3222*b*, and an insulating layer 3212*b* over the insulating layer 3212*a*. The insulating layer 3212 has a function of supplying oxygen to the metal oxide layer 3231. That is, the insulating layer 3212 contains oxygen. The insulating layer 3212*a* is an insulating layer that allows oxygen to pass therethrough. Note that the insulating layer 3212*a* serves also as a film that relieves damage to the metal oxide layer 3231 at the time of forming the insulating layer 3212*b* in a later step.

A silicon oxide, a silicon oxynitride, or the like with a thickness greater than or equal to 5 nm and less than or equal to 150 nm, preferably greater than or equal to 5 nm and less than or equal to 50 nm can be used as the insulating layer 3212a.

Furthermore, it is preferable that the number of defects in the insulating layer 3212a be small and typically, the spin density of a signal that appears at g=2.001 due to a dangling bond of silicon be lower than or equal to $3 \times 10^{17}$ spins/cm$^3$ by electron spin resonance (ESR) measurement. This is because if the density of defects in the insulating layer 3212a is high, oxygen is bonded to the defects and the property of transmitting oxygen of the insulating layer 3212a is lowered.

Note that not all oxygen that has entered the insulating layer 3212a from the outside moves to the outside of the insulating layer 3212a but some oxygen remains in the insulating layer 3212a. In some cases, movement of oxygen occurs in the insulating layer 3212a in such a manner that oxygen enters the insulating layer 3212a and oxygen contained in the insulating layer 3212a moves to the outside of the insulating layer 3212a. When an oxide insulating layer that can transmit oxygen is formed as the insulating layer 3212a, oxygen released from the insulating layer 3212b provided over the insulating layer 3212a can be moved to the metal oxide layer 3231 through the insulating layer 3212a.

Note that the insulating layer 3212a can be formed using an oxide insulating layer having a low density of states due to nitrogen oxide. Note that the density of states due to nitrogen oxide can be formed between the valence band maximum (Ev_os) and the conduction band minimum (Ec_os) of the metal oxide film. A silicon oxynitride film that releases a small amount of nitrogen oxide, an aluminum oxynitride film that releases a small amount of nitrogen oxide, or the like can be used as the above oxide insulating layer.

Note that a silicon oxynitride film that releases a small amount of nitrogen oxide is a film which releases ammonia more than nitrogen oxide in thermal desorption spectroscopy (TDS) analysis; the amount of released ammonia is typically greater than or equal to $1 \times 10^{18}$/cm$^3$ and less than or equal to $5 \times 10^{19}$/cm$^3$. Note that the amount of released ammonia is the amount of ammonia released by heat treatment with which the surface temperature of the film becomes higher than or equal to 50° C. and lower than or equal to 650° C., preferably higher than or equal to 50° C. and lower than or equal to 550° C.

Nitrogen oxide (NO$_x$; x is greater than 0 and less than or equal to 2, preferably greater than or equal to 1 and less than or equal to 2), typically NO$_2$ or NO, forms levels in the insulating layer 3212a, for example. The level is positioned in the energy gap of the metal oxide layer 3231. Therefore, when nitrogen oxide is diffused to the interface between the insulating layer 3212a and the metal oxide layer 3231, an electron is in some cases trapped by the level on the insulating layer 3212a side. As a result, the trapped electron remains in the vicinity of the interface between the insulating layer 3212a and the metal oxide layer 3231; thus, the threshold voltage of the transistor is shifted in the positive direction.

Nitrogen oxide reacts with ammonia and oxygen in heat treatment. Since nitrogen oxide contained in the insulating layer 3212a reacts with ammonia contained in the insulating layer 3212b in heat treatment, nitrogen oxide contained in the insulating layer 3212a is reduced. Therefore, an electron is hardly trapped at the interface between the insulating layer 3212a and the metal oxide layer 3231.

By using the above oxide insulating layer for the insulating layer 3212a, a shift in the threshold voltage of the transistor can be reduced, which leads to reduced fluctuations in the electrical characteristics of the transistor.

The concentration of nitrogen of the above oxide insulating layer measured by SIMS is lower than or equal to $6 \times 10^{20}$ atoms/cm$^3$.

The above oxide insulating layer is formed by a PECVD method at a substrate temperature higher than or equal to 220° C. and lower than or equal to 350° C. using silane and dinitrogen monoxide, whereby a dense and hard film can be formed.

The insulating layer 3212b is an oxide insulating layer that contains oxygen at a higher proportion than the stoichiometric composition. Part of oxygen is released from the above oxide insulating layer by heating. The amount of oxygen released from the oxide insulating layer in TDS is more than or equal to $1.0 \times 10^{19}$ atoms/cm$^3$, preferably more than or equal to $3.0 \times 10^{20}$ atoms/cm$^3$. Note that the amount of released oxygen is the total amount of oxygen released by heat treatment in a temperature range of 50° C. to 650° C. or 50° C. to 550° C. in TDS. In addition, the amount of released oxygen is the total amount of released oxygen converted into oxygen atoms in TDS.

A silicon oxide film, a silicon oxynitride film, or the like with a thickness greater than or equal to 30 nm and less than or equal to 500 nm, preferably greater than or equal to 50 nm and less than or equal to 400 nm can be used for the insulating layer 3212b.

It is preferable that the number of defects in the insulating layer 3212b be small and typically, the spin density corresponding to a signal that appears at g=2.001 due to a dangling bond of silicon be lower than $1.5 \times 10^{18}$ spins/cm$^3$, preferably lower than or equal to $1 \times 10^{18}$ spins/cm$^3$ by ESR measurement. Note that the insulating layer 3212b is provided more apart from the metal oxide layer 3231 than the insulating layer 3212a is; thus, the insulating layer 3212b may have higher density of defects than the insulating layer 3212a.

Furthermore, the insulating layer 3212 can include insulating layers including the same kind of material; thus, a boundary between the insulating layer 3212a and the insulating layer 3212b cannot be clearly observed in some cases. Thus, in this embodiment, the boundary between the insulating layer 3212a and the insulating layer 3212b is shown by a dashed line. Although a two-layer structure including the insulating layers 3212a and 3212b is described in this embodiment, the present invention is not limited to this. For example, a single-layer structure including only the insulating layer 3212a or a multi-layer structure including three or more layers may be employed.

The metal oxide layer 3231 in the transistor 3200b includes a metal oxide layer 3231_1 over the insulating layer 3211 and a metal oxide layer 3231_2 over the metal oxide layer 3231_1. The metal oxide layers 3231_1 and 3231_2 contain the same kind of element. For example, it is preferable that the metal oxide layers 3231_1 and 3231_2 each independently contain the same element as the element in the metal oxide layer 3231 that is described above.

Each of the metal oxide layers 3231_1 and 3231_2 preferably contains a region where the atomic proportion of In is higher than the atomic proportion of M. For example, the atomic ratio of In to M and Zn in each of the metal oxide layers 3231_1 and 3231_2 is preferably In:M:Zn=4:2:3 or in the neighborhood thereof. As for the range expressed by the term "neighborhood" here, when In is 4, M ranges from 1.5 to 2.5 and Zn ranges from 2 to 4. Alternatively, the atomic ratio of In to M and Zn in each of the metal oxide layers 3231_1 and 3231_2 is preferably In:M:Zn=5:1:6 or in the neighborhood thereof. The metal oxide layers 3231_1 and 3231_2 having substantially the same composition as described above can be formed using the same sputtering target; thus, the manufacturing cost can be reduced. When the same sputtering target is used, the metal oxide layers 3231_1 and 3231_2 can be formed successively in the same vacuum chamber. This can suppress entry of impurities into the interface between the metal oxide layers 3231_1 and 3231_2.

Here, the metal oxide layer 3231_1 may include a region whose crystallinity is lower than that of the metal oxide layer 3231_2. Note that the crystallinity of the metal oxide layers 3231_1 and 3231_2 can be determined by analysis by X-ray diffraction (XRD) or with a transmission electron microscope (TEM), for example.

The region with low crystallinity in the metal oxide layer 3231_1 serves as a diffusion path of excess oxygen, through which excess oxygen can be diffused into the metal oxide layer 3231_2 having higher crystallinity than the metal oxide layer 3231_1. When a multi-layer structure including the metal oxide layers having different crystal structures is employed and the region with low crystallinity is used as a diffusion path of excess oxygen as described above, the transistor can be highly reliable.

The metal oxide layer 3231_2 having a region with higher crystallinity than the metal oxide layer 3231_1 can prevent impurities from entering the metal oxide layer 3231. In particular, the increased crystallinity of the metal oxide layer 3231_2 can reduce damage at the time of processing into the conductive layers 3222a and 3222b. The surface of the metal oxide layer 3231, i.e., the surface of the metal oxide layer 3231_2 is exposed to an etchant or an etching gas at the time of processing into the conductive layers 3222a and 3222b. However, when the metal oxide layer 3231_2 has a region with high crystallinity, the metal oxide layer 3231_2 has higher etching resistance than the metal oxide layer 3231_1. Thus, the metal oxide layer 3231_2 serves as an etching stopper.

By including a region having lower crystallinity than the metal oxide layer 3231_2, the metal oxide layer 3231_1 sometimes has a high carrier density.

When the metal oxide layer 3231_1 has a high carrier density, the Fermi level is sometimes high relative to the conduction band of the metal oxide layer 3231_1. This lowers the conduction band minimum of the metal oxide layer 3231_1, so that the energy difference between the conduction band minimum of the metal oxide layer 3231_1 and the trap level, which might be formed in a gate insulating film (here, the insulating layer 3211), is increased in some cases. The increase of the energy difference can reduce trap of charges in the gate insulating film and reduce variation in the threshold voltage of the transistor, in some cases. In addition, when the metal oxide layer 3231_1 has a high carrier density, the metal oxide layer 3231 can have high field-effect mobility.

Although the metal oxide layer 3231 in the transistor 3200b has a multi-layer structure including two layers in this example, the structure is not limited thereto, and the metal oxide layer 3231 may have a multi-layer structure including three or more layers.

The conductive layer 3222a in the transistor 3200b includes a conductive layer 3222a_1, a conductive layer 3222a_2 over the conductive layer 3222a_1, and a conductive layer 3222a_3 over the conductive layer 3222a_2. The conductive layer 3222b in the transistor 3200b includes a conductive layer 3222b_1, a conductive layer 3222b_2 over the conductive layer 3222b_1, and a conductive layer 3222b_3 over the conductive layer 3222b_2.

For example, it is preferable that the conductive layers 3222a_1, 3222b_1, 3222a_3, and 3222b_3 contain one or more elements selected from titanium, tungsten, tantalum, molybdenum, indium, gallium, tin, and zinc. Furthermore, it is preferable that the conductive layers 3222a_2 and 3222b_2 contain one or more elements selected from copper, aluminum, and silver.

Specifically, the conductive layers 3222a_1, 3222b_1, 3222a_3, and 3222b_3 can contain an In—Sn oxide or an In—Zn oxide and the conductive layers 3222a_2 and 3222b_2 can contain copper.

An end portion of the conductive layer 3222a_1 has a region located outside an end portion of the conductive layer 3222a_2. The conductive layer 3222a_3 covers a top surface and a side surface of the conductive layer 3222a_2 and has a region that is in contact with the conductive layer 3222a_1. An end portion of the conductive layer 3222b_1 has a region located outside an end portion of the conductive layer 3222b_2. The conductive layer 3222b_3 covers a top surface and a side surface of the conductive layer 3222b_2 and has a region that is in contact with the conductive layer 3222b_1.

The above structure is preferred because the structure can reduce the wiring resistance of the conductive layers 3222a and 3222b and inhibit diffusion of copper to the metal oxide layer 3231.

<Structure Example 3 of OS Transistor>

Figure 36A:
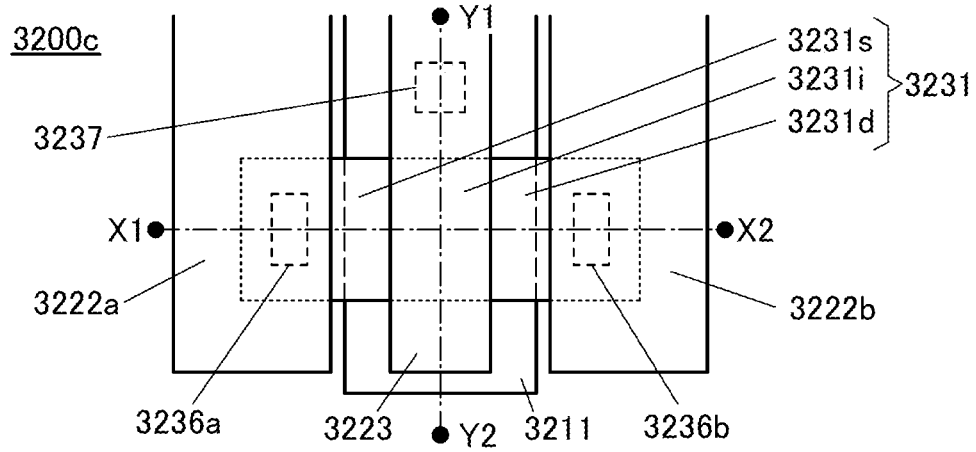
FIGS. 36A to 36C are a top view and cross-sectional views illustrating an example of a transistor used in a display device.
Figure 36B:
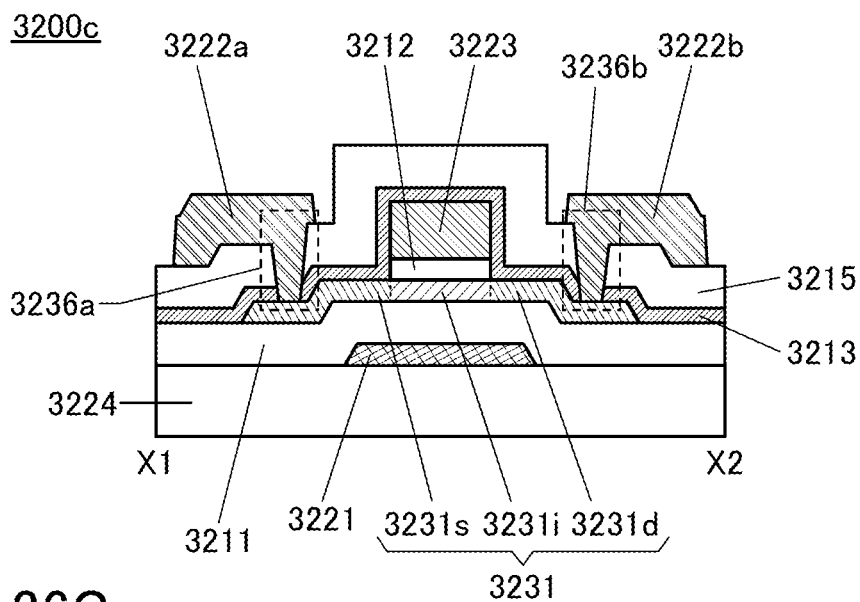

To show a structure example of a transistor, a transistor 3200c is described with reference to FIGS. 36A to 36C. FIG. 36A is a top view of a transistor 3200c. FIG. 36B is a cross-sectional view taken along the dashed-dotted line X1-X2 in FIG. 36A, and FIG. 36C is a cross-sectional view taken along the dashed-dotted line Y1-Y2 in FIG. 36A.

Figure 36C:
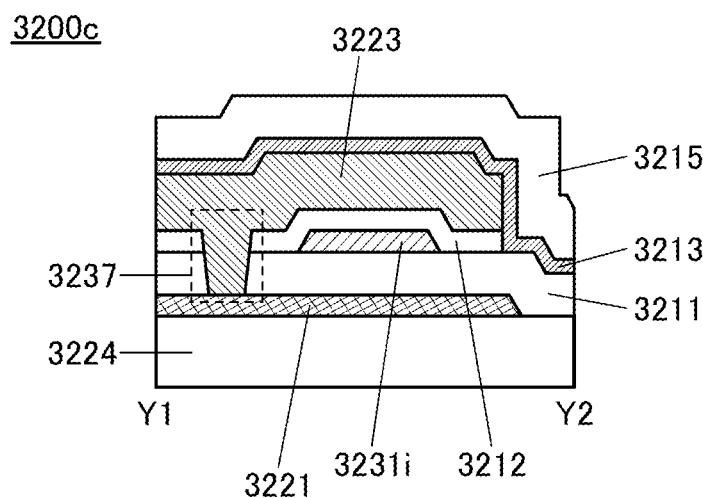

The transistor 3200c illustrated in FIGS. 36A to 36C includes the conductive layer 3221 over the insulating layer 3224; the insulating layer 3211 over the conductive layer 3221; the metal oxide layer 3231 over the insulating layer 3211; the insulating layer 3212 over the metal oxide layer 3231; the conductive layer 3223 over the insulating layer 3212; and the insulating layer 3213 over the insulating layer 3211, the metal oxide layer 3231, and the conductive layer 3223. The metal oxide layer 3231 includes a channel region 3231i overlapping with the conductive layer 3223, a source region 3231s in contact with the insulating layer 3213, and a drain region 3231d in contact with the insulating layer 3213.

The insulating layer 3213 contains nitrogen or hydrogen. The insulating layer 3213 is in contact with the source region 3231s and the drain region 3231d, so that nitrogen or hydrogen that is contained in the insulating layer 3213 is added to the source region 3231s and the drain region 3231d. The source region 3231s and the drain region 3231d each have a high carrier density when nitrogen or hydrogen is added thereto.

The transistor 3200c may further include an insulating layer 3215 over the insulating layer 3213, the conductive layer 3222a electrically connected to the source region 3231s through an opening 3236a provided in the insulating layers 3213 and 3215, and the conductive layer 3222b electrically connected to the drain region 3231d through an opening 3236b provided in the insulating layers 3213 and 3215.

The insulating layer 3215 can be an oxide insulating film. Alternatively, a multi-layer film including an oxide insulating film and a nitride insulating film can be used as the insulating layer 3215. The insulating layer 3215 can include, for example, silicon oxide, silicon oxynitride, silicon nitride oxide, aluminum oxide, hafnium oxide, gallium oxide, or Ga—Zn oxide. Furthermore, the insulating layer 3215 preferably functions as a barrier film against hydrogen, water, and the like from the outside.

The insulating layer 3211 serves as a first gate insulating film, and the insulating layer 3212 serves as a second gate insulating film. The insulating layers 3213 and 3215 serve as a protective insulating film.

The insulating layer 3212 includes an excess oxygen region. Since the insulating layer 3212 includes the excess oxygen region, excess oxygen can be supplied to the channel region 3231i included in the metal oxide layer 3231. As a result, oxygen vacancies that might be formed in the channel region 3231i can be filled with excess oxygen, which can provide a highly reliable semiconductor device.

To supply excess oxygen to the metal oxide layer 3231, excess oxygen may be supplied to the insulating layer 3211 that is formed below the metal oxide layer 3231. However, in that case, excess oxygen contained in the insulating layer 3211 might also be supplied to the source region 3231s and the drain region 3231d included in the metal oxide layer 3231. When excess oxygen is supplied to the source region 3231s and the drain region 3231d, the resistance of the source region 3231s and the drain region 3231d might be increased.

In contrast, in the structure in which the insulating layer 3212 formed over the metal oxide layer 3231 contains excess oxygen, excess oxygen can be selectively supplied only to the channel region 3231i. Alternatively, the carrier density of the source and drain regions 3231s and 3231d can be selectively increased after excess oxygen is supplied to the channel region 3231i and the source and drain regions 3231s and 3231d, in which case an increase in the resistance of the source and drain regions 3231s and 3231d can be prevented.

Furthermore, each of the source region 3231s and the drain region 3231d included in the metal oxide layer 3231 preferably contains an element that forms an oxygen vacancy or an element that is bonded to an oxygen vacancy. Typical examples of the element that forms an oxygen vacancy or the element that is bonded to an oxygen vacancy include hydrogen, boron, carbon, nitrogen, fluorine, phosphorus, sulfur, chlorine, titanium, and a rare gas. Typical examples of the rare gas element are helium, neon, argon, krypton, and xenon. In the case where one or more of the elements that form oxygen vacancies are contained in the insulating layer 3213, the one or more of the elements are diffused from the insulating layer 3213 to the source region 3231s and the drain region 3231d, and/or may be added to the source region 3231s and the drain region 3231d by impurity addition treatment.

An impurity element added to the oxide semiconductor film cuts a bond between a metal element and oxygen in the oxide semiconductor film, so that an oxygen vacancy is formed. Alternatively, when the impurity element is added to the oxide semiconductor film, oxygen bonded to a metal element in the oxide semiconductor film is bonded to the impurity element, and the oxygen is released from the metal element, whereby an oxygen vacancy is formed. As a result, the oxide semiconductor film has a higher carrier density and thus the conductivity thereof becomes higher.

The conductive layer 3221 functions as a first gate electrode and the conductive layer 3223 functions as a second gate electrode. The conductive layer 3222a functions as a source electrode and the conductive layer 3222b functions as a drain electrode.

As illustrated in FIG. 36C, an opening 3237 is formed in the insulating layers 3211 and 3212. The conductive layer 3221 is electrically connected to the conductive layer 3223 in the opening 3237. Thus, the conductive layers 3221 and 3223 are supplied with the same potential. Note that different potentials may be applied to the conductive layers 3221 and 3223 without providing the opening 3237. Alternatively, the conductive layer 3221 may be used as a light-blocking film without providing the opening 3237. For example, light irradiating the channel region 3231i from the bottom can be reduced by the conductive layer 3221 formed with a light-blocking material.

As illustrated in FIGS. 36B and 36C, the metal oxide layer 3231 faces the conductive layer 3221 functioning as a first gate electrode and the conductive layer 3223 functioning as a second gate electrode and is between the two conductive films functioning as the gate electrodes.

As with the transistors 3200a and 3200b, the transistor 3200c has the S-channel structure. Such a structure enables the metal oxide layer 3231 included in the transistor 3200c to be electrically surrounded by electric fields of the conductive layer 3221 functioning as the first gate electrode and the conductive layer 3223 functioning as the second gate electrode.

Since the transistor 3200c has the S-channel structure, an electric field for inducing a channel can be effectively applied to the metal oxide layer 3231 by the conductive layer 3221 or 3223; thus, the current drive capability of the transistor 3200c can be improved and high on-state current characteristics can be obtained. As a result of the high on-state current, it is possible to reduce the size of the transistor 3200c. Furthermore, since the transistor 3200c has a structure in which the metal oxide layer 3231 is surrounded by the conductive layers 3221 and 3223, the mechanical strength of the transistor 3200c can be increased.

The transistor 3200c may be called a top-gate self-aligned (TGSA) FET from the position of the conductive layer 3223 relative to the metal oxide layer 3231 or the formation method of the conductive layer 3223.

The metal oxide layer 3231 in the transistor 3200c may have a multi-layer structure including two or more layers, as in the transistor 3200b.

Although the insulating layer 3212 is present only in a portion overlapping with the conductive layer 3223 in the transistor 3200c, the structure is not limited thereto, and the insulating layer 3212 may cover the metal oxide layer 3231. Alternatively, the conductive layer 3221 may be omitted.

This embodiment can be implemented in appropriate combination with any of the structures described in the other embodiments and the like.

<Composition of CAC-OS>

The composition of a CAC-OS that can be used for a transistor disclosed in one embodiment of the present invention is described below.

The CAC-OS has, for example, a composition in which elements included in an oxide semiconductor are unevenly distributed. Materials including unevenly distributed elements each have a size of greater than or equal to 0.5 nm and less than or equal to 10 nm, preferably greater than or equal to 1 nm and less than or equal to 2 nm, or a similar size. Note that in the following description of an oxide semiconductor, a state in which one or more metal elements are unevenly distributed and regions including the metal element(s) are mixed is referred to as a mosaic pattern or a patch-like pattern. The region has a size of greater than or equal to 0.5 nm and less than or equal to 10 nm, preferably greater than or equal to 1 nm and less than or equal to 2 nm, or a similar size.

Note that an oxide semiconductor preferably contains at least indium. In particular, indium and zinc are preferably contained. In addition, one or more of aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For example, of the CAC-OS, an In—Ga—Zn oxide with the CAC composition (such an In—Ga—Zn oxide may be particularly referred to as CAC-IGZO) has a composition in which materials are separated into indium oxide ($InO_{X1}$, where X1 is a real number greater than 0) or indium zinc oxide ($In_{X2}Zn_{Y2}O_{Z2}$, where X2, Y2, and Z2 are real numbers greater than 0), and gallium oxide ($GaO_{X3}$, where X3 is a real number greater than 0) or gallium zinc oxide ($Ga_{X4}Zn_{Y4}O_{Z4}$, where X4, Y4, and Z4 are real numbers greater than 0), and a mosaic pattern is formed. Then, $InO_{X1}$ or $In_{X2}Zn_{Y2}O_{Z2}$ forming the mosaic pattern is evenly distributed in the film. This composition is also referred to as a cloud-like composition.

That is, the CAC-OS is a composite oxide semiconductor with a composition in which a region including $GaO_{X3}$ as a main component and a region including $In_{X2}Zn_{Y2}O_{Z2}$ or $InO_{X1}$ as a main component are mixed. Note that in this specification, for example, when the atomic ratio of In to an element M in a first region is greater than the atomic ratio of In to an element M in a second region, the first region has higher In concentration than the second region.

Note that a compound including In, Ga, Zn, and O is also known as IGZO. Typical examples of IGZO include a crystalline compound represented by $InGaO_3(ZnO)_{m1}$ (m1 is a natural number) and a crystalline compound represented by $In_{(1+x0)}Ga_{(1-x0)}O_3(ZnO)_{m0}$ ($-1 \leq x0 \leq 1$; m0 is a given number).

The above crystalline compounds have a single crystal structure, a polycrystalline structure, or a c-axis-aligned crystalline or c-axis-aligned and a-b-plane-anchored crystalline (CAAC) structure. Note that the CAAC structure is a crystal structure in which a plurality of IGZO nanocrystals have c-axis alignment and are connected in the a-b plane direction without alignment.

On the other hand, the CAC-OS relates to the material composition of an oxide semiconductor. In a material composition of a CAC-OS including In, Ga, Zn, and O, nanoparticle regions including Ga as a main component are observed in part of the CAC-OS and nanoparticle regions including In as a main component are observed in part thereof. These nanoparticle regions are randomly dispersed to form a mosaic pattern. Therefore, the crystal structure is a secondary element for the CAC-OS.

Note that in the CAC-OS, a stacked-layer structure including two or more films with different atomic ratios is not included. For example, a two-layer structure of a film including In as a main component and a film including Ga as a main component is not included.

A boundary between the region including $GaO_{X3}$ as a main component and the region including $In_{X2}Zn_{Y2}O_{Z2}$ or $InO_{X1}$ as a main component is not clearly observed in some cases.

In the case where one or more of aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium in a CAC-OS, nanoparticle regions including the selected metal element(s) as a main component(s) are observed in part of the CAC-OS and nanoparticle regions including In as a main component are observed in part thereof, and these nanoparticle regions are randomly dispersed to form a mosaic pattern in the CAC-OS.

The CAC-OS can be formed by a sputtering method under conditions where intentional substrate heating is not performed, for example. In the case of forming the CAC-OS by a sputtering method, one or more selected from an inert gas (typically, argon), an oxygen gas, and a nitrogen gas may be used as a deposition gas. The ratio of the flow rate of an oxygen gas to the total flow rate of the deposition gas at the time of deposition is preferably as low as possible, and for example, the flow ratio of an oxygen gas is preferably higher than or equal to 0% and less than 30%, further preferably higher than or equal to 0% and less than or equal to 10%.

The CAC-OS is characterized in that no clear peak is observed in measurement using $\theta/2\theta$ scan by an out-of-plane method, which is an X-ray diffraction (XRD) measurement method. That is, X-ray diffraction shows no alignment in the a-b plane direction and the c-axis direction in a measured region.

In an electron diffraction pattern of the CAC-OS which is obtained by irradiation with an electron beam with a probe diameter of 1 nm (also referred to as a nanometer-sized electron beam), a ring-like region with high luminance and a plurality of bright spots in the ring-like region are observed. Therefore, the electron diffraction pattern indicates that the crystal structure of the CAC-OS includes a nanocrystal (nc) structure with no alignment in plan-view and cross-sectional directions.

For example, an energy dispersive X-ray spectroscopy (EDX) mapping image confirms that an In—Ga—Zn oxide with the CAC composition has a structure in which a region including $GaO_{X3}$ as a main component and a region including $In_{X2}Zn_{Y2}O_{Z2}$ or $InO_{X1}$ as a main component are unevenly distributed and mixed.

The CAC-OS has a structure different from that of an IGZO compound in which metal elements are evenly distributed, and has characteristics different from those of the IGZO compound. That is, in the CAC-OS, regions including $GaO_{X3}$ or the like as a main component and regions including $In_{X2}Zn_{Y2}O_{Z2}$ or $InO_{X1}$ as a main component are separated to form a mosaic pattern.

The conductivity of a region including $In_{X2}Zn_{Y2}O_{Z2}$ or $InO_{X1}$ as a main component is higher than that of a region including $GaO_{X3}$ or the like as a main component. In other words, when carriers flow through regions including $In_{X2}Zn_{Y2}O_{Z2}$ or $InO_{X1}$ as a main component, the conductivity of an oxide semiconductor is exhibited. Accordingly, when regions including $In_{X2}Zn_{Y2}O_{Z2}$ or $InO_{X1}$ as a main component are distributed in an oxide semiconductor like a cloud, high field-effect mobility ($\mu$) can be achieved.

In contrast, the insulating property of a region including $GaO_{X3}$ or the like as a main component is higher than that of a region including $In_{X2}Zn_{Y2}O_{Z2}$ or $InO_{X1}$ as a main component. In other words, when regions including $GaO_{X3}$ or the like as a main component are distributed in an oxide semiconductor, leakage current can be suppressed and favorable switching operation can be achieved.

Accordingly, when a CAC-OS is used for a semiconductor element, the insulating property derived from $GaO_{X3}$ or the like and the conductivity derived from $In_{X2}Zn_{Y2}O_{Z2}$ or InO$_{X1}$ complement each other, whereby high on-state current (I$_{on}$) and high field-effect mobility (μ) can be achieved.

A semiconductor element including a CAC-OS has high reliability. Thus, the CAC-OS is suitably used in a variety of semiconductor devices typified by a display.

At least part of this embodiment can be implemented in appropriate combination with any of the other embodiments.

This application is based on Japanese Patent Application Serial No. 2016-229326 filed with Japan Patent Office on Nov. 25, 2016, the entire contents of which are hereby incorporated by reference.

What is claimed is:

1. A display device comprising:
a pixel array; and
a plurality of gate drivers comprising:
first to N-th shift registers, N being an integer greater than or equal to 2; and
a plurality of demultiplexers,
wherein one of the plurality of demultiplexers is electrically connected to the first shift register and one of the N-th shift registers,
wherein a first clock signal and a second clock signal are input to the first shift register and the one of the N-th shift registers,
wherein the first clock signal and sampling signals are input to the one of the plurality of demultiplexers,
wherein the one of the plurality of demultiplexers generates a start pulse and outputs the start pulse to each of the first shift register and the one of the N-th shift registers, and
wherein each of the plurality of gate drivers is configured to separately drive a plurality of pixel groups in the pixel array.

2. The display device according to claim 1, further comprising:
a touch sensor unit.

3. The display device according to claim 2, further comprising:
an application processor,
wherein the application processor is configured to determine whether a displayed image is changed or not in each of the plurality of pixel groups.

4. The display device according to claim 3, wherein the pixel array comprises a transistor that comprises a channel formation region comprising a metal oxide.

5. The display device according to claim 4, wherein one of the plurality of gate drivers comprises a transistor that comprises a channel formation region comprising a metal oxide.

6. The display device according to claim 1, wherein the plurality of gate drivers numbers 2.

7. The display device according to claim 1, wherein N is 4.

8. The display device according to claim 1, wherein the plurality of demultiplexers numbers 4.

9. A display device comprising:
a pixel array; and
a plurality of gate drivers comprising:
first to N-th shift registers, N being an integer greater than or equal to 2; and
a plurality of demultiplexers,
wherein a plurality of clock signals is input into each of the first to N-th shift registers,
wherein a plurality of sampling signals is input into each of the plurality of demultiplexers,
wherein each of the first to N-th shift registers comprises a plurality of shift registers,
wherein one of the plurality of clock signals is input into one of the plurality of demultiplexers,
wherein another of the plurality of clock signals is input into another of the plurality of demultiplexers,
wherein a reset signal is input into the first to N-th shift registers, and
wherein the one of the plurality of demultiplexers generates a start pulse and outputs the start pulse to the plurality of shift registers of one of first to N-th shift registers.

10. The display device according to claim 9, further comprising:
a touch sensor unit.

11. The display device according to claim 10, further comprising:
an application processor,
wherein the application processor is configured to determine whether a displayed image is changed or not in each of a plurality of pixel groups included in the display array.

12. The display device according to claim 11, further comprising in a pixel array a transistor that comprises a channel formation region comprising a metal oxide.

13. The display device according to claim 12, wherein one of the plurality of gate drivers comprises a transistor that comprises a channel formation region comprising a metal oxide.

14. The display device according to claim 9, wherein the plurality of gate drivers numbers 2.

15. The display device according to claim 9, wherein N is 4.

16. The display device according to claim 9, wherein the plurality of demultiplexers numbers 4.

17. The display device according to claim 9,
wherein a number of sampling signals corresponds to the number of shift registers included in each of the first to N-th shift registers,
wherein a number of clock signals input into each of the first to N-th shift registers corresponds to the number of demultiplexers, and
wherein each of the shift registers included in each of the first to N-th shift registers is electrically connected to a plurality of gate lines.

18. The display device according to claim 17, wherein the plurality of gate lines corresponds to a double digit number.

* * * * *